United States Patent
Khodapanah et al.

(10) Patent No.: US 10,125,921 B2
(45) Date of Patent: *Nov. 13, 2018

(54) MOUNT ASSEMBLY FOR RECEIVING A MOUNTING CLEAT

(71) Applicant: Otter Products, LLC, Fort Collins, CO (US)

(72) Inventors: Tofigh Khodapanah, La Jolla, CA (US); William Wai-Chung Chow, Del Mar, CA (US); Jonathan H. Guerdrum, Fort Collins, CO (US); Paul B. Koh, New York, NY (US); Peter S. Armstrong, Poway, CA (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,882

(22) Filed: Dec. 5, 2017

(65) Prior Publication Data

US 2018/0094769 A1    Apr. 5, 2018

Related U.S. Application Data

(63) Continuation of application No. 14/974,886, filed on Dec. 18, 2015, now Pat. No. 9,869,423, which is a
(Continued)

(51) Int. Cl.
*A47G 29/00*    (2006.01)
*F16M 13/02*    (2006.01)
(Continued)

(52) U.S. Cl.
CPC ............. *F16M 13/02* (2013.01); *B60R 11/02* (2013.01); *B62J 11/00* (2013.01); *F16M 11/041* (2013.01);
(Continued)

(58) Field of Classification Search
CPC ................................ F16M 13/02; B60R 11/02
See application file for complete search history.

(56) References Cited

U.S. PATENT DOCUMENTS 3,480,310 A    11/1969    Mcelwain
3,521,216 A    7/1970    Tolegian
(Continued)

FOREIGN PATENT DOCUMENTS

EP    1938710 A1    7/2008
FR    935529 A    6/1948
WO    2012051358    12/2012

*Primary Examiner* — Amy J. Sterling

(57) ABSTRACT

A mount assembly for releasably receiving a mounting cleat includes a top housing portion, a bottom housing portion, and a recess in the top housing portion to receive the mounting cleat. The mount assembly further includes a biasing device connected to housing portions such that the biasing device exerts a force upon the top housing portion which tends to return the top housing portion to an unrotated position relative to the bottom housing portion. The mount assembly further includes a first clasp mechanism and a second clasp mechanism at least partially disposed within the top housing portion extendable into the recess to clasp the mounting cleat when the top housing portion is in the unrotated position. Finally, the mount assembly includes a locking mechanism configured to temporarily prevent rotation of the top housing portion relative to the bottom housing portion when the locking mechanism is in a locked position.

20 Claims, 50 Drawing Sheets

Related U.S. Application Data continuation-in-part of application No. 14/213,151, filed on Mar. 14, 2014, now Pat. No. 9,611,881.

(60) Provisional application No. 61/794,019, filed on Mar. 15, 2013, provisional application No. 61/923,166, filed on Jan. 2, 2014, provisional application No. 62/100,442, filed on Jan. 6, 2015.

(51) Int. Cl.
*F16M 11/04* (2006.01)
*B62J 11/00* (2006.01)
*F16M 11/10* (2006.01)
*F16M 11/14* (2006.01)
*F16M 11/20* (2006.01)
*F16M 13/00* (2006.01)
*B60R 11/02* (2006.01)
*B60R 11/00* (2006.01)

(52) U.S. Cl.
CPC ............ *F16M 11/10* (2013.01); *F16M 11/14* (2013.01); *F16M 11/2021* (2013.01); *F16M 13/00* (2013.01); *F16M 13/022* (2013.01); *B60R 2011/0078* (2013.01); *B60R 2011/0085* (2013.01); *F16M 2200/024* (2013.01)

(56) References Cited

U.S. PATENT DOCUMENTS

| | | |
|---|---|---|
| 3,786,391 A | 1/1974 | Mathauser |
| 3,808,577 A | 4/1974 | Mathauser |
| 3,810,258 A | 5/1974 | Mathauser |
| 3,816,679 A | 6/1974 | Hotchkiss |
| 4,182,558 A | 1/1980 | Matsuo |
| 4,431,333 A | 2/1984 | Chandler |
| 4,859,110 A | 8/1989 | Dommel |
| 4,940,414 A | 7/1990 | Lee |
| 4,963,902 A | 10/1990 | Fukahori |
| 4,994,829 A | 2/1991 | Tsukamoto |
| 5,054,733 A | 10/1991 | Shields |
| 5,359,756 A | 11/1994 | Miyauchi et al. |
| 5,664,292 A | 9/1997 | Chen |
| 5,996,956 A | 12/1999 | Shawver |
| 6,302,617 B1 | 10/2001 | Rumpp |
| 6,305,588 B1 | 10/2001 | Michel et al. |
| 6,305,656 B1 | 10/2001 | Wemyss |
| 6,409,531 B1 | 6/2002 | Millard |
| 6,464,524 B1 | 10/2002 | Kerr et al. |
| 6,514,624 B2 | 2/2003 | Takemoto |
| 6,646,864 B2 | 11/2003 | Richardson |
| 6,685,493 B2 | 2/2004 | Birkenmaier et al. |
| 6,705,580 B1 | 3/2004 | Bain |
| 6,888,940 B1 | 5/2005 | Deppen |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,287,738 B2 | 10/2007 | Pitlor |
| 7,308,737 B2 | 12/2007 | Saitoh et al. |
| 7,311,526 B2 | 12/2007 | Rohrbach et al. |
| 7,575,389 B2 | 8/2009 | Nance |
| 7,871,218 B2 | 1/2011 | Frey et al. |
| 8,303,336 B2 | 11/2012 | Smith |
| 8,328,055 B1 | 12/2012 | Snyder |
| 8,405,726 B2 * | 3/2013 | Schofield .................. B60R 1/04 348/148 |
| 8,453,835 B2 | 6/2013 | So |
| 8,688,037 B2 * | 4/2014 | Chatterjee ............. G06F 1/1632 320/107 |
| 8,770,402 B2 | 7/2014 | Bergreen et al. |
| 8,915,361 B2 | 12/2014 | Rayner |
| 8,955,678 B2 | 2/2015 | Murphy et al. |
| 2001/0000617 A1 | 5/2001 | Tracy |
| 2003/0141329 A1 | 7/2003 | Huang |
| 2004/0029405 A1 | 2/2004 | Neidlein |
| 2004/0258471 A1 | 12/2004 | Granata |
| 2006/0086873 A1 | 4/2006 | Chen |
| 2007/0215769 A1 | 9/2007 | Nebeker et al. |
| 2008/0199252 A1 | 8/2008 | Frey et al. |
| 2010/0078343 A1 | 4/2010 | Hoellwarth et al. |
| 2011/0073505 A1 | 3/2011 | Stiehl |
| 2011/0073608 A1 | 3/2011 | Richardson et al. |
| 2011/0314651 A1 | 12/2011 | Behar et al. |
| 2012/0043235 A1 | 2/2012 | Klement |
| 2012/0074005 A1 | 3/2012 | Johnson et al. |
| 2012/0111881 A1 | 5/2012 | Scott et al. |
| 2012/0145843 A1 | 6/2012 | Ho et al. |
| 2012/0175474 A1 | 7/2012 | Barnard et al. |
| 2015/0182009 A1 | 7/2015 | Whang et al. |

* cited by examiner

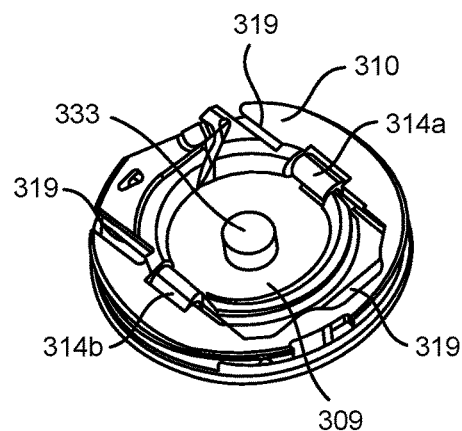
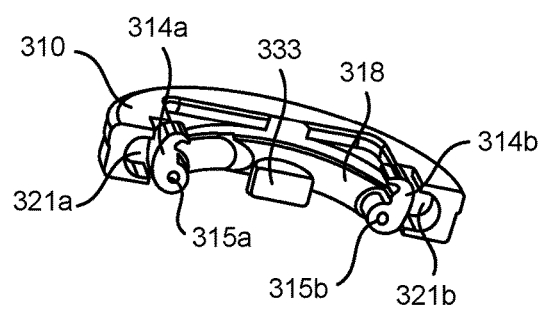
FIG. 3C  FIG. 3D
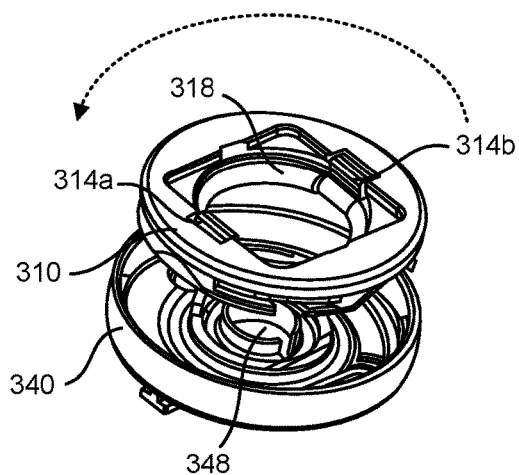
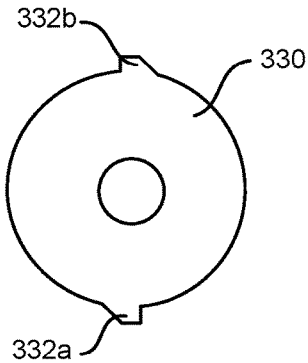
FIG. 3E  FIG. 3F

MOUNT ASSEMBLY FOR RECEIVING A MOUNTING CLEAT

CROSS-REFERENCE TO RELATED APPLICATIONS

This application is a continuation of U.S. patent application Ser. No. 14/974,886, filed Dec. 18, 2015, which is a continuation-in-part of U.S. patent application Ser. No. 14/213,151, filed on Mar. 14, 2014, now U.S. Pat. No. 9,611,881, which claims the benefit of U.S. Provisional Application No. 61/794,019, filed Mar. 15, 2013, U.S. Provisional Application No. 61/923,166, filed Jan. 2, 2014, and U.S. Provisional Application No. 62/100,442, filed Jan. 6, 2015. Each of the patents and patent applications above are hereby incorporated by reference in their entirety.

FIELD

This disclosure relates generally to apparatuses and systems for removably mounting an item, such as a portable electronic device, to an object or surface.

BACKGROUND

Portable electronic devices, such as smartphones, tablet computers, and satellite navigation receivers, are widely used. Portable electronic devices are often capable of navigation and mapping, media playback and recording, and data display. While such devices may be held in a pocket or bag, users may wish to removably attach the device to a surface, such as a vehicle dashboard or handlebar for ease of use. Mounting the portable electronic device to a surface can permit easier input and output of information to and from the device, respectively, thereby rendering the device more useful to a user and improving the user's experience.

SUMMARY

This disclosure provides apparatuses and systems for releasably attaching two items, such as a protective encasement or mobile electronic device to a bicycle mount, suction cup mount, a vehicle surface (windshield, dashboard, etc.), a home surface (wall, mirror, counter, table, television, etc.), or an office surface (e.g. desk, wall, whiteboard, computer monitor, etc.).

In one aspect, this disclosure provides a mount assembly for releasably attaching two items. The mount assembly includes an inner assembly, an outer housing, a cam, and a biasing device. The inner assembly is rotatably connected to the outer housing and together the inner assembly and outer housing form a housing volume. A recess in the inner assembly may receive a mounting cleat. The biasing device (e.g., a torsion spring) includes a first and second end, the first end being connected to the outer housing and the second end being connected to the inner assembly. The inner assembly may be rotated between an unrotated position and a rotated position relative to the outer housing, and the biasing device may exert a force on the inner assembly to return the inner assembly to the unrotated position from the rotated (or partially rotated) position.

First and second clasp mechanisms are at least partially disposed within the housing volume and each extends into the recess when the inner assembly is in the unrotated position and retracted from the recess when the inner assembly in is the rotated position.

A rotation-locking mechanism has a locking element that may be movably disposed, when in a locked position, through a locking element channel of the outer housing into a locking element receptacle formed in a perimeter of the inner assembly. The locked position of the locking mechanism prevents rotation of the inner assembly from the unrotated position, and the locking element is removable from the locked position into an unlocked position to permit rotation of the inner assembly.

Variations of the rotation-locking mechanism include a toggle switch that toggles a locking pin into and out of the locking element receptacle; a sliding snap pin mechanism including a slider that moves back and forth across the mount assembly to push and pull a snap pin into and out of the locking element receptacle; a pinch-to-release mechanism that includes one or more toggle switches oriented for pinching across a top or across a bottom of the mount assembly to pivot the toggle switches toward each other, thus releasing respective toggle pins of the toggle switches from respective locking element receptacles of the inner assembly; a locking arm formed in and along a perimeter wall of the outer housing, having a lock pin extending from a first end of the lock arm that is biased to an unlocked position, the lock arm being forced toward the inner assembly by moving a slider along the perimeter of the outer housing at the lock arm, a bump formed on the slider moving from a loose position against the lock arm and outer housing perimeter to a tight position at the first end of the lock arm, forcing the lock pin into the locking element receptacle.

This Summary is provided to introduce a selection of concepts in a simplified form that are further described below in the Detailed Description. This Summary is not intended to identify essential features of the claimed subject matter, nor is it intended to be used to limit the scope of the claimed subject matter.

BRIEF DESCRIPTION OF THE FIGURES

FIG. 3C shows a bottom perspective view of a top housing of the mount assembly of FIG. 3A. FIG. 3D shows a top perspective sectional view of the top housing of FIG. 3C. FIG. 3E shows a perspective view of the top housing of FIG. 3C positioned for assembly with a bottom housing. FIG. 3F shows a bottom view of a cam positioned for insertion into the top and bottom housings.

DETAILED DESCRIPTION

The present disclosure is directed to a mounting apparatus and system for attaching to and removably retaining an item, such as a portable electronic device or a case for a portable electronic device. The mount apparatus may include a mount assembly having a recess or cavity adapted to receive a cleat attached to an item, such as a portable electronic device or an encasement for a portable electronic device. The mount assembly also includes at least two clasp mechanisms adapted to clasp the cleat when the cleat is inserted into the recess. The clasp mechanisms move via a central cam mechanism, such that when the cleat is rotated relative to the mount assembly, the clasps release the cleat and allow its removal from the recess. The mount assemblies may include one or more magnets, either on the clasp mechanism or substantially near the center of the recess to facilitate alignment of the cleat in the recess and/or movement of the clasp mechanisms to secure the cleat.

When elements are referred to as being "connected" or "coupled," the elements can be directly connected or coupled together or one or more intervening elements may also be present. In contrast, when elements are referred to as being "directly connected" or "directly coupled," there are no intervening elements present.

The term "about" as used herein in reference to quantitative measurements, refers to the indicated value plus or minus 10%.

Figure 1A:
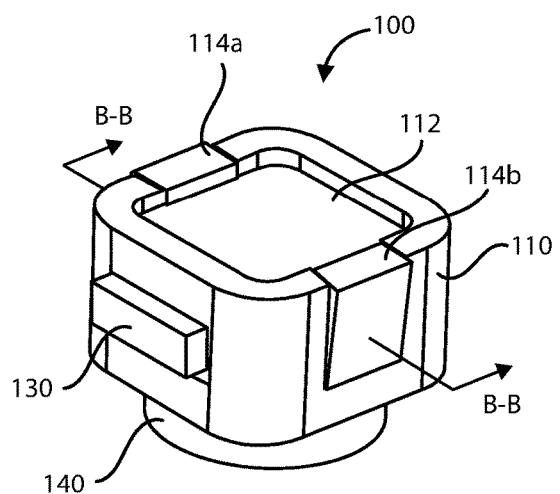
FIG. 1A shows a perspective view of a mount assembly embodiment.

FIG. 1A shows a schematic illustration of a perspective view of a mount assembly 100 having a substantially square circumference. Mount assembly 100 has a top portion 110 and a bottom portion 140. A recess 112 or cavity positioned in the top portion 110 of the mount assembly 100 is adapted to receive a cleat 150 (see FIG. 1C). The circumferential shapes of the perimeter of recess 112 and cleat 140 may be different from the circumferential shape of the outer perimeter of the mount assembly. For example, recess 112 may have a circumference that is round, oval, triangular, rectangular (e.g. square), pentagonal, hexagonal, septagonal, octagonal, nonagonal, or decagonal; the circumference of recess 112 may be an irregular polygon, and may have rounded corners. The outer perimeter of the mount assembly 100 may be round, oval, triangular, rectangular (e.g. square), pentagonal, hexagonal, septagonal, octagonal, nonagonal, or decagonal.

Figure 1B:
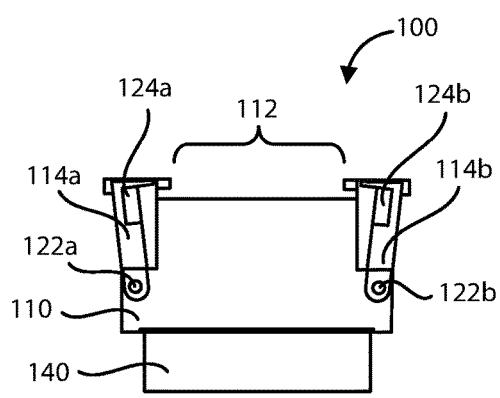
FIG. 1B shows a side sectional view of the mount assembly of FIG. 1A.

Two clasp mechanisms 114a and 114b are positioned on opposite sides of the recess 112. In FIGS. 1A and 1B, the clasp mechanisms (114a, 114b) are configured as hooks, although other configurations are contemplated (see, e.g., FIG. 3B). FIG. 1B shows a side sectional view of mount assembly 100 (see section line B-B of FIG. 1A), but viewed from the side instead of from above, as indicated by section line B-B of FIG. 1A. The clasp mechanisms (114a, 114b) are secured on axles 122a and 122b and are shown pivoted outward to allow entry of the cleat 150. The mount assembly 100 also has a lock switch 130 positioned on a side surface of the mount assembly. In some embodiments, the lock switch 130 may be positioned on an underside of the mount assembly 100.

Figure 1C:
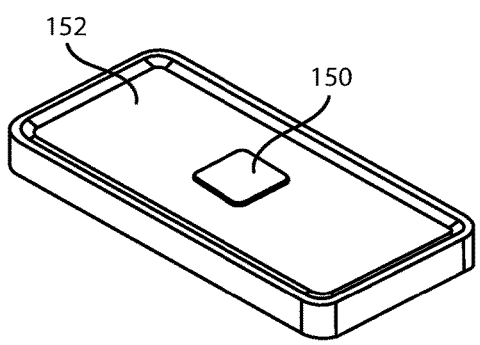
FIG. 1C shows a rear perspective view of a protective case for an electronic device, the case having a cleat attached thereto, the cleat configured to releasably interact with the mount assembly of FIG. 1A.

The clasp mechanisms (114a, 114b) may also include one or more clasp magnets (124a, 124b) proximate the recess 112. The cleat 150 (see FIG. 1C) may be made of a ferromagnetic material (e.g. steel). Upon entry of the cleat 150 into the recess 140, the clasp mechanisms 114a-b can be magnetically attracted to the cleat 150, thereby retaining the cleat 150 in the recess 112. The cleat 150 is depicted in FIG. 1C, attached to an encasement 152 for a portable electronic device, such as a smartphone. The cleat 150 includes undercuts on opposing sides that allow entry of a portion of each of the clasp mechanisms 114a-b, thereby retaining the cleat 150 within the recess 112 of the mount assembly 100. In certain embodiments, the clasp mechanisms (114a, 114b) do not include clasp magnets (124a, 124b) and, instead, the clasp mechanisms are forced together using a spring, thereby securing the cleat 150 within the recess 112 of the mount assembly 100.

Figure 2A:
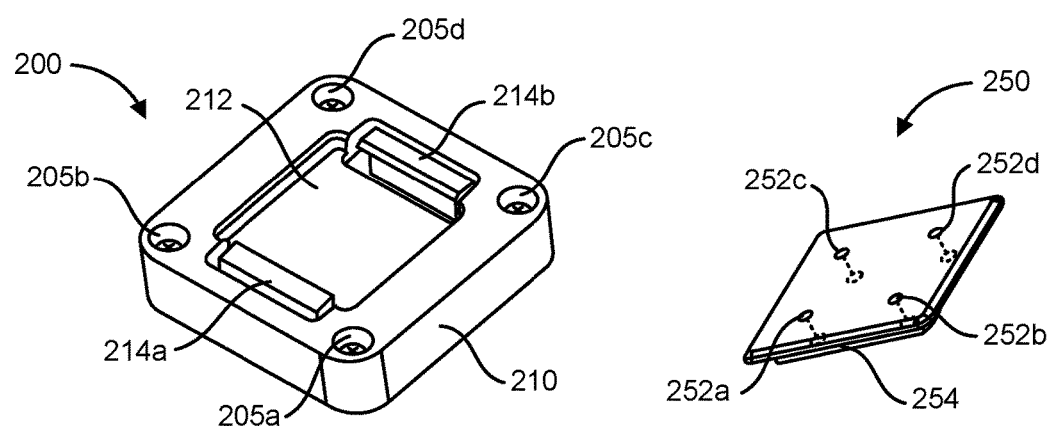
FIG. 2A shows a top perspective view of a mount assembly embodiment and a cleat configured to interact with the mount assembly.

FIG. 2A shows a perspective view of another embodiment of a mount assembly 200 and cleat 250. Clasp mechanisms (214a, 214b) are partially enclosed by a top housing 210 and are disposed proximate a recess 212 or cavity in the top housing. The mount assembly 200 can include a housing screw (205a, 205b, 205c, and 205d) located at each of four corners of the top housing 210. The housing screws 205a-d (or other suitable fasteners) can secure the top housing 210 to a bottom housing 240 (see FIG. 2B). Alternately, the top and bottom housings (210, 240) may be secured together with adhesive, by welding (e.g. ultrasonic welding), by press-fit, or with reciprocal clasps. The cleat 250 may have screw holes (252a, 252b, 252c, and 252d) configured to allow the screws 205a-d to attach the cleat 250 to an item, such as an encasement for a mobile electronic device. In some embodiments, the cleat 250 may be adhered or welded directly to the item. In other embodiments the cleat 250 may be formed integrally with an encasement for a mobile electronic device, or with the mobile electronic device itself. An undercut 254 is partially visible between a bottom surface and a top surface of the cleat 250, as shown in FIG. 2A.

Figure 2B:
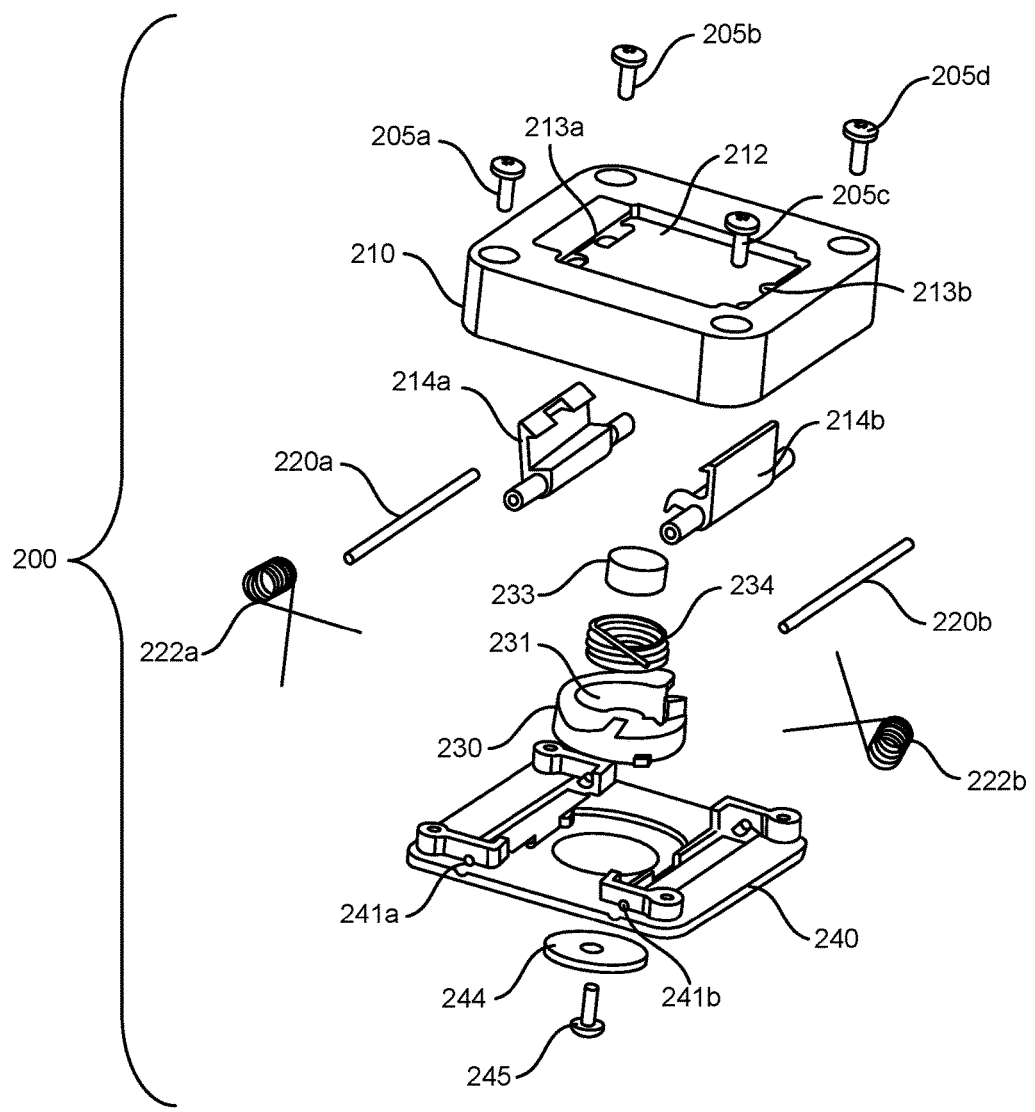
FIG. 2B shows a top perspective view of an exploded mount assembly of FIG. 2A.

FIG. 2B shows a perspective view of an exploded mount assembly 200. The top housing 210 and the bottom housing 240 can be held together by one or more housing screws 205a-d and can enclose components of the mount assembly 200. The bottom housing 240 can include axle mounting portions (241a, 241b) that retain axles (220a, 220b) (also called pivot shafts), respectively. Clasp mechanisms (214a, 214b) can be installed on the axles (220a, 220b), thereby allowing the clasp mechanisms (214a, 214b) to rotate on the axles and pivot toward and away from the recess 212 during coupling or decoupling of the cleat 250 with the mount assembly 200. Clasp springs (222a, 222b) can be positioned on the clasp mechanisms (214a, 214b) or axles (220a, 220b). The clasp spring (e.g. 222a, 222b) can apply a force on a respective clasp mechanism (e.g. 214a, 214b) thereby forcing the clasp mechanisms inward toward the middle of recess 212 and toward the clasp mechanism located on an opposite side of the recess. In one example, each clasp mechanism (e.g. 214a, 214b) can extend upward through a clasp aperture (213a, 213b) and partially into the recess 212. Within the mount assembly 200, a cam 230 can be positioned at or near a center of the bottom housing 240 and can be secured to a cam retention plate 244 by a cam plate screw 245. The cam 230 can rotate relative to the mount assembly 200. In one example, the cam 230 includes a center cavity 231 that holds a center magnet 233 and a center torsion spring 234 disposed within a recess in the cam. The center magnet 233 may be included in the mount assembly 200 as illustrated or in other position(s) to aid a user in guiding and aligning a ferrous cleat 250 (or a cleat with a ferrous portion) into the recess 212. The center magnet 233 may also reduce the amount of force required by a user to press the cleat 250 past the clasping mechanisms to seat the cleat within the recess 212.

Figure 2C:
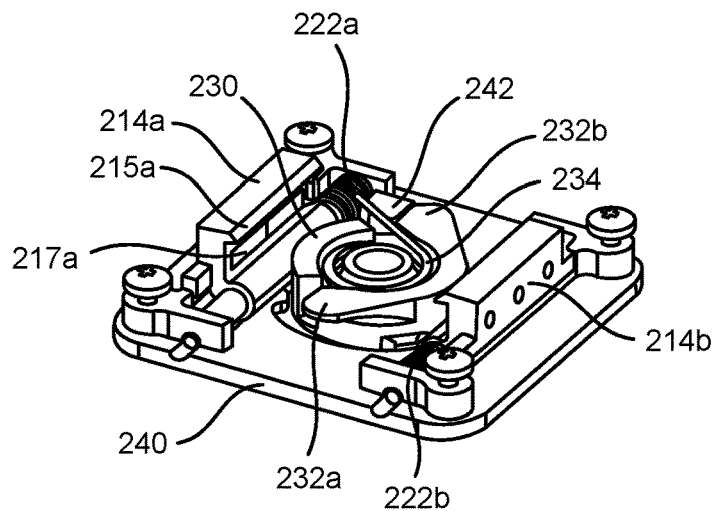
FIG. 2C shows the mount assembly of FIG. 2A with the top member removed.

FIG. 2C shows a top perspective view of the mount assembly 200 of FIG. 2B with the top housing 210 and center magnet 233 removed to reveal components within the mount assembly. A first clasp spring 222a can be installed on a first clasp mechanism 214a, and a second clasp spring 222b can be installed on a second clasp mechanism 214b. The first clasp spring 222a, when installed in the mount assembly 200, can apply a force to the first clasp mechanism 214a, thereby urging the first clasp mechanism inward toward the center of the recess 212 in the top portion 210 when the top portion is installed on the mount assembly. Likewise, the second clasp spring 222b, when installed in the mount assembly 200, can apply a force to the second clasp mechanism 214b, thereby urging the second clasp mechanism inward toward the center of the recess 212 in the top portion 210 when the top portion is installed on the mount assembly. When the cleat 250 is inserted into the recess 212 in the top portion 110, the cleat may initially force the first and second clasp mechanisms (214a, 214b) outward from the recess 212 in the top portion 110. Then, as the cleat 250 is depressed further into the recess 212, a sloped face (215a, 215b) of each clasp mechanism (214a, 214b) may snap into the undercut 254 of the cleat due to the force exerted by the respective clasp springs (222a, 222b), thereby retaining the cleat within the recess.

Figure 2D:
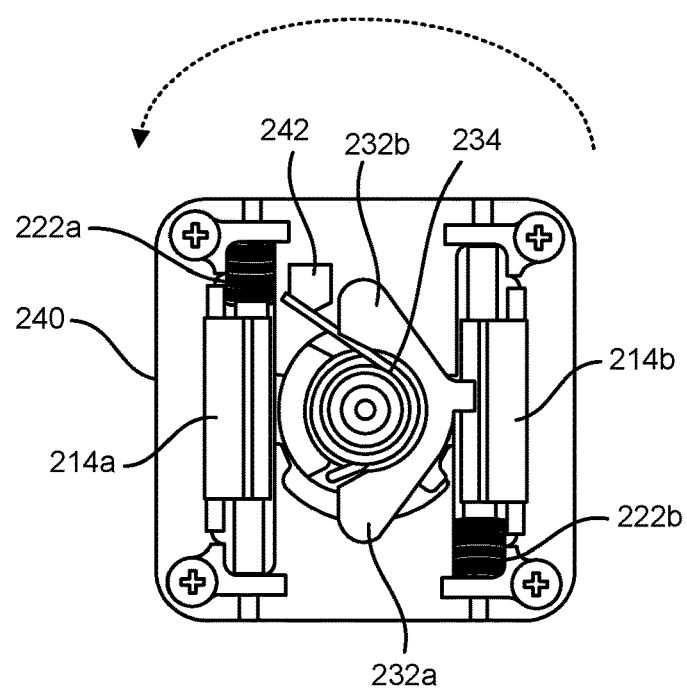
FIG. 2D shows a top view of the mount assembly of FIG. 2C.

In order to release the cleat 250 from the recess 212, the bottom housing 240 and the top housing 210 can be rotated (e.g. counterclockwise) relative to the cam 230. FIG. 2D shows a top view of the mount assembly 200 in FIG. 2C. The dashed arc line illustrates the direction of rotation of the bottom housing 240 relative to the cam 230. As the bottom housing 240 is rotated (along with the top housing 210), cam arms (232a, 232b) contact respective clasp mechanisms (214a, 214b) and force the clasp mechanisms outward, which releases the cleat 250 (not shown) and allows its removal from the recess 212 in the top housing 210 (not shown). The cam arms (232a, 232b) may be positioned relative to the clasp mechanisms (214a, 214b) such that different rotation angles may effectively open the clasp mechanisms and permit release of the cleat 250. For example, the cam arms may be positioned such that a rotation of 90 degrees opens the clasp mechanisms (214a, 214b) thereby allowing release of the cleat 250 from the recess 212. In some embodiments, the cam arms (232a, 232b) are positioned to open the clasp mechanisms (214a, 214b) using a rotation angle of: about 90 degrees, about 45 degrees, about 22.5 degrees, or about 11.25 degrees according to application. In some embodiments, the cam arms (232a, 232b) are positioned to open the clasp mechanisms (214a, 214b) using a rotation angle of: between about 80 degrees and about 90 degrees; between about 70 degrees and about 80 degrees; between about 60 degrees and about 70 degrees; between about 50 degrees and about 60 degrees; between about 40 degrees and about 50 degrees; between about 30 degrees and about 40 degrees; between about 20 degrees and about 30 degrees; about 10 degrees and about 20 degrees; or about 1 degree and 10 degrees, according to application.

After the cleat 250 is removed from the recess 212, the bottom housing 240 and the top housing 210 return to their starting position, forced back by the center torsion spring 234. Over-rotation of the bottom housing 240 and top housing 210 is prevented by a cam stop 242 extending from the bottom housing 240. In one example shown in FIG. 2D, the cam stop 242 can be positioned to the left of the cam arm 232b. In another embodiment, the center torsion spring 234 and cam stop 242 may be positioned and oriented such that rotation of the top and bottom housings (210, 240) relative to the cam 230 may be clockwise to release the cleat 250 rather than counterclockwise. In another embodiment (not illustrated), the mount assembly may include two cam systems each having a cam 230 with cam arms 232a/232b, a center torsion spring 234 and cam stop 242. However, one of the cam systems may be implemented in the opposite direction from the other cam system such that the mount assembly may be turned in either clockwise or counterclockwise directions. In such embodiment, one cam system may return the mount assembly 200 to a rest position from the counterclockwise direction, and the other cam system may return the mount assembly 200 to a rest position from a clockwise turned position.

In some embodiments, the clasp mechanisms (214a, 214b) are forced apart from each other in an open position by clasp springs 222a-b. As shown in FIG. 2C, the first clasp mechanisms 214a can include a first clasp magnet 217a, and the second clasp mechanism 214b can include a second clasp magnet 217b (not visible). When a ferromagnetic cleat 250 is inserted into the recess 212 of the top housing 210, the clasp mechanisms (214a, 214b) are attracted to the cleat, and overcome the force applied by the clasp springs (222a, 222b) to secure the cleat within the recess. The cleat 250 may be released by rotation of the cam 230 relative to the bottom housing 240, thereby allowing the cam arms (232a, 232b) to force the clasp mechanisms (214a, 214b) outward, which releases the cleat from recess 212.

Figure 2E:
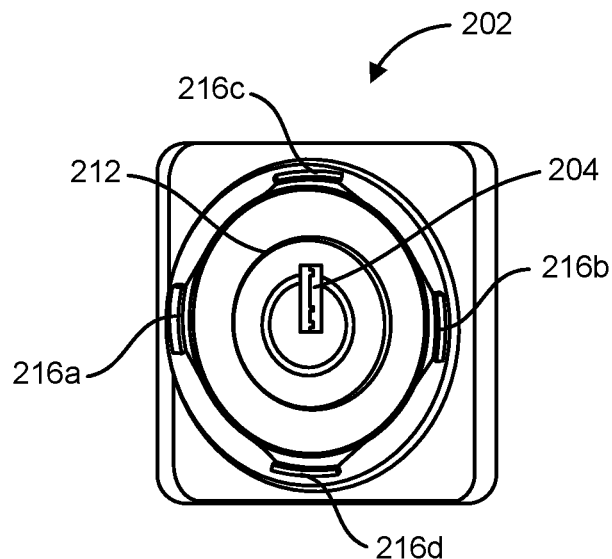
FIG. 2E shows an embodiment of a mount assembly having four clasp catches.
Figure 2F:
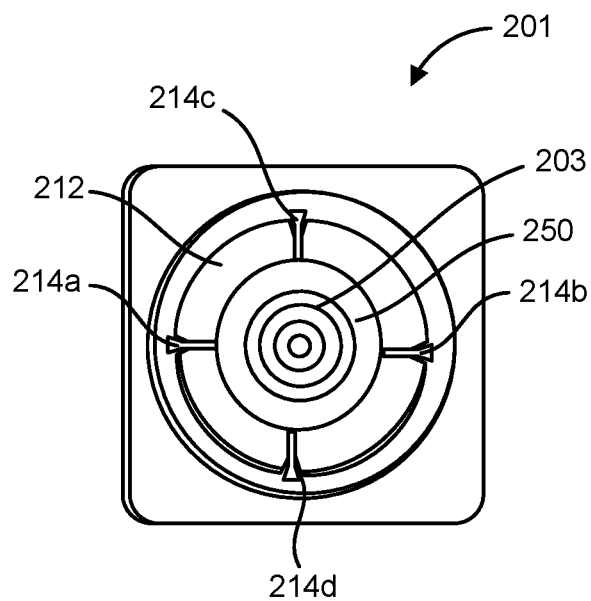
FIG. 2F shows a mount assembly having four clasps configured as pins.

In some embodiments, more than two clasp mechanisms may be used. FIG. 2F shows a perspective view of a first portion 202 of a mount assembly 200 having four clasp mechanisms 214a-d extending from a center portion. FIG. 2E shows a perspective view of a second portion 201 of a mount assembly 200 having four clasp catches (216a, 216b, 216c, 216d) oriented around a cleat 250 and configured to receive the clasp mechanisms 214a-d when the cleat is inserted into the recess 212. During assembly of the first portion 202 to the second portion 201, the four clasp mechanisms 214a-d can extend outward from a center of the second portion and into the respective clasp catch, thereby securing the first portion to the second portion. The four clasp mechanisms 214a-d can be drawn outward by a force exerted by a mechanical mechanism, magnetism, or a combination thereof. The second portion 201 can include four conductive portions (e.g. conductive rings 203) that are configured to mate with four conductive portions (e.g. conductive pins 204) extending from the first portion 202 to transmit power, data, or a combination thereof between the first and second portions of the mount assembly 200. Alternatively, the parallel-side mount assembly of earlier figures may be extended to include clasp mechanisms on all four sides. Such implementation may permit further securing of a cleat 250 having clasp-engaging undercuts 254 on all sides, or may permit a cleat 250 having clasp-engaging undercuts 254 on only two opposing sides to be mounted in different orientations.

Figure 3A:
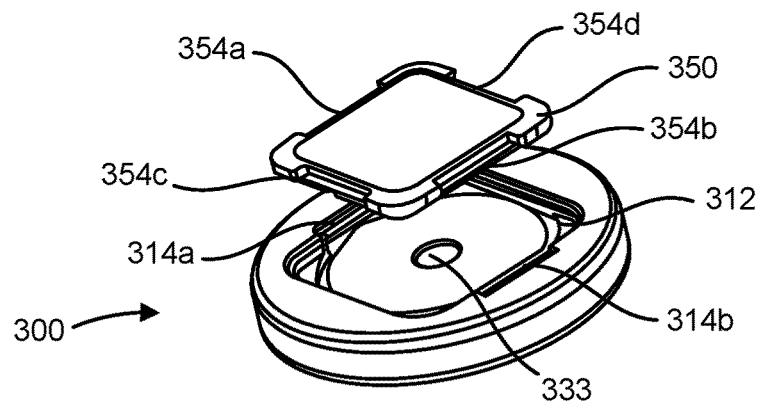
FIG. 3A shows a top perspective view of a mount assembly embodiment and matching cleat.

FIGS. 3A-3H show a thin, compact embodiment of a mount assembly 300 for attaching a first item to a second item, such as for attaching an encasement for a mobile electronic device to a surface of a bicycle, vehicle, wall, etc. In one example, acrylic foam tape, such as VHB (manufactured by 3M Corporation of Saint Paul, Minn.), can be used to secure the mount assembly 300 to a surface. FIG. 3A illustrates a perspective view of a mount assembly 300, having a recess 312 or cavity and a center magnet 333. Clasping mechanisms (314a, 314b) are disposed on opposite sides of the recess 312. A mounting cleat 350 is positioned above the recess 312 and includes four undercuts (354a, 354b, 354c, 354d), such that the mounting cleat 350 may be positioned within the recess 312 in any of four orientations and still be retained by the clasping mechanisms (314a, 314b). The center magnet 333 is disposed in the bottom of recess 312. In some embodiments, the center magnet 333 is added to the mount assembly 300 and the cleat 350 is ferromagnetic (e.g. made at least partially of steel), so as to aid in guiding and aligning the cleat 350 into recess 312 during installation. The center magnet 333 also reduces the amount of force required by a user to press the cleat 350 past the clasping mechanisms (314a, 314b) to seat the cleat in the recess 312. Upon installation, the center magnet 333 can increase the amount of force required to remove the cleat 350 from the recess 312, which can reduce the likelihood of the cleat unintentionally dislodging from the mount assembly during use (e.g. while riding a bicycle with the mount assembly 300 attached to the bicycle).

Figure 3B:
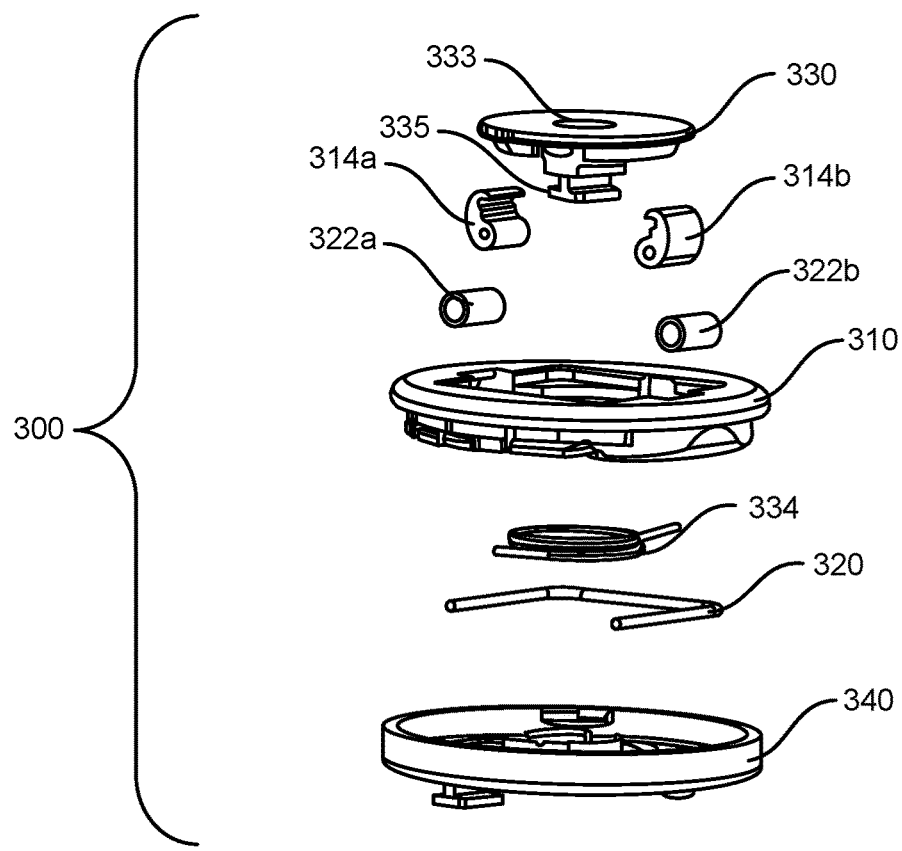
FIG. 3B shows an exploded view of the mount assembly of FIG. 3A.

FIG. 3B shows a perspective view of an exploded mount assembly 300. A cam 330 includes the center magnet 333 and a center attachment cleat 335. A top housing 310 houses the clasp mechanisms (314a, 314b) as well as clasp springs (322a, 322b). The clasping mechanisms (314a, 314b) are installed on respective arms of a pivot pin 320, and rotate with respect to the arms of the pivot pin during use. The rotational orientation of the top housing 310 is maintained by a center torsion spring 334. Both the cam 330 and the top housing 310 are positioned at least partially inside a bottom housing 340 upon assembly of the mount assembly 300. The mount assembly 300 is described in further detail below.

FIG. 3C depicts a bottom perspective view of the top housing 310, with the bottom housing 340, the cam 330, the center torsion spring 334, and the pivot pin 320 removed for clarity. The pivot pin 320 is slid through pivot holes (315a, 315b) (see FIG. 3D) of the clasp mechanisms (314a, 314b) and then positioned into a pin channel 319 located in the top housing 310. The pin channel 319 is adapted to retain the pivot pin 320 via overhangs that cover a portion of the pin channel 319. The overhangs provide an interference fit that allows the pivot pin 319 to be snapped into position within the pivot channel 319 during assembly and the overhangs help retain the pivot pin in place within the pivot channel upon assembly. The top housing 310 also includes a cam-receiving aperture 309 configured to receive the cam 330 during assembly. In one example, the top surface of the cam 330 and the circumference of the cam-receiving aperture 309 can together constitute the recess 312.

FIG. 3D shows a perspective sectional view of the top housing 310 and the clasp mechanisms (314a, 314b). The clasp springs (322a, 322b) are removed for clarity to reveal clasp spring cavities 321a and 321b that are configured to receive the respective clasp springs. When installed in the spring cavities (321a, 321b), the clasp springs (322a, 322b) are configured to exert a force inward against the clasp mechanisms (314a, 314b). In some embodiments, the clasp springs (322a, 322b) can be torsion springs or compression springs. In some embodiments, as depicted in FIG. 3B, the clasp springs (322a, 322b) may be elastic deformable cylinders (e.g. silicone tubing or another cylindrically-shaped elastomer components) that can be repeatedly deformed when the clasp mechanisms (314a, 314b) are forced outward. Once deformed, the elastic deformable cylinders can resiliently reassume their original shape and thereby exert a force that presses the clasp mechanisms (314a, 314b) inward again toward the recess 312. The pivot holes (315a, 315b) are visible on clasp mechanisms (314a, 314b). In some examples, a lubricant can be applied to the pivot holes (315a, 315b) or the pivot pin 320 to reduce friction associated with the clasp mechanisms pivoting on the pivot pin, thereby improving operation of the mount assembly 300.

FIG. 3E shows a top perspective view of the top housing 310 disassembled from and positioned above the bottom housing 340, with the cam 330, the center torsion spring 334, and the center magnet 333 removed for clarity. After the mounting cleat 350 is inserted into the recess 312 and secured by the clasp mechanisms (314a, 314b), rotation of the top housing 310 relative to the bottom housing 340 can release the clasp mechanisms (314a, 314b). The top housing 310 may be rotated in the direction of the dotted arrow, as shown in FIG. 3E, relative to the bottom housing 340 and the cam 330. Rotation of the top housing 310 with respect to the bottom housing 340 brings the first cam arm 332a into contact with the first clasp mechanism 314a and brings the second cam arm 332b into contact with the second clasp mechanism 314b (see FIG. 3F, which shows a top view of the cam 330). As the top housing 310 is rotated further with respect to the bottom housing 340, the first cam arm 332a applies a force to the first clasp mechanism 314a that overcomes resistance associated with compressing the first clasp spring 322a and thereby allows the first clasp mechanism 314a to move outwardly from the recess 312. Likewise, as the top housing 310 is rotated further with respect to the bottom housing 340, the second cam arm 332b applies a force to the second clasp mechanism 314b that overcomes resistance associated with compressing the second clasp spring 322b and thereby allows the second clasp mechanism 314b to move outwardly from the recess 312. The top housing 310 can include a contoured surface 318 around an inner circumference of the cam-receiving aperture 309. The contoured surface 318 can be configured to act as a bearing surface upon which a concave surface 336 of the bottom surface of the cam 330 is configured to ride upon during rotation of the top housing relative to the cam (see FIGS. 3E and 3G).

Figure 3G:
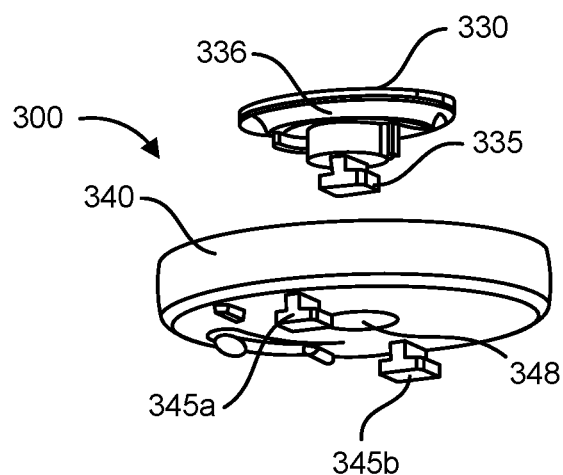
FIG. 3G shows an exploded perspective view of the mount assembly of FIG. 3A.
Figure 3H:
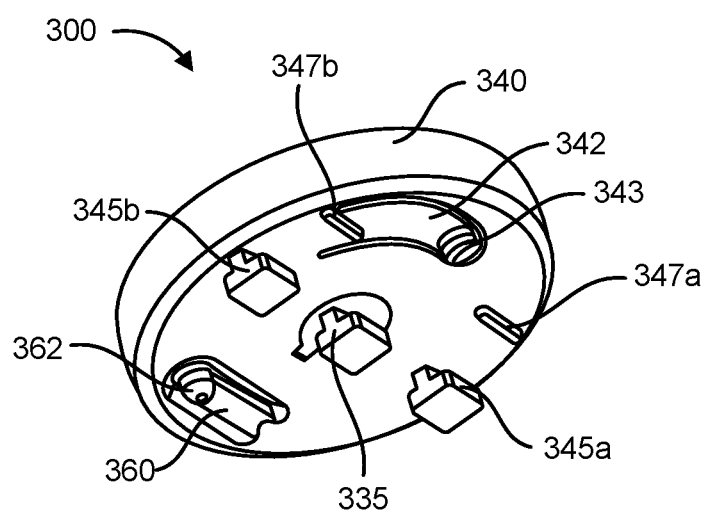
FIG. 3H shows a bottom perspective view of the mount assembly of FIG. 3A.

FIG. 3G shows a bottom perspective view of a mount assembly 300 with the cam 330 positioned above the top housing 310. A bottom surface of the bottom housing 340 can include outer attachment cleats (345a, 345b) as well as a cam aperture 348. When the cam 330 is inserted into the cam aperture 348 during assembly, a center attachment cleat 335 extends through the cam aperture 348 and beneath the bottom surface of the bottom housing, as shown in FIG. 3H. The outer attachment cleats (345a, 345b) and center attachment cleat are configured to interact with holes that allow the mount assembly 300 to be attached to another item. In one embodiment, the center attachment cleat 335 is formed from a metal, such as steel. In another embodiment, the center attachment cleat 335 is formed from a polymer, such as polycarbonate. When the outer attachment cleats (345a, 345b) and the center attachment cleat 335 are secured in corresponding attachment cleat holes on another item, such as a bicycle mount, the center attachment cleat provides a sturdy attachment point that increases the force required to separate the mount assembly 300 from the item to which it is secured.

FIG. 3H shows a bottom perspective view of the mount assembly 300 with the cam 330 installed. The center attachment cleat 335 is shown aligned with outer attachment cleats (345a, 345b) to permit the mount assembly 300 to be secured in the attachment cleat holes of another item, such as a bicycle mount. In some embodiments, the bottom housing 340 may include only a single outer attachment cleat (e.g. 345a or 345b). FIG. 3H also depicts orientation ridges (347a, 347b), an attachment securing arm 360, and a rotation release arm 342. The orientation ridges (347a, 347b) are configured to interact with orientation notches or channels on the item (e.g. the bicycle mount 400 shown in FIG. 4A) to which the mount assembly 300 is attached, thereby ensuring that the mount assembly 300 is attached in only one orientation (see FIG. 4A).

The attachment securing arm 360 is relatively stiff along its length, but is cantilevered from the bottom housing 340, so it is therefore capable of deflecting when an upward force is applied to the attachment securing arm. The attachment securing arm 360 can include a button 362 (e.g. protrusion) facing outward from a free end of the attachment securing arm. The button 362 can interact with an indentation on the item to which the mount assembly 300 is attached, more firmly securing the mount assembly to the item. A rotation release arm 342 is relatively stiff along its length, but is cantilevered from the bottom housing 340, so it is therefore capable of deflecting when an upward force is applied to the rotation release arm. The rotation release arm 342 includes a button 343 (e.g. protrusion) facing outward on a free end of the rotation release arm 342. When an upward force is applied to the button 343, the rotation release arm 342 can deflect upward.

Figure 3I:
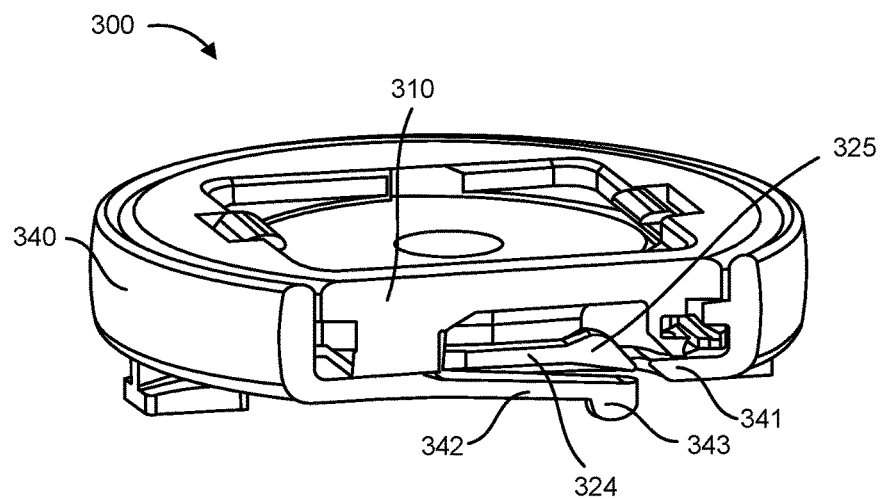
FIG. 3I shows a sectional perspective view of the mount assembly of FIG. 3A.

In various uses of the mount assembly 300, jostling due to, e.g., rough biking, may overcome the force from the center torsion spring 334 and/or clasp springs 322a/322b, permit the cleat and attached electronic device. Similarly, various implementations may subject the mount assembly to accidental touching by a user in the ordinary movement of a given activity. Accordingly, further mechanical elements may be employed to prevent the top housing 310 from turning with respect to bottom housing 340 and cam 330. In one non-limiting example, FIG. 3I shows a side sectional view of the mount assembly 300 to illustrate the interaction of the rotation lock arm 324 and the rotation release arm 342. Rotation of the top housing 340 is prevented by the rotation lock arm 324, which includes a wedge head 325. The rotation lock arm 324 is angled slightly downward, such that the wedge head 325 is disposed proximate an angled face 341 of the bottom housing 340. When the top housing 310 is rotated in order to open the clasp mechanisms (314a, 314b) as described above, the wedge head 325 contacts the angled face 341 and prevents further rotation of the top housing.

For a user to rotate the top housing 310 and release a mounting cleat (e.g. 350), the button 343 on the rotation release arm 342 can be pressed upwards to contact the rotation lock arm 324 and wedge head 325. The lock arm 324 is then moved toward the interior of the mount assembly 300 and past the angled face 341, thereby allowing the top housing 310 to be rotated without the wedge head 325 interfering with the angled face. Alternative rotation-prevention structures are described below with respect to FIGS. 24A-29B.

Figure 4A:
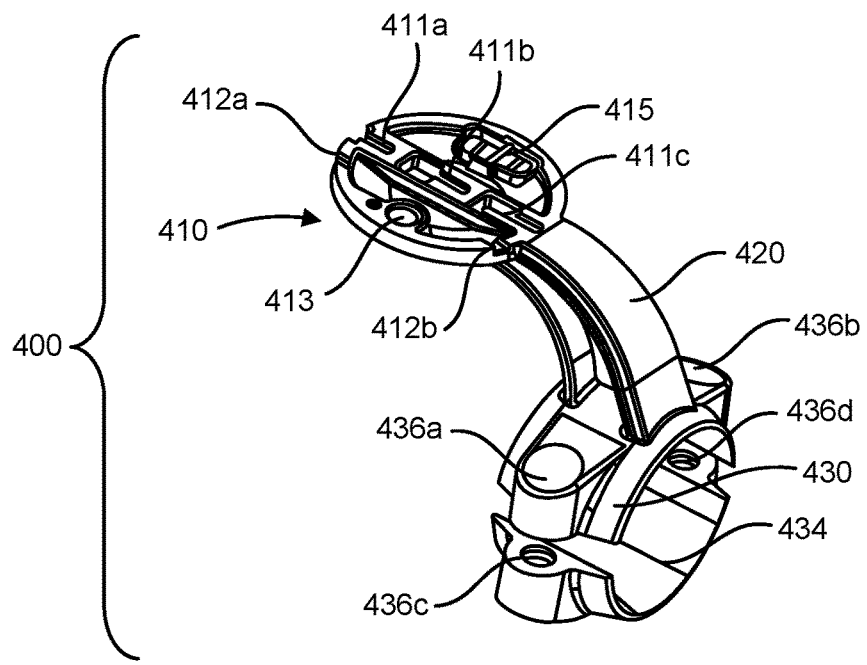
FIG. 4A shows a top perspective view of a bicycle mount configured to be attached to the mount assembly of FIGS. 3A-3I.
Figure 4B:
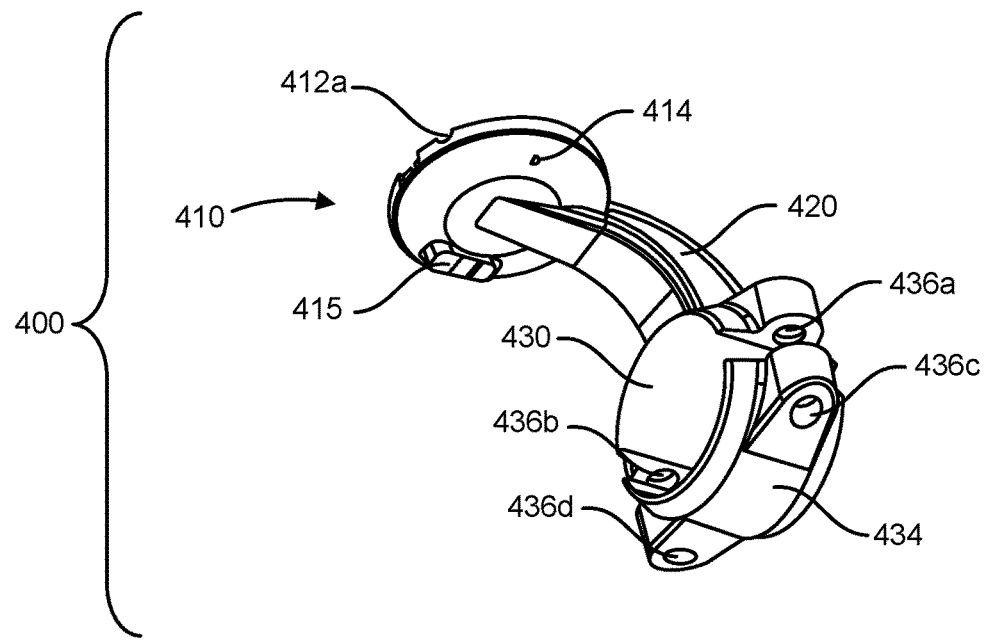
FIG. 4B shows a bottom perspective view of a bicycle mount configured to be attached to any of the mount assembly of FIGS. 3A-3I.

FIGS. 4A and 4B illustrate perspective views of a bicycle mount configured to receive the mount assembly 300 of FIGS. 3A-3H. FIG. 4A shows a top perspective view of the bicycle mount 400, including a mount platform 410 attached to an upper stem clamp element 430 by a mount arm 420. A lower stem clamp element 434 is also depicted exploded from the bicycle mount 400. The bicycle mount 400 can be attached to a handlebar of a bicycle by positioning the upper clamp element 430 and the lower clamp element 434 around the handlebar and securing the upper clamp element to the lower clamp element using screws inserted into one or more clamp screw holes (e.g. 436a, 436b, 436c, 436d) in the clamp elements.

The mount platform 410 includes a plurality of attachment holes (411a, 411b, 411c) that are configured to receive the outer attachment cleats (345a, 345b) and the center attachment cleat 335 of the mount assembly 300. Orientation notches (412a, 412b) are shown in FIG. 4A and interact with the respective orientation ridges (347a, 347b) of the mount assembly 300, ensuring that the mount assembly 300 is attached to the mount platform 410 in the correct orientation. An attachment securing recess 413 can be disposed in the mount platform 410 such that it can receive the button 362 of the attachment securing arm 360 and secure the mount assembly 300 on the mount platform 410. A rocker switch 415 can be disposed in the bottom surface of mount platform 410 such that the rocker switch 415 can be pressed to move and unlock the rotation release arm 342. In some embodiments, the rocker switch 415 may be disposed in a side surface of the mount platform 410 (for example, see FIG. 5B).

FIG. 4B shows a bottom perspective view of the bicycle mount 400, including the rocker switch 415 and an attachment release aperture 414. The attachment release aperture 414 can be appropriately sized to allow a small rod, such as an end of a paperclip, to be inserted into the attachment release aperture to depress the button 362 of attachment securing arm 360, thus allowing the mount assembly 300 to be detached from the mount platform 410.

Figure 5A:
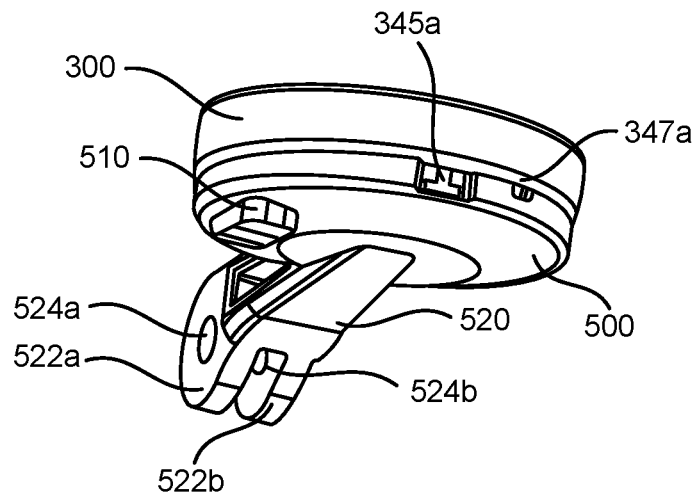
FIG. 5A shows a bottom perspective view of a mount assembly embodiment attached to an embodiment of a mount platform having an arm and fingers extending from an end of the arm.
Figure 5B:
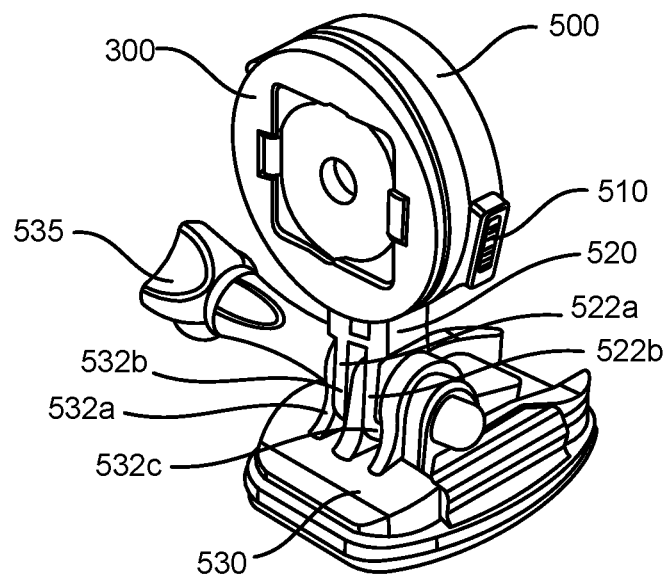
FIG. 5B shows a perspective view of the mount assembly and mount platform of FIG. 5A, the mount platform being attached to a base member with a fastener.

FIG. 5A depicts a mount assembly 300 attached to an embodiment of a mount platform 500. The mount platform 500 can have an arm 520 with a first finger 522a and a second finger 522b extending from an end of the arm. The fingers (522a, 522b) can be configured to interlace with reciprocal fingers (e.g. 532a, 532b, 532c) of another accessory, such as a base with a suction cup base. The arm 520 of the mount platform 500 can be secured to the suction cup base with a securing screw inserted through holes (e.g. 524a, 524b) in the interlaced fingers (e.g. 522a, 522b, 532a, 532b, 532c) of the mount platform and suction cup base. FIG. 5B shows a perspective view of an embodiment of a mount assembly 300 attached to another embodiment of a mount platform 500 in which the rocker switch 510 is disposed on a side surface of the mount platform 500 instead of the bottom surface. The fingers (522a, 522b) extending from the arm 520 of the mount platform 500 are interlaced with reciprocal fingers (532a, 532b, 532c) of a base member 530 having an adhesive coating (e.g. a pressure-sensitive adhesive coating) that allows the base to be affixed to a surface (e.g. wall, dashboard, table, bicycle, helmet, etc.). In one example, acrylic foam tape, such as VHB manufactured by 3M Corporation of Saint Paul, Minn., can be used to secure the base to a surface. A securing screw 535 can be inserted through holes (524a, 524b) in the fingers (522a, 522b) of the mount platform 500 and through holes in the reciprocal fingers (e.g. 532a, 532b, 532c) of the base member to secure and position the mount platform 500 with respect to the base member.

Figure 6A:
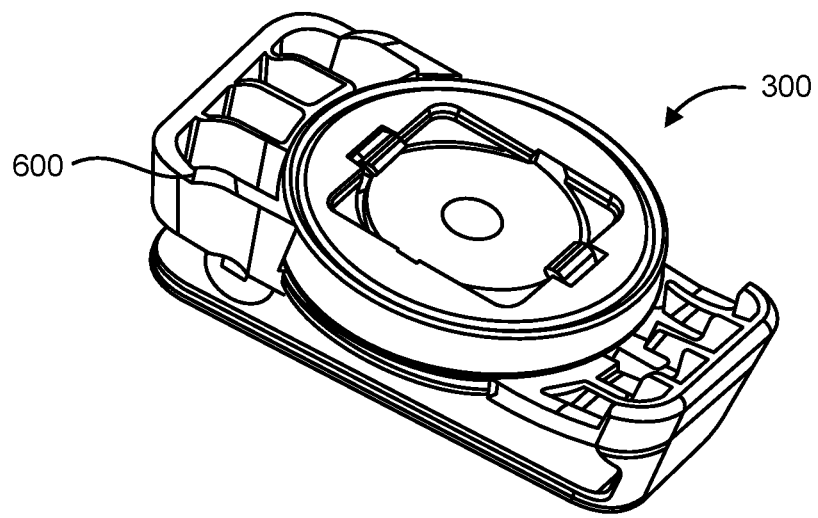
FIG. 6A shows a front perspective view of a belt clip attached to a round mount assembly embodiment.
Figure 6B:
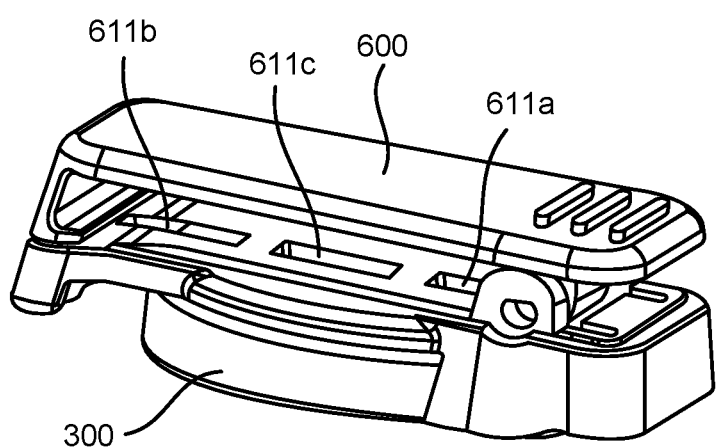
FIG. 6B shows a rear perspective view of the belt clip attached to a round mount assembly.
Figure 6C:
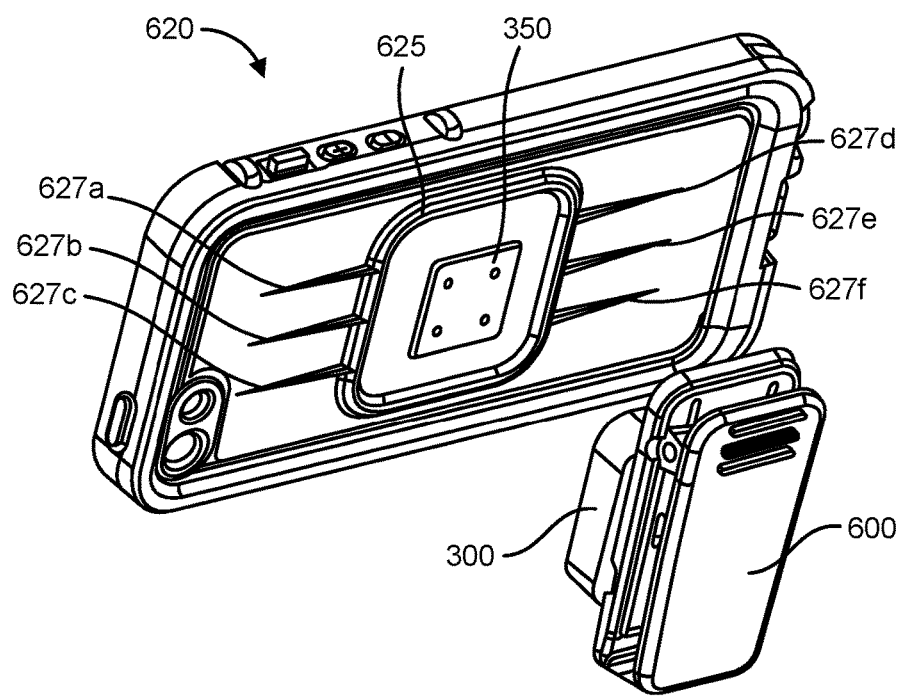
FIG. 6C shows a perspective view of a square mount assembly attached to a belt clip and positioned near a cleat that is attached to an encasement. The encasement has a raised portion that is adapted to align the mount assembly to the cleat.

FIG. 6A shows a front perspective view of a mount assembly 300 attached to a belt clip 600. FIG. 6B shows a rear perspective view of the mount assembly 300 attached to the belt clip 600, with attachment holes (611a, 611b, 611c) visible in the belt clip. FIG. 6C shows a perspective view of a mount assembly 300 attached to belt clip 600 and detached from a mobile device encasement 620. The mount assembly 300 can have a square perimeter, as shown in FIG. 6C. On having ordinary skill in the art will recognize that the outer perimeter may, in fact, have any of several geometric shapes, including round, oval, polygon (triangle, pentagon, etc.), combinations thereof, etc. The mobile device encasement 620 can include a mounting cleat 350 and, in some embodiments, can be surrounded by a centering ridge 625. The circumference of the centering ridge 625 can be configured to surround the circumference of the mount assembly 300. The centering ridge 625 can be flanked by one or more ramp ridges (627a, 627b, 627c, 627d, 627e, 627f) extending from the back surface of the encasement. The one or more ramp ridges 627a-f can assist a user when attempting to engage the mount assembly 300 with the mounting cleat 350 by guiding the mount assembly 300 toward the location of the mounting cleat within the centering ridge.

Figure 7A:
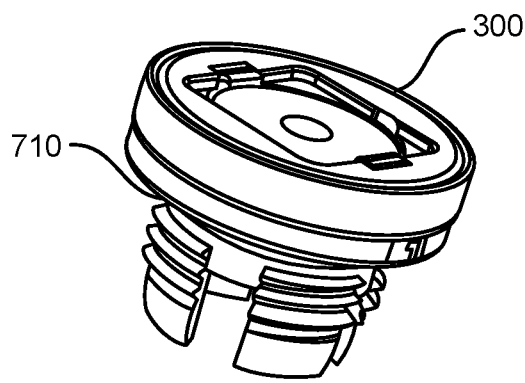
FIG. 7A shows a front perspective view of a round mount assembly embodiment attached to a threaded socket for attaching to a ball joint accessory.
Figure 7B:
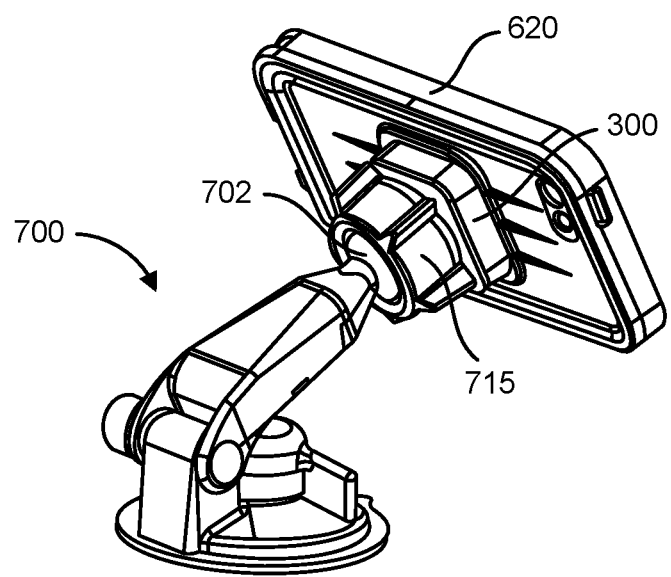
FIG. 7B depicts a perspective view of a square mount assembly on a threaded socket and attached to an encasement having a cleat. The threaded socket is attached to a ball joint on an adjustable suction cup base.

FIG. 7A shows a perspective view of a round mount assembly 300 attached to a threaded socket 710. FIG. 7B shows the threaded socket member 710 (not visible) attached to a ball joint 702 connected to an adjustable base 700. A threaded constriction ring 715 is threaded onto the threaded socket member 710. When tightened, the threaded constriction ring 715 secures the threaded socket member 710 into different positions relative to the ball joint 702, thereby allowing a user to alter the orientation or positioning of the encasement 620 to improve the user's ability to view or interact with the electronic device housed within the encasement. The mount assembly 300 can have any suitable perimeter shape. For example, the mount assembly 300 can have a round perimeter shape as depicted in FIG. 7A or a square perimeter shape as depicted in FIG. 7B.

Figure 8A:
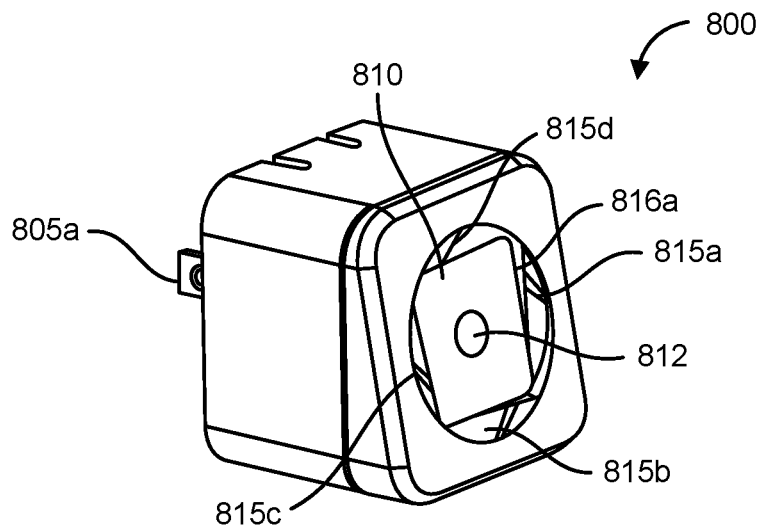
FIG. 8A shows a front perspective view of a wall charger having a magnetic mounting recess, the recess adapted to removably secure a square cleat.
Figure 8B:
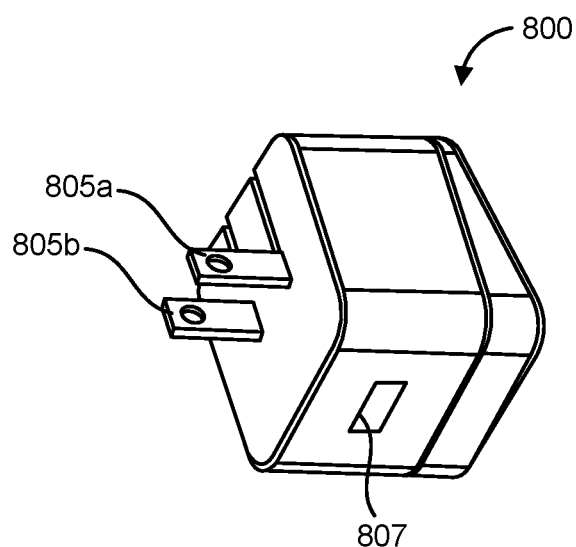
FIG. 8B shows a bottom perspective view of the wall charger of FIG. 8A.

In some instances, it is desirable to reversibly secure a mobile electronic device, such as a smartphone or tablet, to a plug for charging and receiving power or data. A mounting cleat as described above that is ferromagnetic or includes a magnet may be used with a power adapter that includes a magnet or is ferromagnetic. FIG. 8A depicts a power adapter 800 with plug tines (805a, 805b) that may be able to fold flat into the adapter for storage. Power adapter 800 includes a recess 810 having an attraction element 812 (such as a magnet or a ferromagnetic element), a plurality of ramps (815a, 815b, 815c, 815d). Each ramp (e.g. 815a-d) includes a lateral face (816a, 816b, 816c, 816d) (only 816a is visible) oriented toward the interior of the recess 810, such that when a mounting cleat (such as mounting cleat 350) having one or more flat edges on its circumference is inserted into the recess, the cleat cannot be rotated in the direction of the lateral faces but can be rotated in the opposite direction. When rotated in the direction opposite the lateral faces 816a-d, the mounting cleat slides up each of the ramps 815a-d and separates from the recess 810, facilitating separation of the magnetic and ferromagnetic portions of the mounting cleat and the power adapter 800. FIG. 8B shows a bottom perspective view of the power adapter 800. The power adapter 800 includes a connection port 807, such as a USB port or LIGHTNING port, to which a mobile electronic device may be connected with a cable. In certain embodiments, the power adapter may include electrical contacts that match corresponding electrical contacts disposed on the mounting cleat, and that connect through the cleat, through an attached encasement, and with an encased electronic device. In some embodiments, the cleat may be attached directly to an electronic device and include electrical contacts that connect with a power source of the electronic device to allow charging of the electronic device.

In some embodiments, the power adapter 800 may include an induction coil. A reciprocal induction coil may be included in the encasement (e.g. 620) or in a mobile electronic device itself, and can be configured to be in electrical communication with a mobile electronic device encased in the encasement. The power adapter can then charge the encased mobile electronic device via the power adapter 800 when the encasement (e.g. 620) is mounted on the power adapter.

Figure 9A:
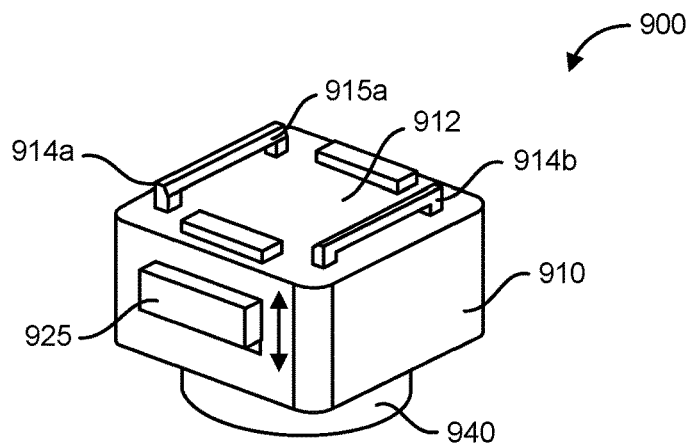
FIG. 9A shows a top perspective view of a mount assembly embodiment.
Figure 9B:
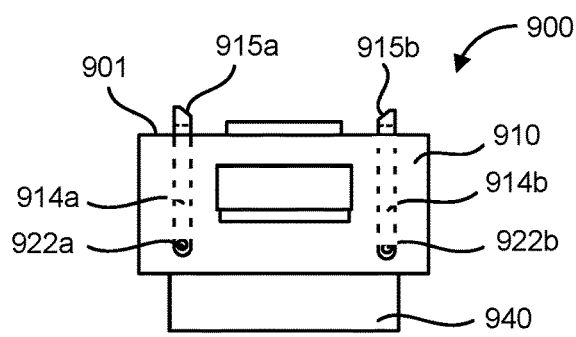
FIG. 9B shows a side view of the mount assembly of FIG. 9A.
Figure 9C:
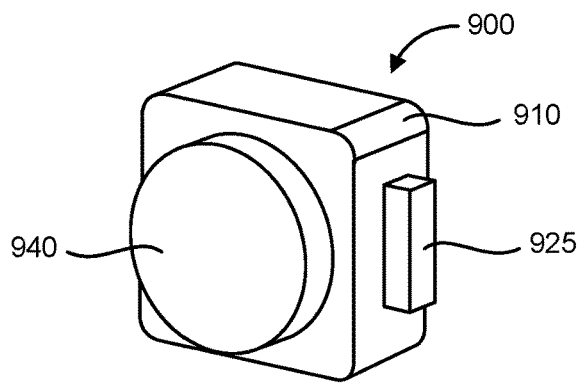
FIG. 9C shows a bottom perspective view of the mount assembly of FIG. 9A.

FIG. 9A shows a mount assembly 900 for attaching a first item to a second item, such as for attaching an encasement 920 for a mobile electronic device to a bicycle, vehicle, wall, etc. The mount assembly 900 can include a top housing 910 and a bottom housing 940. The top housing 910 can be rotatably connected to the bottom housing 940 to form an enclosure capable of encasing or supporting a plurality of components that enable the mount assembly 900 to engage and disengage a mounting cleat 950 (shown in FIG. 9D). FIG. 9B depicts a side view of the mount assembly 900, in which the housing 905 can house a first axle 922a and a second axle 922b. A first clasp mechanism 914a can be installed on, or otherwise mechanically connected to, the first axle 922a. Likewise, a second clasp mechanism 914b can be installed on, or otherwise mechanically connected to, the second axle 922b. As shown in FIG. 9B, a portion of the first clasp mechanism 914a can extend beyond a top surface 901 of the top housing 910. Similarly, the second clasp mechanism 914b can extend beyond the top surface 901 of the top housing 910. The first clasp mechanism 914a can include a first slanted surface 915a, and the second clasp mechanism can include a slanted surface 915b. A first spring (not shown) can be disposed within the mount assembly 900 and can exert a force against the first clasp mechanism 914a. Specifically, the first spring can exert a force against the first clasp mechanism that urges the first slanted surface 915a toward the second slanted surface 915b. Similarly, a second spring (not shown) can be disposed within the mount assembly 900 and can apply a force against the second clasp mechanism 914b. Specifically, the second spring can exert a force against the second clasp mechanism 914b that urges the second slanted surface 915b toward the first slanted surface.

During attachment of, for example, an encasement 920 for a mobile electronic device to the mount assembly 900, the mounting cleat 950 affixed to or integrated with a back surface of the encasement can be positioned against the first and second slanted surfaces (915a, 915b) of the first and second clasp mechanisms (914a, 914b), respectively. Pressure can be applied to the encasement 920 to force the first and second slanted surfaces (915a, 915b) away from each other to permit the mounting cleat 950 to be depressed into a recess 912 located between the first and second clasp mechanisms. Once the mounting cleat 950 is fully depressed into the recess 912, the first spring can urge the first clasp mechanism 914*a* toward the second clasp mechanism 914*b*, thereby resulting in the first slanted surface 915*a* seating in a first undercut 951 in the mounting cleat 950. Similarly, once the mounting cleat 950 is fully depressed into the recess 912, the second spring can urge the second clasp mechanism 914*b* toward the first clasp mechanism, thereby resulting in the second slanted surface 915*b* seating in a second undercut 952 in the mounting cleat 950. When the first and second slanted surfaces (915*a*, 915*b*) are seated in the first and the second undercuts (951, 952), the mounting cleat 950 is effectively captured by the mount assembly. To free the mounting cleat 950 from the mount assembly 900, the top housing 910 can be rotated relative to the bottom housing 940, which can cause a cam (not shown) disposed within the mount assembly to engage the first and second clasp mechanisms (914*a*, 914*b*) and force the first and second slanted surfaces (915*a*, 915*b*) away from each other, thereby unseating the first and second clasp mechanisms from the first and second undercuts (951, 952), respectively, and freeing the mounting cleat.

In one example shown in FIG. 9A, the mount assembly can include a lock switch 925. The lock switch 925 can be configured to prevent the mounting cleat 950 from being removed from the recess 912. In one example, the lock switch 925 can accomplish this objective by preventing relative rotation of the top and bottom housings (910, 940), thereby preventing the cam from engaging the first and second clasp mechanisms.

Figure 9D:
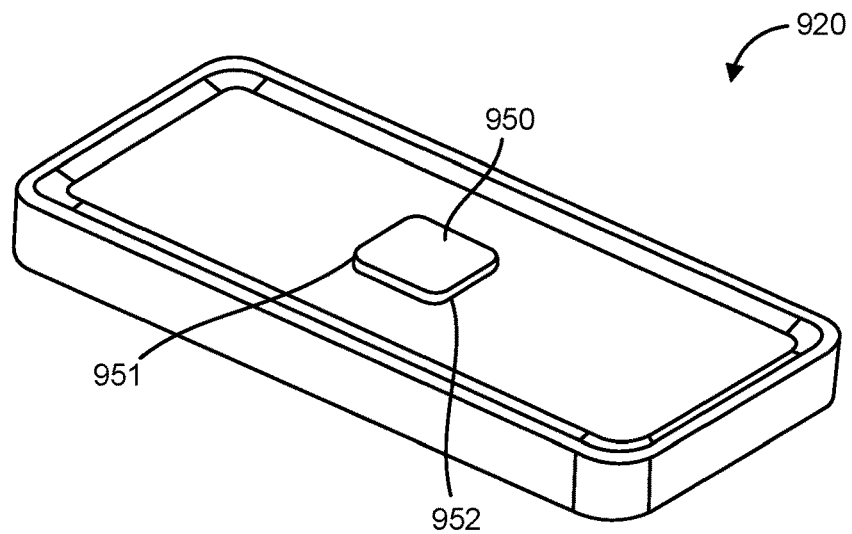
FIG. 9D shows a rear perspective view of a protective case for a mobile electronic device, the case having a cleat attached thereto, the cleat configured to releasably interact with the mount assembly of FIG. 9A.
Figure 9E:
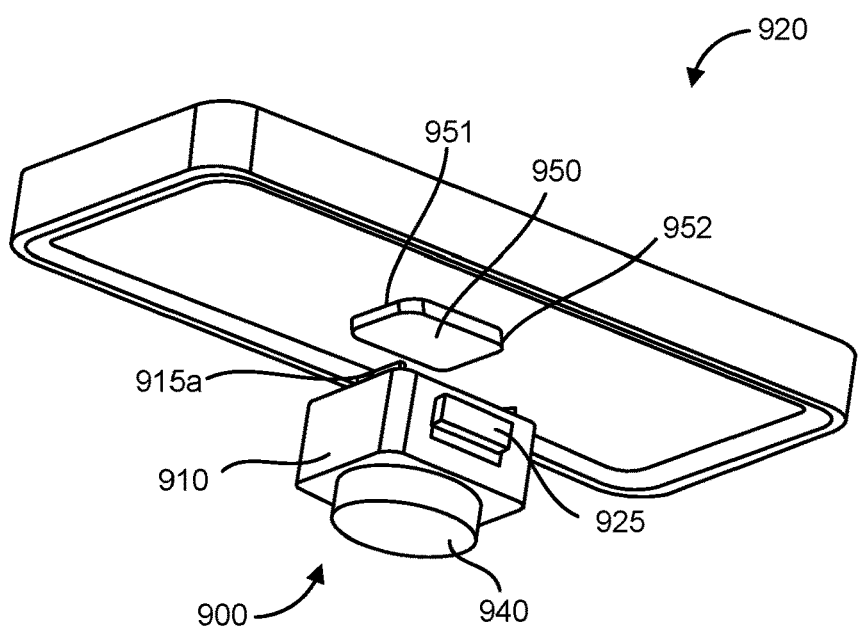
FIG. 9E shows a rear perspective view of a protective case for a mobile electronic device and the mount assembly of FIG. 9A, the case having a cleat attached thereto, the cleat configured to releasably interact with the mount assembly.

The mounting cleat 950, illustrated in FIGS. 9D-9E and applicable to other embodiments disclosed here, has undercuts 951, 952 with corresponding overhangs, thus may be prone to snagging on items (e.g. articles of clothing) and may therefore be more difficult to insert into a user's pocket than would be an encasement without a mounting cleat. To overcome this problem, a mounting cleat cover (not shown) can be provided. The mounting cleat cover can be configured to fit snugly over the mounting cleat to conceal the mounting cleat when it is not being used for mounting the encasement to a mount assembly. In some examples, the mounting cleat cover can have smooth, contoured surfaces to allow the encasement to slide easily into a user's pocket.

Figure 10A:
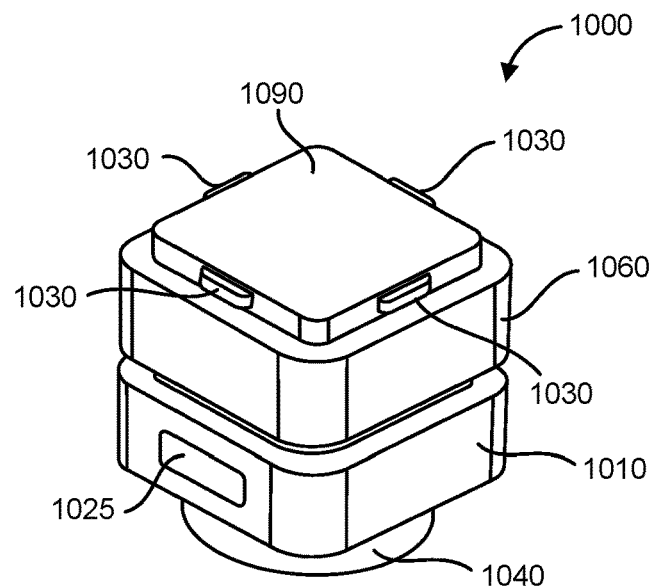
FIG. 10A shows a top perspective view of a mount assembly embodiment.
Figure 10B:
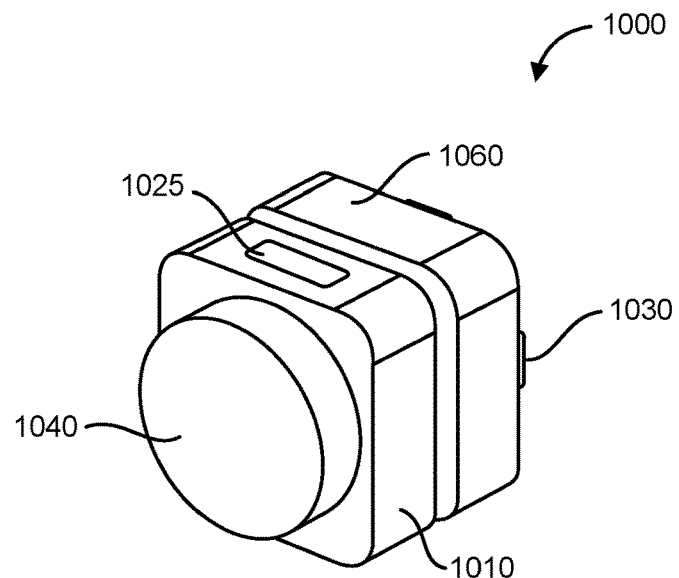
FIG. 10B shows a bottom perspective view of the mount assembly of FIG. 10A.
Figure 10C:
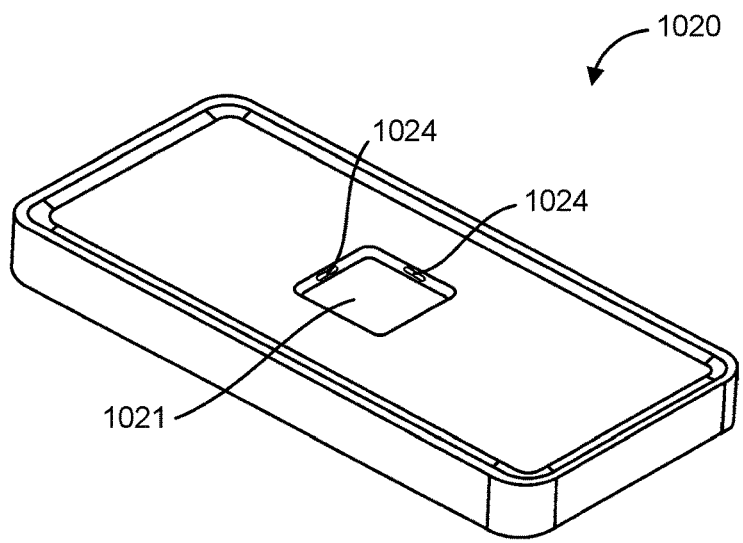
FIG. 10C shows a rear perspective view of an encasement for a mobile electronic device, the encasement having a pocket to receive the mount assembly of FIG. 10A.

Alternately, the mounting cleat may be moved to the mount assembly, as illustrated in FIGS. 10A-10E. FIG. 10A shows a mount assembly 1000 for attaching a first item to a second item, such as for attaching an encasement 1020 (see FIG. 10E) for a mobile electronic device to a bicycle, vehicle, wall, etc. The mount assembly 1000 can include a top housing 1010, a twist housing 1060 and a bottom housing 1040. To solve the same problem discussed above, it may be desirable to provide a pocket 1021 in a rear surface of an encasement 1020 as shown in FIG. 10C instead of the encasement having a mounting cleat 950 as shown in FIG. 9E. Therefore, instead of having a female mount assembly that receives a male mounting cleat 950 as shown in FIG. 9E, a male mount assembly 1000 can be provided that engages a female pocket 1021.

In this embodiment, the female pocket 1021 can include one or more notches 1024 (see FIG. 10C) configured to receive one or more teeth 1030 (see FIG. 10A) extending from a peripheral surface of a cleat portion 1090 of the mount assembly 1000. The cleat portion 1090 is attached to, or integrated with, the twist housing 1060. The teeth 1030 extending from the mount assembly 1000 can be retracted to permit insertion and removal of the mount assembly into and from, respectively, the pocket 1021. In one example, a spring-loaded detent (e.g. ball detent) can be installed in the twist housing 1060 behind each of the teeth, thereby permitting each tooth 1030 to be pressed inward toward a centerline axis of the mount assembly 1000 to permit the mount assembly to be installed in the pocket 1021 without interference. Twist portion 1060 may turn, about a central axis, with respect to top portion 1010 and bottom portion 1040. A mechanism in the twist housing 1060 facilitates the retraction of the teeth 1030.

Figure 10D:
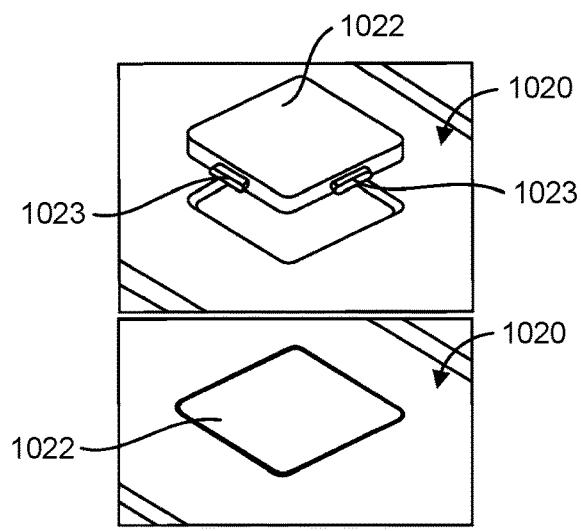
FIG. 10D shows a rear perspective view of the encasement of FIG. 10C with a pocket plug uninstalled and installed in the pocket of the encasement.

As shown in FIG. 10D, the pocket 1021 in the encasement 1020 can be concealed with a pocket plug 1022. The pocket plug 1022 can improve the appearance of the encasement 1020 and can also prevent debris, such as dust and pocket lint from accumulating in the pocket 1021 over time. The upper drawing of FIG. 10D depicts the pocket plug 1022 positioned above the pocket 1021 prior to installation and the lower drawing of FIG. 10D depicts the pocket plug 1022 fully inserted into the pocket 1021. The pocket plug 1022 can include one or more teeth 1023 extending outwardly from the pocket plug. As shown in the upper drawing of FIG. 10C, the pocket plug 1022 can include four teeth 1023 extending outwardly from the pocket plug. Each of the teeth can be configured to engage a notch 1024 disposed in the pocket 1021. After the pocket plug 1022 has been inserted into the pocket 1021, the pocket plug can be removed with a tool, such as a flat blade. Alternately, the pocket plug 1022 can include a finger recess (not shown) along a peripheral edge of the pocket plug that allows a user's finger to easily engage and remove the pocket plug from the pocket 1021.

Figure 10E:
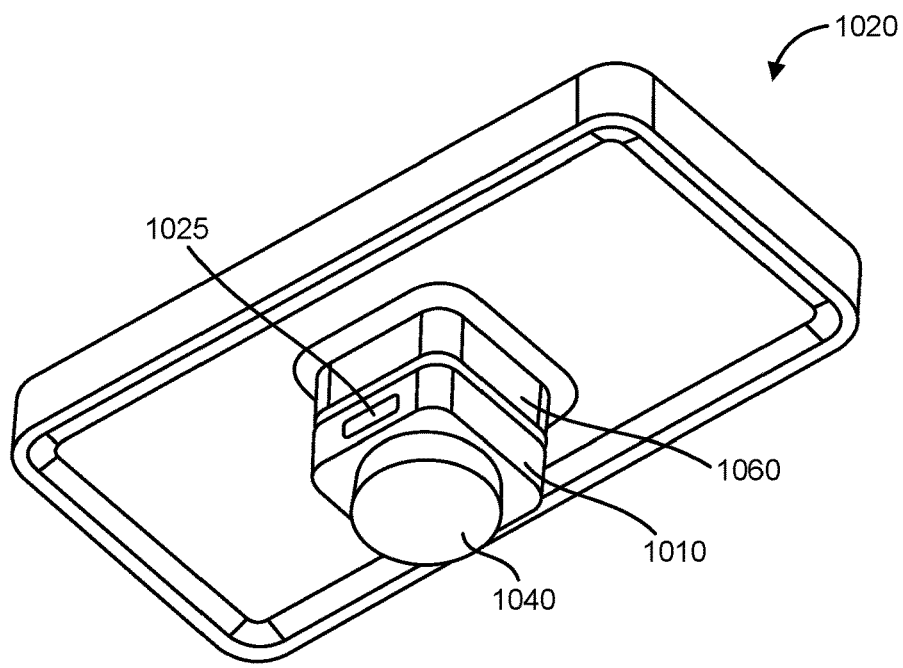
FIG. 10E shows a rear perspective of the encasement of FIG. 10C connected to the mount assembly of FIG. 10A.

FIG. 10E shows the mount assembly 1000 attached to the encasement 1020. The mount assembly can include a lock switch 1025. The lock switch 1025 can be configured to prevent the mount assembly 1000 from disengaging from the encasement 1020 during use (e.g. when the encasement is mounted to a bicycle by the mount assembly). In one example, the lock switch 1025 can accomplish this objective by preventing the teeth 1030 from retracting inward toward the centerline axis of the mount assembly 1000. For example, the lock switch 1025 may prevent the twist housing 1060 from turning with respect to top housing 1010.

In another example, illustrated in FIGS. 11A-11E, the mount assembly 1100 can include a button or switch 1116*a*, 1116*b* that, when pressed or activated by the user, retracts teeth 1130 to permit insertion and removal of the mount assembly into and from, respectively, the pocket 1051. Retraction of the teeth 1130 can be accomplished by a mechanical linkage, magnetic attraction, or an electromechanical device. In one non-illustrated example, the electromechanical device can be activated by a switch. In another example, the electromechanical device can be activated using the mobile electronic device (e.g. by making a selection in an application operating on the mobile electronic device by providing an input to a touchscreen display of the mobile electronic device). To permit an electrical signal to be transferred from the mobile electronic device to the electromechanical device, the mount assembly can include a power or data connection as shown in FIGS. 2E and 2F or in FIGS. 8A and 8B. Alternately, the mobile electronic device can transmit a signal wirelessly to the electromechanical device, such as through BLUETOOTH or other wireless protocol, to, e.g., retract the teeth 1130.

Figure 11A:
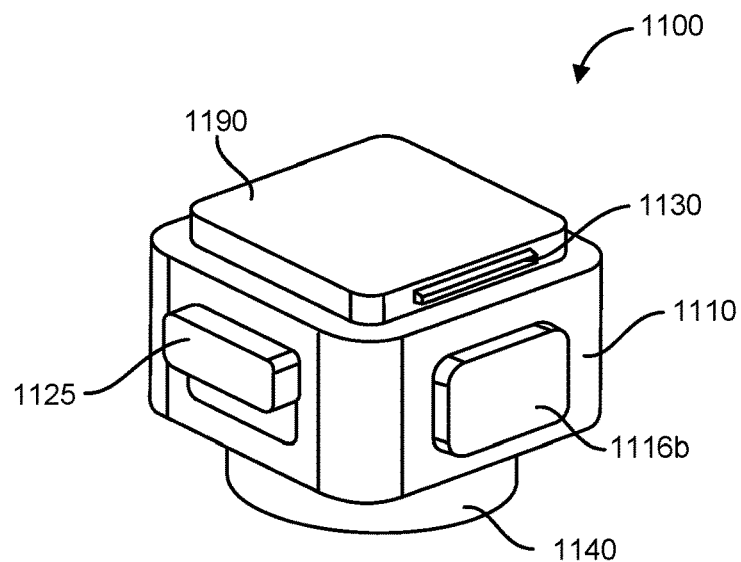
FIG. 11A shows a top perspective view of a mount assembly embodiment.

FIG. 11A shows a top perspective view of a mount assembly 1100 for attaching a first item to a second item, such as for attaching an encasement 1120 (see FIG. 11D) for a mobile electronic device to a bicycle, vehicle, wall, etc. In one example, the mount assembly 1100 can include a top housing 1110 connected to a bottom housing 1140 to form an enclosure capable of encasing or supporting a plurality of components that enable a cleat portion 1190 of the mount assembly 1100 to engage and disengage a pocket 1121, such as a pocket located in an encasement 1120 for a mobile electronic device, as shown in FIG. 11D. The pocket 1121 can include a first undercut 1124 configured to receive a first clasp mechanism 1114a extending from the cleat portion 1190 of the mount assembly 1100. Likewise, the pocket 1121 can include a second undercut (not shown) configured to receive a second clasp mechanism 1114b extending from the cleat portion 1190 of the mount assembly 1100.

Figure 11B:
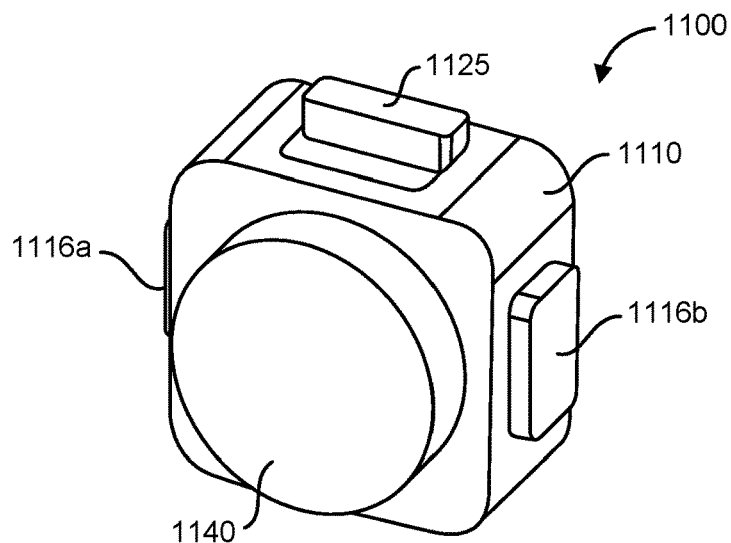
FIG. 11B shows a bottom perspective view of the mount assembly of claim 11A.

FIG. 11B shows a bottom perspective view of the mount assembly 1100 of FIG. 11A. The mount assembly 1100 can include a lock switch 1125. The lock switch 1125 can be configured to prevent the mount assembly 1100 from disengaging from the encasement 1120 during use (e.g. when the encasement is mounted to a bicycle by the mount assembly). In one example, the lock switch 1125 can accomplish this objective by preventing the first and second clasp mechanisms (1114a, 1114b) from retracting into the cleat portion 1190 of the mount assembly even if pressure is applied to the first and second buttons (1116a, 1116b).

Figure 11C:
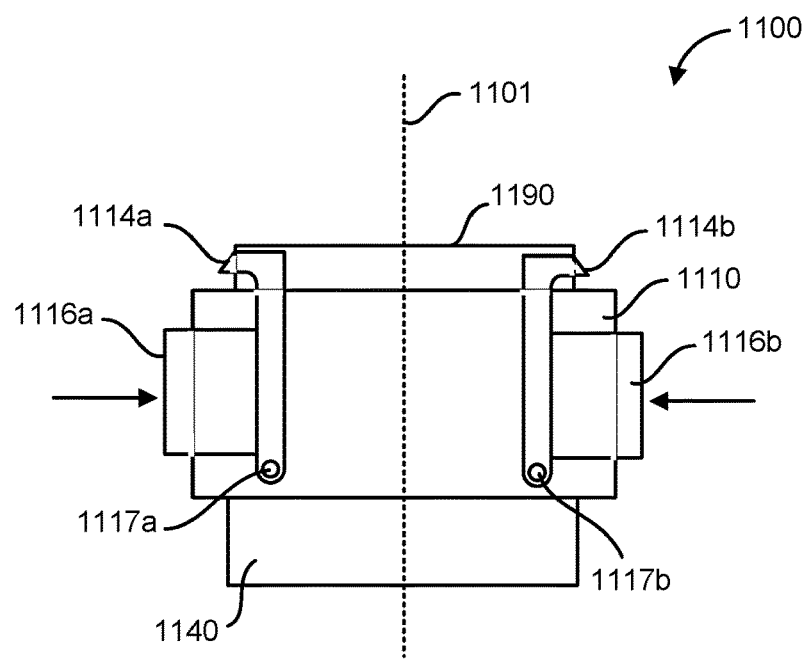
FIG. 11C shows a side sectional view of the mount assembly of FIG. 11A.
Figure 11D:
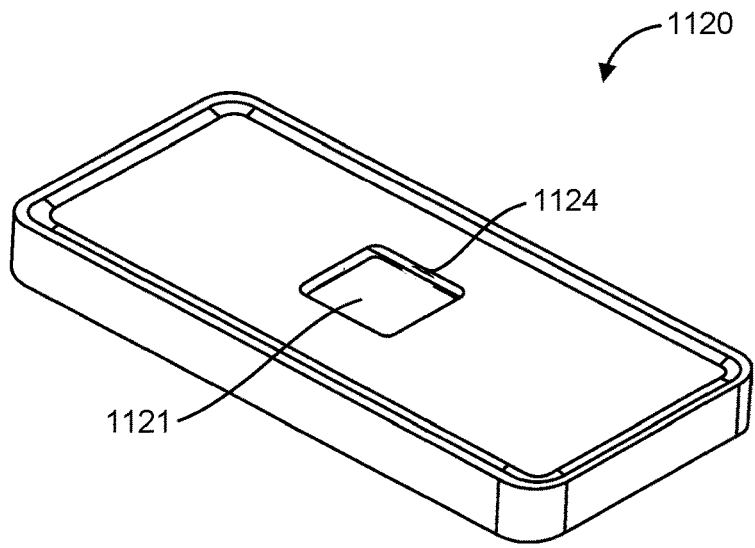
FIG. 11D shows a rear perspective view of an encasement for a mobile electronic device having a pocket.

FIG. 11C shows a side sectional view of the mount assembly 1100 of FIG. 11A. The first clasp mechanism 1114a can be installed on a first axle 1117a or otherwise attached by a hinge within the mount assembly 1100. When a first button 1116a extending from the first clasp mechanism 1114a is depressed, the first clasp mechanism can pivot inward toward a centerline axis 1101 of mount assembly 1100, thereby causing the first clasp mechanism to retract within the cleat portion 1190 of the mount assembly. Upon releasing pressure from the first button 1116a, a first spring (not shown) coupled to the first clasp mechanism can exert a force on the first clasp mechanism that causes the first clasp mechanism to resume its resting position as depicted in FIG. 11C. Similar to the first clasp mechanism, the second clasp mechanism 1114b can be installed on a second axle 1117b or otherwise attached by a hinge within the mount assembly 1100. When a second button 1116b extending from the second clasp mechanism 1114b is depressed, the second clasp mechanism can pivot inward toward a centerline axis 1101 of mount assembly 1100, thereby causing the second clasp mechanism to retract within the cleat portion 1190 of the mount assembly 1100. Upon releasing pressure from the second button 1116b, a second spring coupled to the first clasp mechanism can exert a force on the second clasp mechanism that caused the second clasp mechanism to resume its resting position as depicted in FIG. 11C.

Figure 11E:
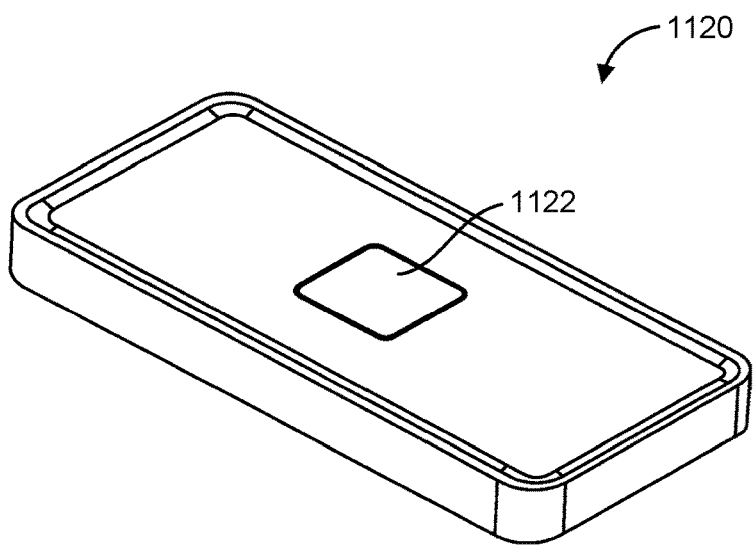
FIG. 11E shows a rear perspective view of the encasement of FIG. 11D having a pocket plug installed in the pocket.

As shown in FIG. 11E, the pocket 1121 (see FIG. 11D) in the encasement 1120 can be concealed with a pocket plug 1122. The pocket plug 1122 can improve the appearance of the encasement 1120 and can also prevent debris, such as dust and pocket lint from accumulating in the pocket 1121 over time. FIG. 11E depicts the pocket plug 1122 fully inserted into the pocket 1021. The pocket plug 1122 can include one or more tabs extending outwardly from the pocket plug. In the example shown in FIG. 11D, the pocket plug 1122 can include two tabs extending outwardly from the pocket plug. Each of the tabs can be configured to engage an undercut (e.g. 1124) disposed in the pocket 1121. After the pocket plug 1122 has been inserted into the pocket 1121, the pocket plug can be removed with a tool, such as a flat blade. Alternately, the pocket plug 1122 can include a finger recess (not shown) along a peripheral edge of the pocket plug that allows a user's finger to easily engage and remove the pocket plug from the pocket 1121.

Figure 12A:
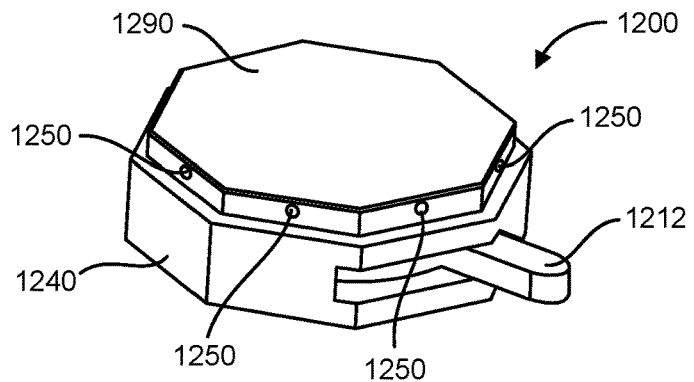
FIG. 12A shows a top perspective view of a mount assembly embodiment.
Figure 12B:
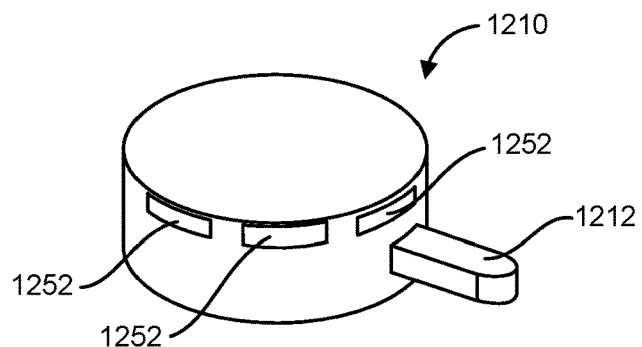
FIG. 12B shows an inner assembly of the mount assembly of FIG. 12A.
Figure 12C:
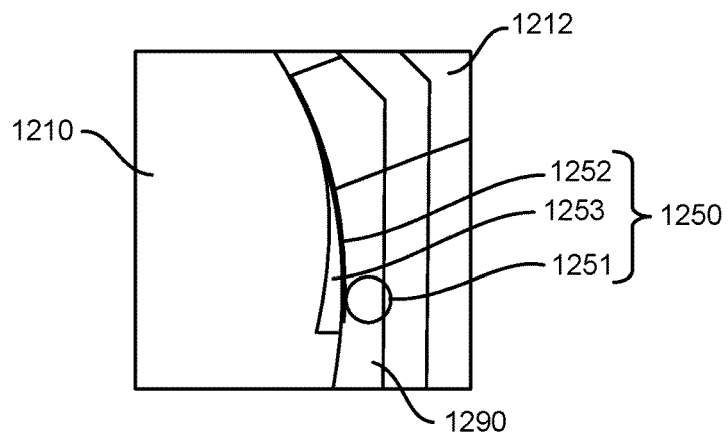
FIG. 12C shows a top sectional view of the mount assembly of FIG. 12A, thereby exposing a spring-loaded detent of the inner assembly.

FIG. 12A shows a top perspective view of a mount assembly 1200 for attaching a first item to a second item, such as for attaching an encasement for a mobile electronic device to a bicycle, vehicle, wall, etc. As shown in FIGS. 12A and 12B, the mount assembly 1200 can include an inner assembly 1210 disposed within an outer housing 1240. The outer housing 1240 can include a cleat portion 1290 that is capable of engaging and disengaging a pocket, such as a pocket located in an encasement for a mobile electronic device. A plurality of spring-loaded extensions 1250 (e.g. ball extensions) can be configured to extend and retract from a peripheral surface of the cleat portion 1290, as shown in FIG. 12A. One of the spring-loaded extensions 1250 is shown in detail in FIG. 12C. The spring-loaded extension 1250 can include a ball 1251 (e.g. steel ball) positioned in contact with a spring member 1252. The spring member 1252 can extend adjacent to a cavity 1253 in the inner assembly 1210, as shown in FIGS. 12B and 12C. When a lever 1212 extending from the inner assembly 1210 is in a first position, as shown in FIGS. 12A and 12C, the spring member 1252 is biased outward from the cavity 1253 and applies an outward force against the ball 1251, which maintains the ball in an extended position whereby a portion of the ball extends beyond the peripheral surface of the cleat portion 1290. When the lever is moved to a second position, the spring member 1252 is pressed into the cavity 1253, which allows the ball 1251 to retract from the peripheral surface of the cleat portion 1290, thereby permitting the cleat portion to be installed into or removed from the pocket.

Figure 13A:
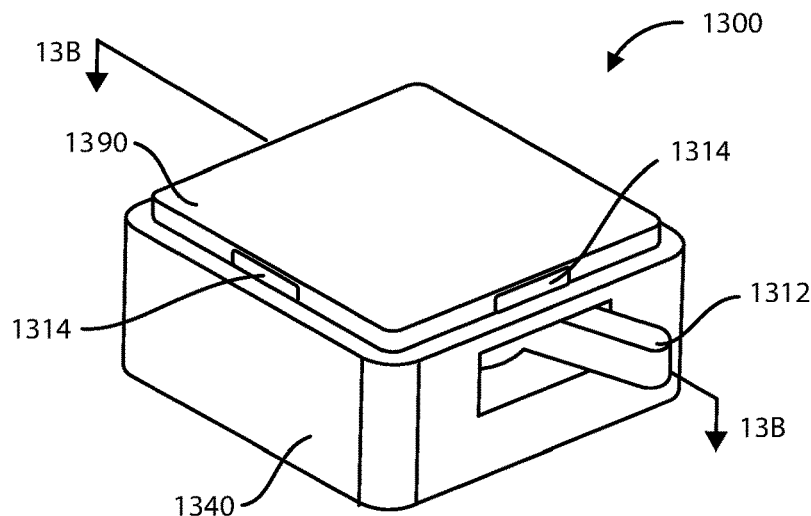
FIG. 13A shows a perspective view of a mount assembly embodiment.
Figure 13B:
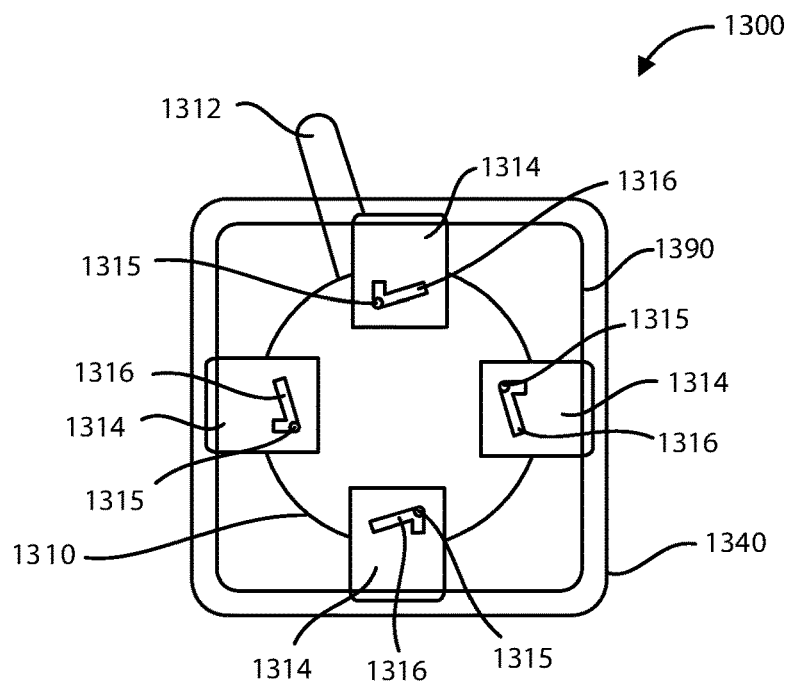
FIG. 13B shows a top sectional view of the mount assembly of FIG. 13A.

FIG. 13A shows a top perspective view of a mount assembly 1300 for attaching a first item to a second item, such as for attaching an encasement for a mobile electronic device to a bicycle, vehicle, wall, etc. FIG. 13B shows a top cross-section view of the mount assembly. As shown in FIGS. 13A and 13B, the mount assembly 1300 can include an inner assembly 1310 disposed within an outer housing 1340. The outer housing 1340 can include a cleat portion 1390 that is capable of engaging and disengaging a pocket, such as a pocket located in an encasement for a mobile electronic device. A plurality of engagement mechanisms 1314 can be configured to extend from and retract from a peripheral surface of the cleat portion 1390, as shown in FIG. 13B, when a lever 1312 is moved from a first position to a second position. In one example, engagement pins 1315 extending from the inner assembly 1310 can interact with engagement slots 1316 located in each of the engagement mechanisms 1314 such that when the lever is transitioned from a first position (shown in FIGS. 13A and 13B) to a second position, the engagement mechanisms are forced from an extended position (shown in FIGS. 13A and 13B) to a retracted position. When the engagement mechanisms 1314 are in the retracted position, the cleat portion 1390 can be installed into or removed from the pocket. When the engagement mechanisms 1314 are in the extended position, the cleat portion can be locked within the pocket.

Figure 14A:
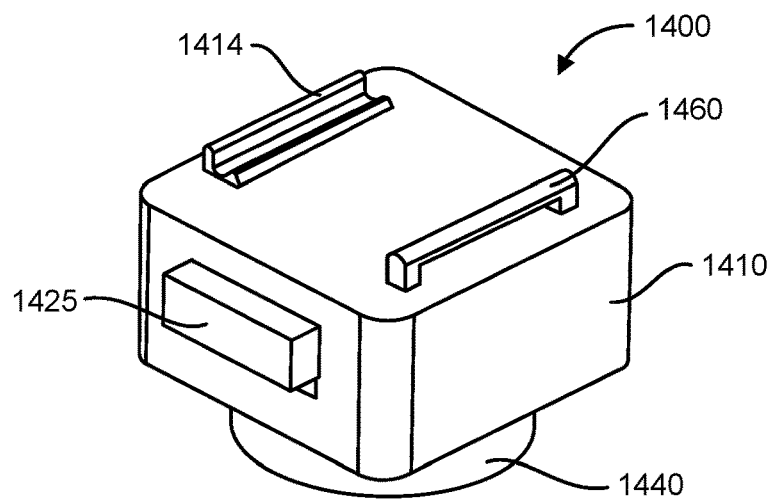
FIG. 14A shows a top perspective view of mount assembly embodiment.
Figure 14B:
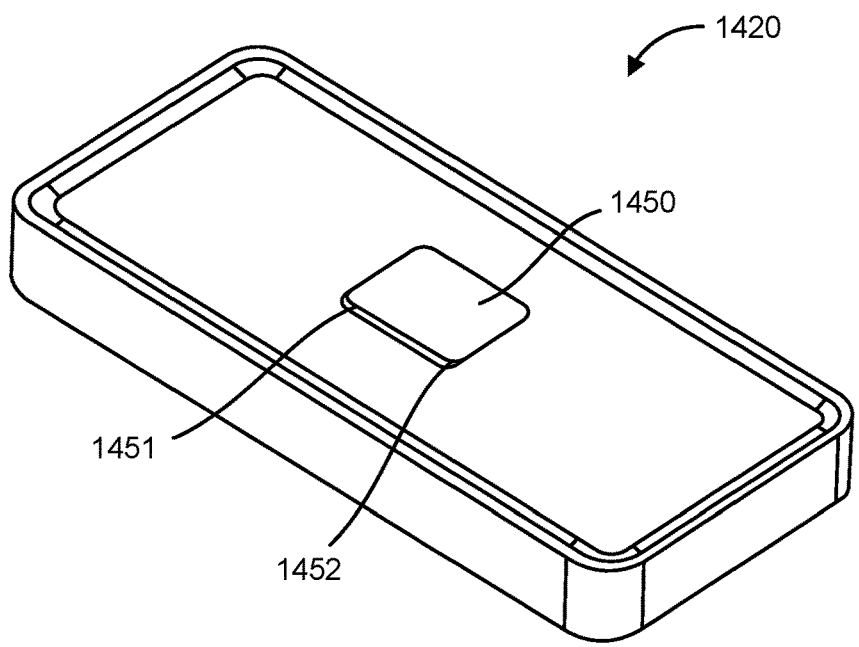
FIG. 14B shows an encasement for a mobile electronic device, the encasement having a mounting cleat that is configured to attach to the mount assembly of FIG. 14A.

FIG. 14A shows a top perspective view of a mount assembly 1400. In one example, the mount assembly 1400 can be used for attaching a first item to a second item, such as for attaching an encasement for a mobile electronic device to a bicycle, vehicle, wall, etc. The mount assembly 1400 can include a top housing 1410 and a bottom housing 1440. The top housing 1410 can be rotatably connected to the bottom housing 1440 to form an enclosure capable of encasing or supporting a plurality of components that enable the mount assembly 1400 to engage and disengage a mounting cleat 1450, which is shown in FIG. 14B. The mounting cleat 1450 can include a first undercut 1451 and a second undercut 1452 that permit the cleat to be captured by the mount assembly 1400.

The mount assembly 1400 can house a first axle. A first clasp mechanism 1414 can be installed on, or otherwise mechanically connected to, the first axle. As shown in FIG. 14A, a portion of the first clasp mechanism 1414 can extend beyond a top surface of the top housing 1410. The mount assembly 1400 can also include a catch feature 1460 extending beyond the top surface of the top housing 1410. When engaging the mounting cleat to the mount assembly 1400, the first undercut 1451 of the mounting cleat 1450 can be tucked under the catch feature 1460. Then, the second undercut 1452 can be pressed downward against the first clasp mechanism 1414. Similar to a downhill ski binding, the first clasp mechanism can pivot toward the catch mechanism to engage the second undercut 1452, thereby capturing the mounting cleat 1450.

To free the mounting cleat 1450 from the mount assembly 1400, the top housing 1410 can be rotated relative to the bottom housing 1440, which can cause a cam (not shown) disposed within the mount assembly to engage the first clasp mechanism (1414) and cause the first clasp mechanism to pivot away from the catch feature 1460, thereby freeing the mounting cleat 1450 from the mount assembly.

As shown in FIG. 14A, the mount assembly 1400 can include a lock switch 1425. The lock switch 1425 can be configured to prevent the mounting cleat 1450 from inadvertently disengaging from the mount assembly 1400 during use (e.g. while riding a mountain bike on rough terrain). In one example, the lock switch 1425 can accomplish this objective by preventing relative rotation of the top and bottom housings (1410, 1440), thereby preventing a cam from engaging the first clasp mechanism and releasing the mounting cleat 1450.

Figure 15A:
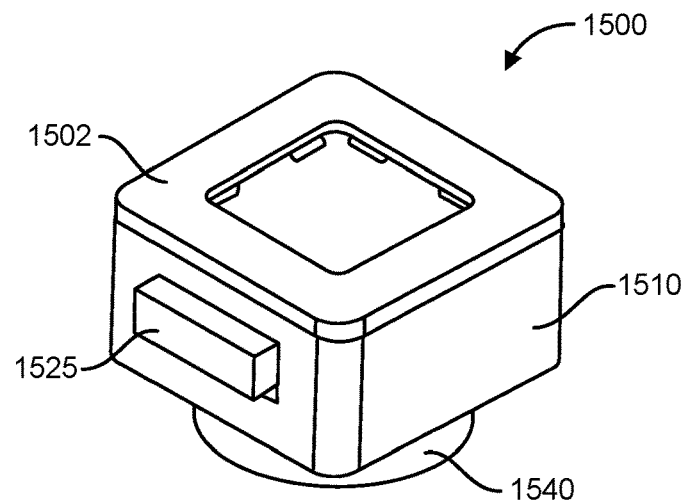
FIG. 15A shows a top perspective view of a mounting cleat attached to a mount assembly embodiment.
Figure 15B:
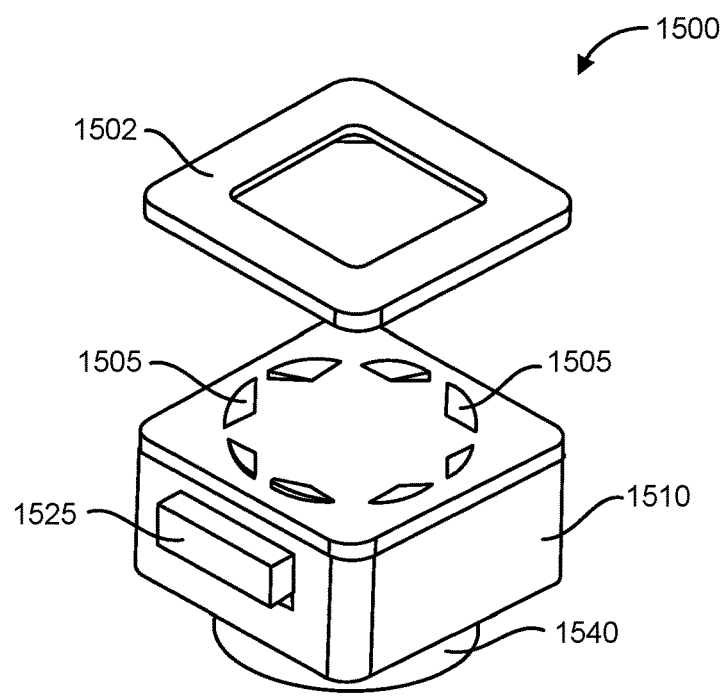
FIG. 15B shows the mounting cleat and mount assembly of FIG. 15B, with the mounting cleat disengaged from the mount assembly.
Figure 15C:
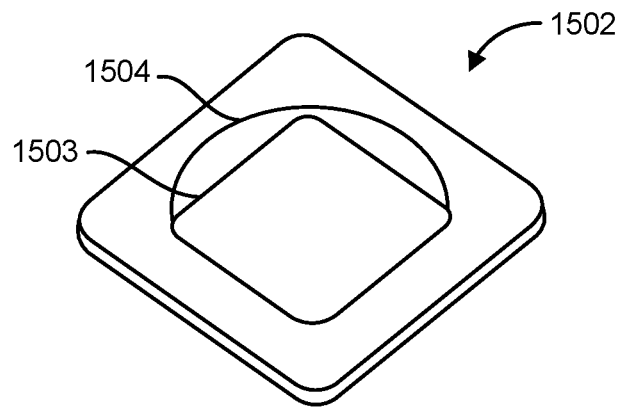
FIG. 15C shows a bottom perspective view of the mounting cleat.

FIG. 15A shows a top perspective view of a mount assembly 1500. In one example, the mount assembly 1500 can be used for attaching a first item to a second item, such as for attaching an encasement for a mobile electronic device to a bicycle, vehicle, wall, etc. The mount assembly 1500 can include a top housing 1510 and a bottom housing 1540. The top housing 1510 can be rotatably connected to the bottom housing 1540 to form an enclosure capable of encasing or supporting a plurality of components that enable the mount assembly 1500 to engage and disengage a mounting cleat 1502, which is shown in FIGS. 15A-15C. The mounting cleat 1502 can include an aperture 1503 having any suitable shape. The mounting cleat 1502 can also include a round recess 1504. The mount assembly 1500 can include a plurality of spring-loaded catch features 1505 as shown in FIG. 15B. The spring-loaded catch features 1505 can be configured to apply an outward force against the peripheral surface of the round recess 1504.

To free the mounting cleat 1502 from the mount assembly 1500, the top housing 1510 can be rotated relative to the bottom housing 1540, which can cause a cam (not shown) disposed within the mount assembly to engage the plurality of spring-loaded catch features 1505 and cause the plurality of spring-loaded catch features to retract downward and inward from the top surface of the top housing 1510, thereby freeing the mounting cleat 1502 from the mount assembly.

Figure 15D:
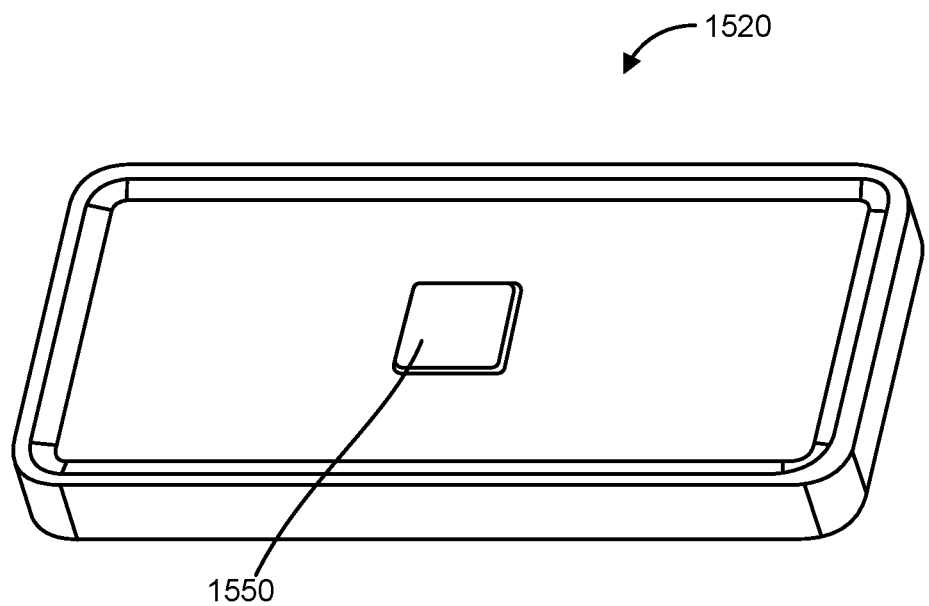
FIG. 15D shows an encasement for a mobile electronic device, the encasement having a mounting cleat attached to an outer surface.

In one example shown in FIG. 15D, an encasement 1520 for a mobile electronic device can include a mounting cleat 1550 affixed to an outer surface of the case with, for example, a suitable adhesive. In another example, the mounting cleat 1550 can be integrally molded into the encasement 1520. The mounting cleat 1550 can be made of a ferrous material to allow it to be magnetically attracted to a mount assembly containing a magnet. Because the mounting cleat 1550 relies upon magnetic attraction and not mechanical engagement features, the mounting cleat does not include any undercuts, which can be more comfortable for some users and does not trap dust or pocket lint, thereby improving the appearance of the encasement 1520.

Figure 16A:
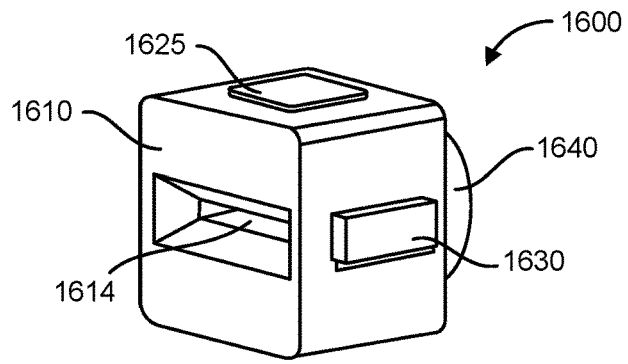
FIG. 16A shows a top perspective view of a mount assembly embodiment.
Figure 16B:
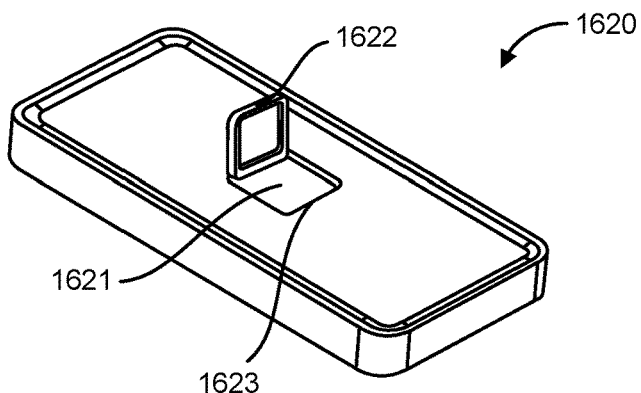
FIG. 16B shows a perspective view of an encasement for a mobile electronic device, the encasement having a mounting tab that is configured to attach to the mount assembly of FIG. 16A.
Figure 16C:
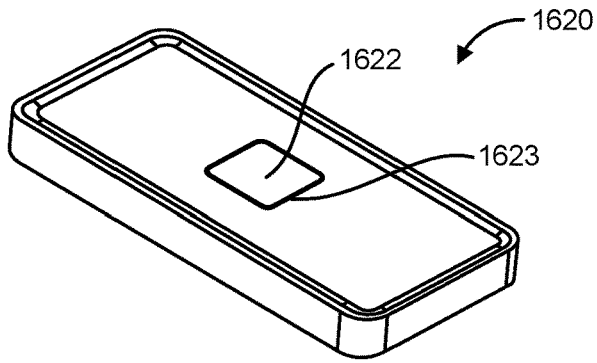
FIG. 16C shows the encasement of FIG. 16B with the mounting tab folded into a pocket in the encasement.

FIG. 16A shows a top perspective view of a mount assembly 1600. In one example, the mount assembly 1600 can be used for attaching a first item to a second item, such as for attaching an encasement 1620 for a mobile electronic device to a bicycle, vehicle, wall, etc. The mount assembly 1600 can include a top housing 1610 connected to a bottom housing 1640. The mount assembly 1600 can include a slot 1614 configured to receive a tab 1622 connected to an encasement. To improve ease of use, the slot 1614 can include a wide mouth that guides the tab toward the inner portion of the slot. In one example shown in FIG. 16B, the tab 1622 can be attached via a hinge to a back surface of the encasement 1620. The encasement 1620 can include a pocket 1621 into which the tab 1622 can be folded into to conceal the tab (see FIG. 16C) when not being used. The encasement 1620 can include a finger recess proximate a perimeter edge of the tab 1622 to permit a user to pry the tab out of the pocket 1621. An underside of the tab 1622 can include a recess, as shown in FIG. 16B. When the tab 1622 is inserted into the mount assembly 1600, a lock mechanism 1625 can be depressed in a direction perpendicular to the direction of insertion of the tab into the mount assembly. The lock mechanism 1625 can engage the recess of the tab 1622 and thereby prevent the tab from exiting the slot 1614. To free the tab 1622 from the slot 1614, the lock mechanism 1625 can be disengaged, and an ejection mechanism 1630 can be pressed. The ejection mechanism 1630 can urge the tab 1622 to exit the slot 1622. In some embodiments (e.g. lower cost embodiments), the mount assembly 1600 may not include an ejection mechanism 1630 and the user may simply pull on the encasement to extract the tab 1622 from the slot 1614.

Figure 17A:
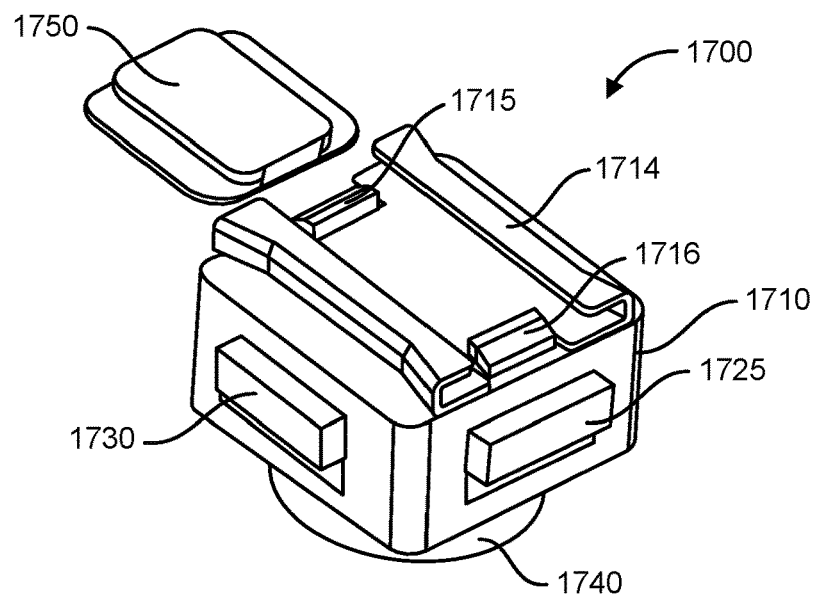
FIG. 17A shows a top perspective view of a mount assembly embodiment, and a mounting cleat disengaged from the mount assembly.
Figure 17B:
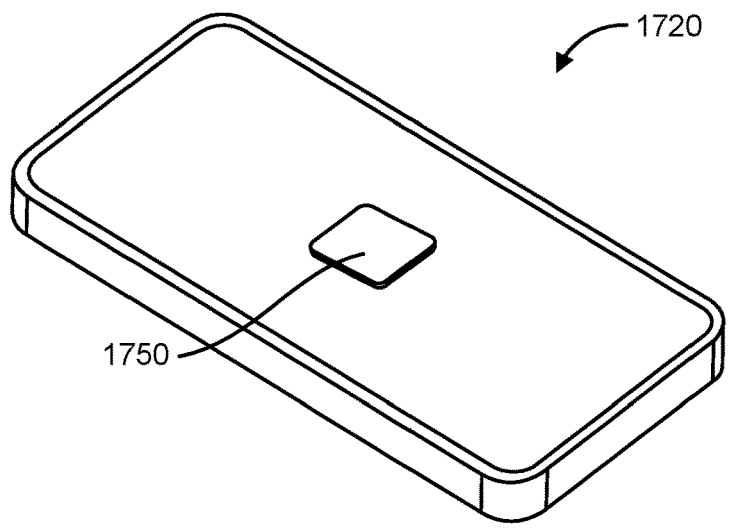
FIG. 17B shows a perspective view of an encasement for a mobile electronic device, the encasement having a mounting cleat that is configured to attach to the mount assembly of FIG. 17A.

FIG. 17A shows a mount assembly 1700 for attaching a first item to a second item, such as a mount assembly for attaching an encasement 1720 for a mobile electronic device to a bicycle, vehicle, wall, etc. The mount assembly 1700 can include a top housing 1710 and a bottom housing 1740. The top housing 1710 can be rotatably connected to the bottom housing 1740 to form an enclosure capable of encasing or supporting a plurality of components that enable the mount assembly 1700 to engage and disengage a mounting cleat 1750, shown in FIGS. 17A and 17B. The mount assembly 1700 can house a first axle and a second axle. A first clasp mechanism 1715 can be installed on, or otherwise mechanically connected to, the first axle. Likewise, a second clasp mechanism 1716 can be installed on, or otherwise mechanically connected to, the second axle. As shown in FIG. 17A, a portion of the first clasp mechanism 1715 can extend beyond a top surface of the top housing 1710. Similarly, the second clasp mechanism 1716 can extend beyond the top surface of the top housing 1710. A first spring can be disposed within the mount assembly 1700 and can exert a force against the first clasp mechanism 1715. Specifically, the first spring can exert a force against the first clasp mechanism 1715 that urges the first clasp mechanism to protrude above the top surface of the top housing 1710. Similarly, a second spring can be disposed within the mount assembly 1700 and can apply a force against the second clasp mechanism. Specifically, the second spring can exert a force against the second clasp mechanism 1716 that urges the first clasp mechanism to protrude above the top surface of the top housing 1710.

During attachment of, for example, an encasement 1720 for a mobile electronic device to the mount assembly 1700, the mounting cleat 1750 (see FIG. 17B) affixed to a back surface of the encasement can slide into a cleat channel 1714 located on the top surface of the top housing 1710, as shown in FIG. 17A. The first clasp mechanism 1715 can have a tapered outer surface such that upon insertion of the mounting cleat 1750 into the cleat channel 1714, the first clasp mechanism is depressed, thereby permitting the mounting cleat to be fully inserted into the cleat channel. Upon insertion, and after a rear edge of the mounting cleat 1750 slides past the first clasping mechanism 1715, the first clasping mechanism returns to its original state of protruding above the top surface of the mount assembly 1700, thereby trapping the mounting cleat between the first and second clasping mechanisms (1715, 1716). The second clasping mechanism 1716 can function similarly to the first clasping mechanism 1715, thereby permitting the mounting cleat to be inserted into either end of the cleat channel 1714.

To free the mounting cleat 1750 from the mount assembly 1700, the top housing 1710 can be rotated relative to the bottom housing 1740, which can cause a cam (not shown) disposed within the mount assembly to engage the first and second clasp mechanisms (1715, 1716) and force the first and second clasp mechanisms to retract below the top surface of the top housing, which allows the mounting cleat to be easily removed from the cleat channel 1714.

In one example shown in FIG. 17A, the mount assembly 1700 can include a lock switch 1725. The lock switch 1725 can be configured to prevent the mounting cleat 1750 from being removed from the cleat channel 1714. In one example, the lock switch 1725 can accomplish this objective by preventing relative rotation of the top and bottom housings (1710, 1740), thereby preventing the cam from engaging the first and second clasp mechanisms.

Figure 18A:
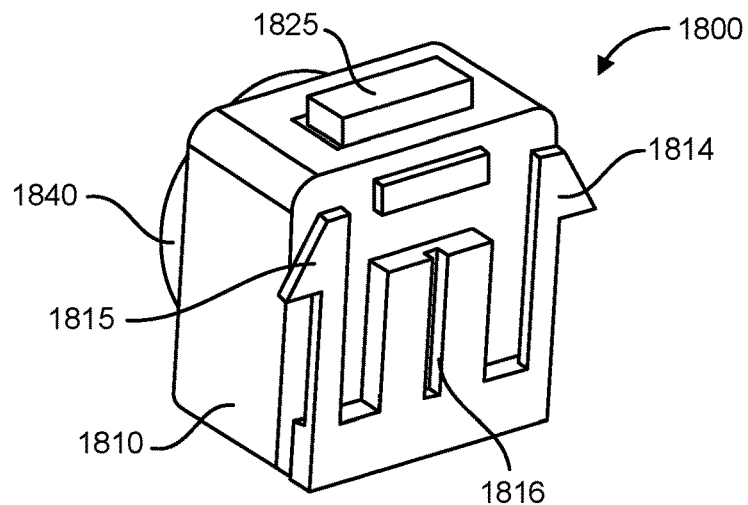
FIG. 18A shows a top perspective view of a mount assembly embodiment.
Figure 18B:
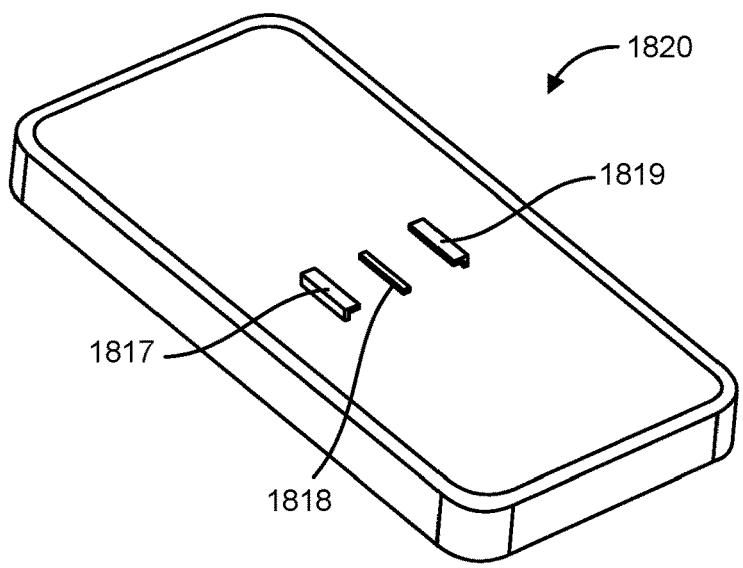
FIG. 18B shows a perspective view of an encasement for a mobile electronic device, the encasement configured to attach to the mount assembly of FIG. 18A.

FIG. 18A shows a mount assembly 1800 for attaching a first item to a second item, such as a mount assembly for attaching an encasement 1820 for a mobile electronic device to a bicycle, vehicle, wall, etc. The mount assembly 1800 can include a top housing 1810 and a bottom housing 1840. The mount assembly 1800 can include a mounting cleat that has features similar to a plastic buckle with side release members. Specifically, as shown in FIG. 18A, the mounting cleat can include a first side release member 1815 and a second side release member 1814. The mounting cleat can include an alignment groove 1816 located between the first and second side release members (1815, 1814). An encasement 1820 for a mobile electronic device can be configured to receive the mounting cleat to permit the mount assembly 1800 to be removably attached to the encasement. The encasement can include a first receiving feature 1817, a second receiving feature 1819, and a third receiving feature 1818. The first and second receiving features (1817, 1819) can engage the first and second side release members (1815, 1814) of the mounting cleat, and the third receiving feature 1818 can engage the alignment groove of the mounting cleat. In the example shown in FIG. 18B, the mounting cleat can be installed into the receiving features in two possible orientations.

The mount assembly 1800 can house a first axle and a second axle. A first clasp mechanism 1815 can be installed on, or otherwise mechanically connected to, the first axle. Likewise, a second clasp mechanism 1816 can be installed on, or otherwise mechanically connected to, the second axle.

As shown in FIG. 17A, a portion of the first clasp mechanism 1715 can extend beyond a top surface of the top housing 1810. Similarly, the second clasp mechanism 1716 can extend beyond the top surface of the top housing 1810. A first spring can be disposed within the mount assembly 1800 and can exert a force against the first clasp mechanism 1815. Specifically, the first spring can exert a force against the first clasp mechanism 1815 that urges the first clasp mechanism to protrude above the top surface of the top housing 1810. Similarly, a second spring can be disposed within the mount assembly 1800 and can apply a force against the second clasp mechanism. Specifically, the second spring can exert a force against the second clasp mechanism 1816 that urges the first clasp mechanism to protrude above the top surface of the top housing 1810.

Figure 19A:
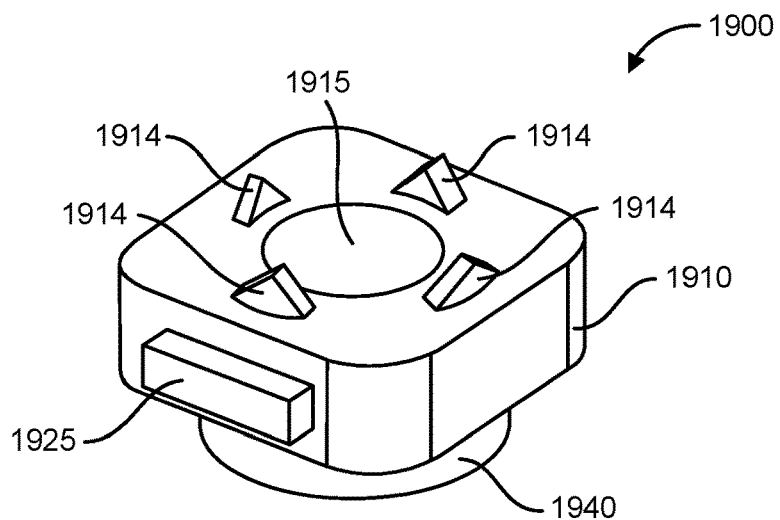
FIG. 19A shows a top perspective view of a mount assembly embodiment.
Figure 19B:
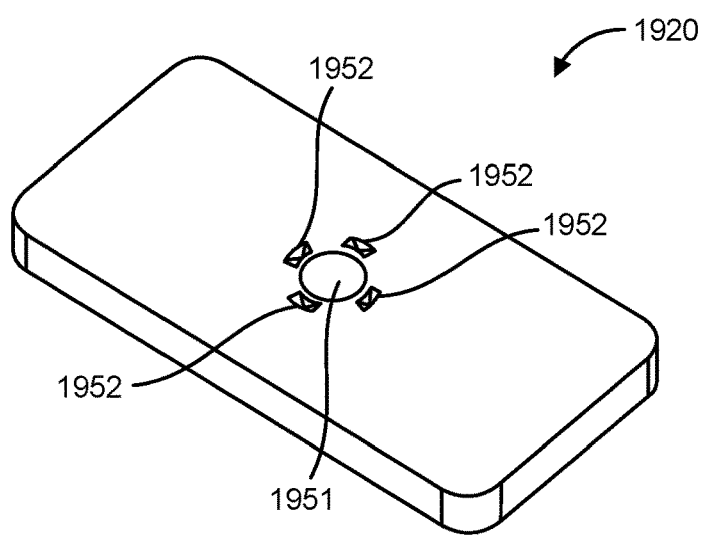
FIG. 19B shows a perspective view of an encasement for a mobile electronic device, the encasement configured to attach to the mount assembly of FIG. 19A.

FIG. 19A shows a mount assembly 1900 for attaching a first item to a second item, such as for attaching an encasement 1920 for a mobile electronic device to a bicycle, vehicle, wall, etc. The mount assembly 1900 can include a top housing 1910 and a bottom housing 1940. The mount assembly 1900 can include a plurality of teeth 1914 extending from a top surface of the top housing 1910. The plurality of teeth can be arranged around a magnet 1915. An encasement 1920 for a mobile electronic device can include a plurality of tooth-receiving indentations 1952 that are each configured to receive one tooth. The plurality of tooth-receiving indentations 1952 can be arranged around a ferrous plate 1951 disposed in a back surface of the encasement 1920. When the mount assembly is connected to the back side of the encasement 1920, the magnet 1915 exerts an attractive force on the ferrous plate 1951, which draws the ferrous plate toward the magnet. In response, the plurality of teeth 1914 enter and seat in the plurality of tooth receiving indentions 1952 to permit the ferrous plate 1951 to move closer to the magnet.

Each of the plurality of teeth can have ramped sides, as shown in FIG. 19A. When the mount assembly 1900 is engaged with the back side of the encasement 1920, a user can apply torque to the mount assembly to separate the mount assembly from the encasement. When a user applies torque to the mount assembly 1900, the mount assembly begins to rotate relative to the encasement 1920. As a result of the ramped sides on each tooth 1914, the mount assembly 1900 is pushed away from the encasement 1920, thereby increasing the distance between the ferrous plate 1952 and the magnet 1915 and decreasing the magnetic force holding them together, making it easier for the user to physically separate the mount assembly 1900 from the encasement 1920 by pulling the respective components away from each other. In another example, the magnet 1915 can be located in the encasement 1920, and the ferrous plate 1952 can be located in the mount assembly 1900.

Figure 20A:
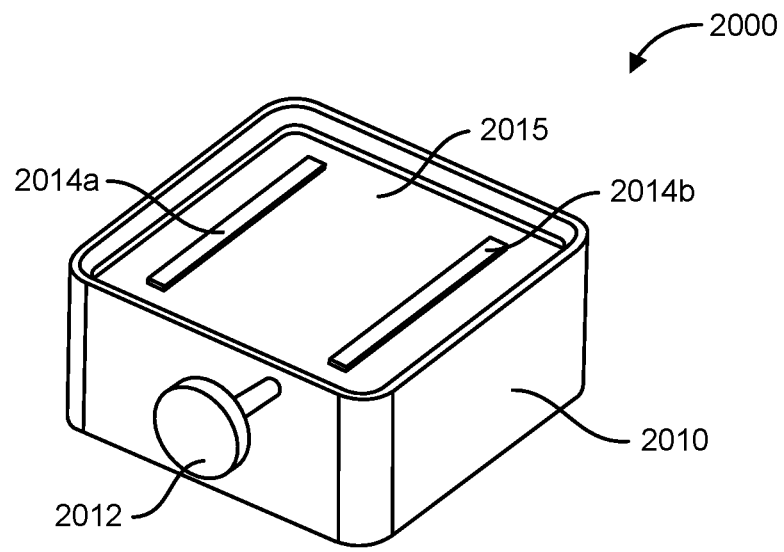
FIG. 20A shows a top perspective view of a mount assembly embodiment.
Figure 20B:
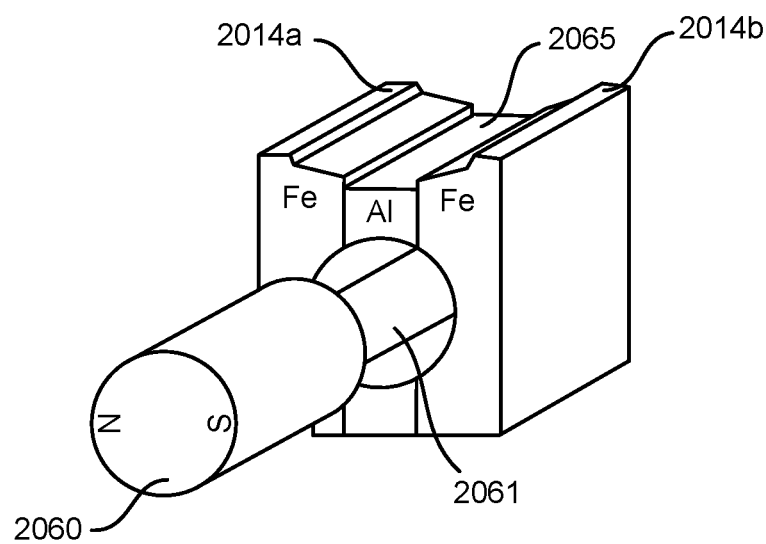
FIG. 20B shows a perspective view of inner components of the mount assembly of FIG. 20A.
Figure 20C:
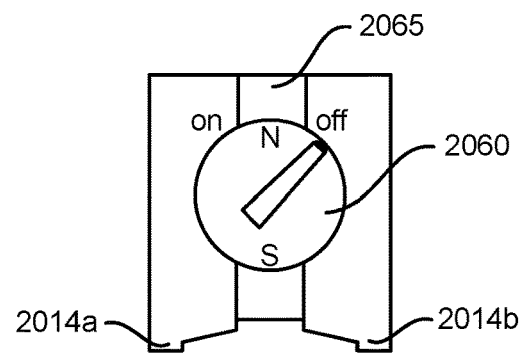
FIG. 20C shows a front view of the inner components of the mount assembly of FIG. 20A.
Figure 20D:
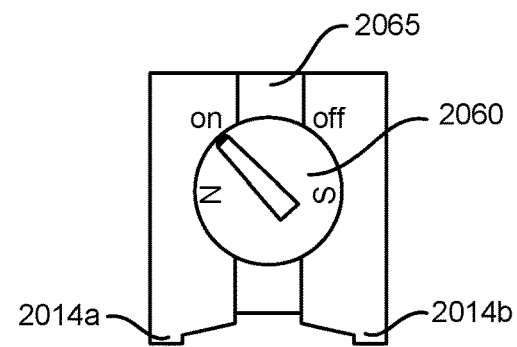
FIG. 20D shows a front view of the inner components of the mount assembly of FIG. 20A.
Figure 20E:
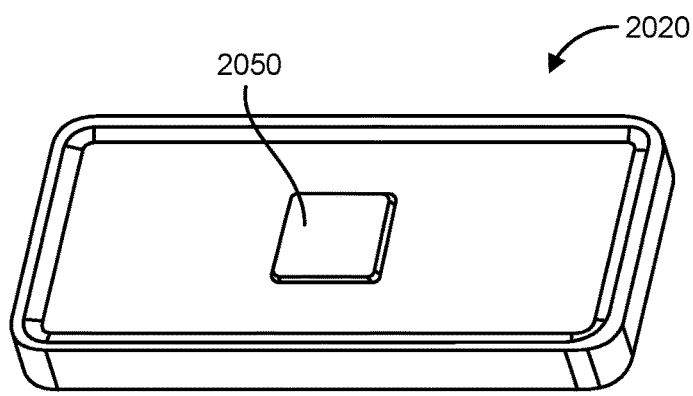
FIG. 20E shows a perspective view of an encasement for a mobile electronic device, the encasement having a mounting cleat that is configured to attach to the mount assembly of FIG. 20A.

FIG. 20A shows a mount assembly 2000 for attaching a first item to a second item, such as for attaching an encasement 2020 for a mobile electronic device to a bicycle, vehicle, wall, etc. The mount assembly 2000 can include a recess 2015 located in a top surface. The recess 2015 can be configured to receive and magnetically attract a ferrous mounting cleat 2050 associated with an encasement 2020, as shown in FIG. 20E. The mount assembly 2000 can include a first ferrous portion 2014a, a non-ferrous portion 2065 adjacent to the first ferrous portion, and a second ferrous portion 2014b adjacent to the non-ferrous portion, as shown in FIG. 20B. The mount assembly 2000 can include a magnet 2060 disposed in a hole 2061 in the mount assembly. A knob 2012 can be attached to the magnet 2060 and can allow the magnet to be rotated between a first position known as an "off" position (see FIG. 20C) and a second position known as an "on" position (see FIG. 20D). When the magnet is in the "on" position, the north pole of the magnet is proximate the first ferrous portion 2014*a*, and the south pole of the magnet is proximate the second ferrous portion 2014*b*, as shown in FIG. 20D. As a result, magnetic flux lines from the magnet 2060 pass through the first and second ferrous portions (2014*a*, 2014*b*), causing the first ferrous portion 2014*a* to behave like an extension of the north pole of the magnet and causing the second ferrous portion 2014*b* to behave like an extension of the south pole of the magnet. The mount system 2000 can be configured such that only a small section of the first ferrous portion 2014*a* protrudes into the recess 2015. Similarly, the mount system 2000 can be configured such that only a small section of the second ferrous portion 2014*b* protrudes into the recess 2015. When the magnet is in the "on" position, the ferrous mounting plate 2050 is magnetically attracted to the first and second ferrous portions (2014*a*, 2014*b*). On the other hand, when the magnet 2060 is in the "off" position, the north pole of the magnet is proximate the non-ferrous portion 2065, and the south pole of the magnet is also proximate the non-ferrous portion, as shown in FIG. 20C. As a result, neither the first nor second ferrous portions (2014*a*, 2014*b*) are magnetized, so the ferrous mounting plate 2050 is not magnetically attracted to the first and second ferrous portions, which allows the ferrous mounting plate to be removed from the recess 2015 (e.g. when a user wants to detach the encasement 2020 from the mount assembly 2000).

Figure 21A:
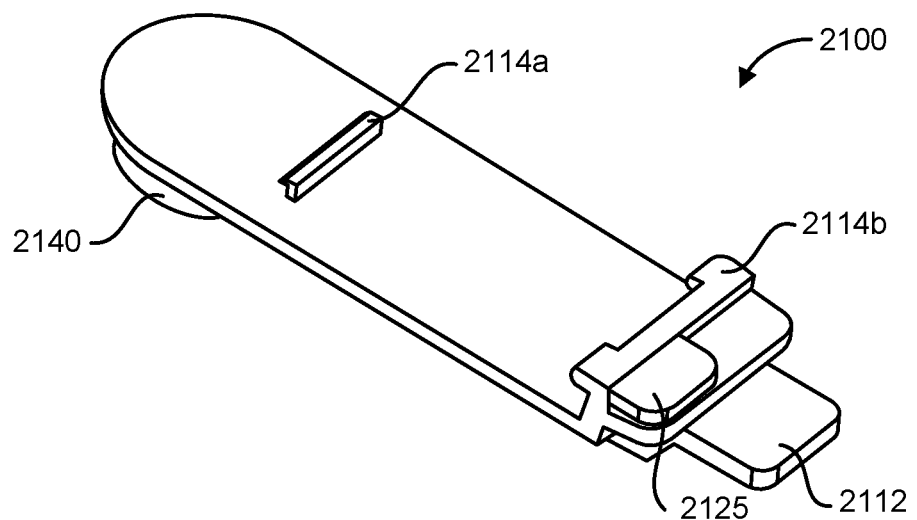
FIG. 21A shows a front perspective view of a mount assembly embodiment.
Figure 21B:
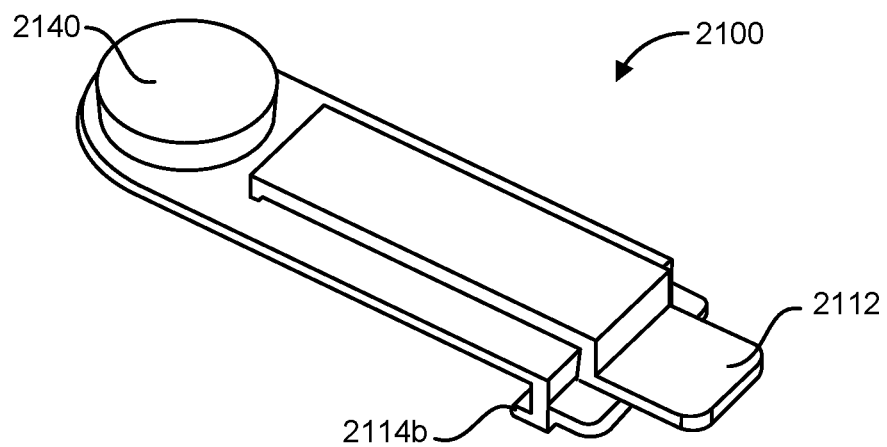
FIG. 21B shows a rear perspective view of the mount assembly of FIG. 21A.
Figure 21C:
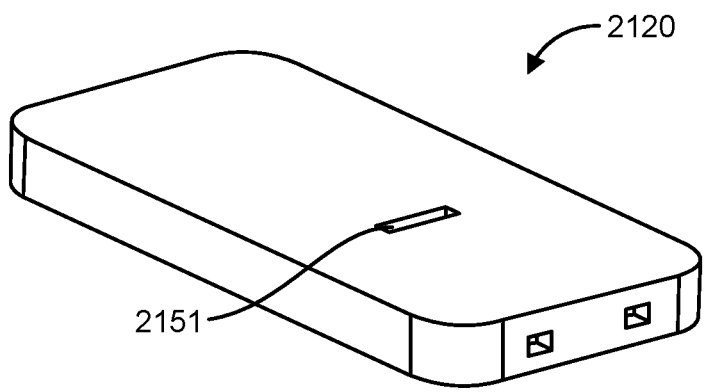
FIG. 21C shows a perspective view of an encasement for a mobile electronic device, the encasement configured to be engaged by the mount assembly of FIG. 21A.

FIG. 21A shows a mount assembly 2100 for attaching a first item to a second item, such as for attaching an encasement 2120 for a mobile electronic device to a bicycle, vehicle, wall, etc. The mount assembly 2100 can be configured to grasp an encasement 2120 for a mobile electronic device at two or more points. In one example, the mount assembly 2100 can be configured to grasp an encasement 2120 along two opposing side surfaces. In another example, the mount assembly 2100 can be configured to grasp the encasement 2120 along a back surface and a bottom side surface, as shown in FIG. 21C.

The mount assembly 2100 can include a mount interface 2140 that is configured to engage a surface (e.g. wall, vehicle dashboard, windshield, etc.) by way of an adhesive layer, suction cup, or other suitable mounting device attached to the mount interface. A first end of a slender member can be attached to the mount interface 2140, and a second end of the slender member can be attached to a hook feature 2114*b*, as shown in FIG. 21A. A lever arm can be positioned adjacent to a back surface of the slender member, as shown in FIG. 21B. The lever arm can have a first end and a second end. The first end of the lever arm can be attached to a first clasp mechanism 2114*a*, and a second end of the lever arm can be attached to a lever tab 2112. The first clasp mechanism 2114*a* can extend through an opening in the slender member. Applying pressure to the lever tab 2112 can cause the first end of the lever arm to pivot away from the slender member, thereby retracting the first clasp mechanism from the opening in the slender member. When the encasement 2120 is grasped between the first clasp mechanism 2114*a* and the hook feature 2114*b*, the encasement can be freed from the mount assembly by applying pressure to the lever tab 2112. When the encasement 2120 is grasped between the first clasp mechanism 2114*a* and the hook feature 2114*b*, a lock switch 2125 can prevent the lever tab 2112 from being depressed. The lock switch 2125 can be used to prevent the encasement 2120 from inadvertently dislodging from the mount assembly during use (e.g. while riding a mountain bike on rough terrain).

Figure 22A:
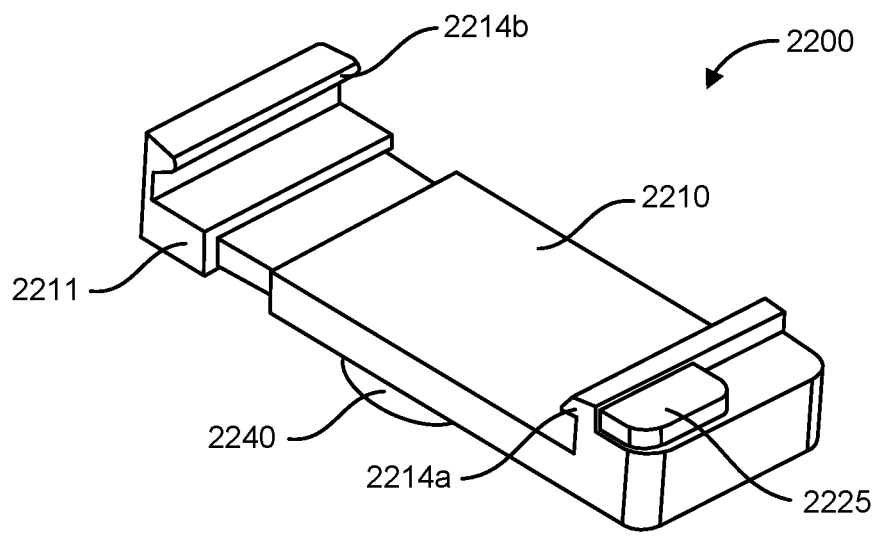
FIG. 22A shows a front perspective view of an adjustable mount assembly embodiment.
Figure 22B:
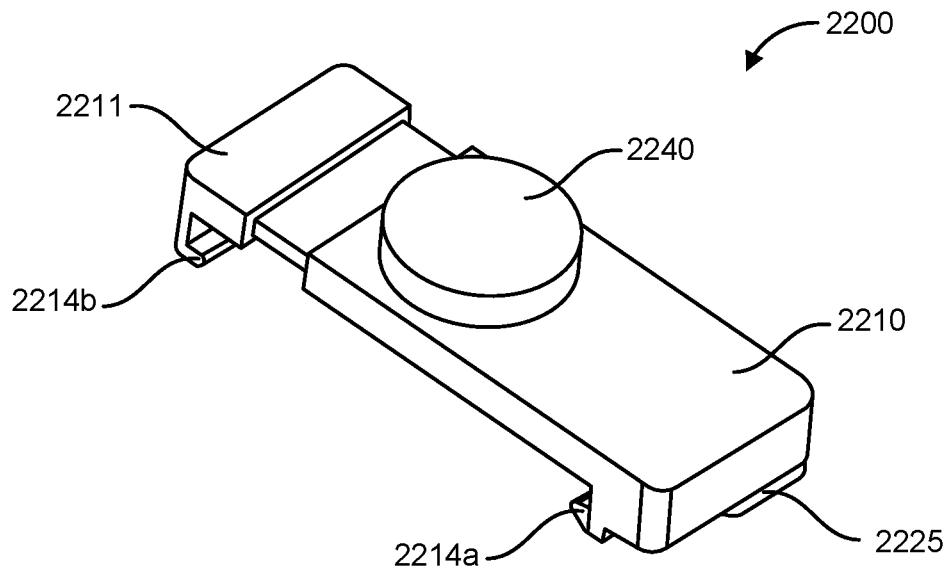
FIG. 22B shows a rear perspective view of the adjustable mount assembly of FIG. 22A.
Figure 22C:
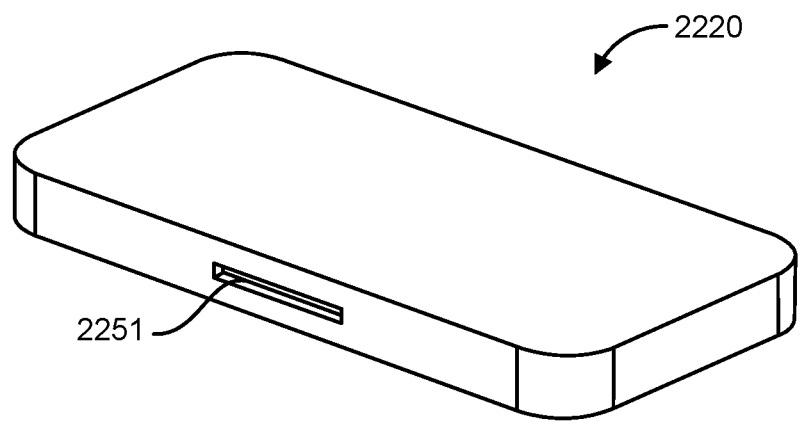
FIG. 22C shows a perspective view of an encasement for a mobile electronic device, the encasement configured to be engaged by the adjustable mount assembly of FIG. 22A.
Figure 22D:
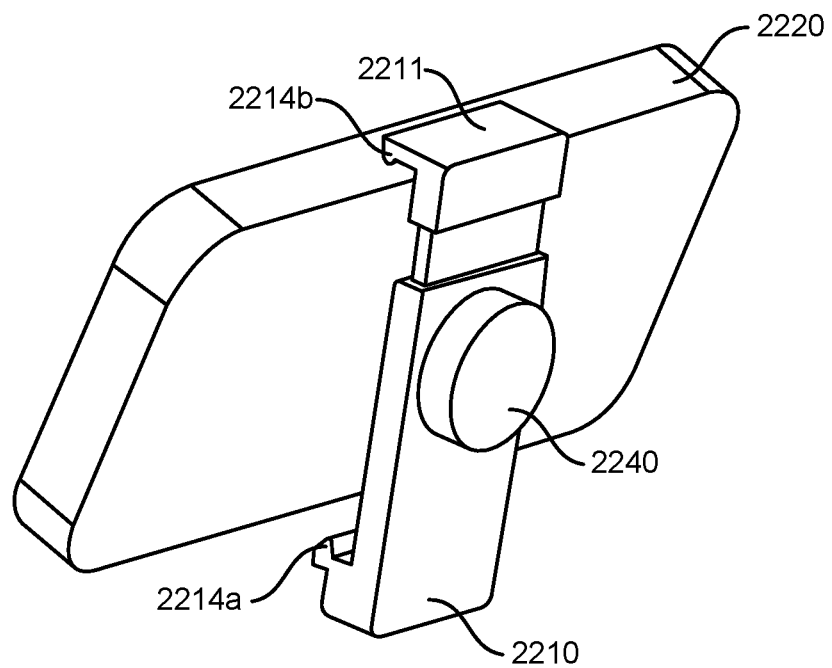
FIG. 22D shows a perspective view of the encasement of FIG. 22C partially engaged by the adjustable mount assembly of FIG. 22A.

FIG. 22A-22D show an adjustable mount assembly 2200 for attaching a first item to a second item, such as for attaching an encasement 2220 for a mobile electronic device to a bicycle, vehicle, wall, etc. The mount assembly 2200 can be configured to grasp an encasement 2220 for a mobile electronic device at two or more points. In one example, the mount assembly 2200 can be configured to grasp an encasement 2220 along two opposing side surfaces, as shown in FIG. 22D. The adjustable mount assembly 2200 is capable of receiving a variety of encasements 2220 having a range of sizes and shapes. The mount assembly 2200 can include a primary member 2210 attached to a mount interface 2240. The mount interface 2240 can be configured to engage a surface (e.g. wall, vehicle dashboard, windshield, etc.) by way of an adhesive layer, suction cup, or other suitable mounting device attached to the mount interface. The primary member 2210 can have a first end and a second end. A telescoping member 2211 can extend from and retract into an opening located proximate the first end of the primary member 2210 to allow the adjustable mount assembly 2200 to receive encasements having differing external dimensions. A first clasp mechanism 2214*a* can extend from the second end of the primary member 2210. The telescoping member 2211 can have a first end and a second end. The first end of the telescoping member 2211 can be disposed within the opening in the first end of the primary member 2210, and the second end of the telescoping member can include a second clasp mechanism 2214*b* extending therefrom, as shown in FIG. 22A. The encasement 2220 can include grooves 2251 located on opposing surfaces, as shown in FIG. 22C. When the encasement 2220 is grasped by the mount assembly 2200, the first clasp mechanism 2214*a* can be engaged in a first groove 2251, and the second clasp mechanism 2214*b* can be engaged in a second groove (not shown), where the second groove is located on a side surface of the encasement opposite the side surface in which the first groove is located.

Figure 23A:
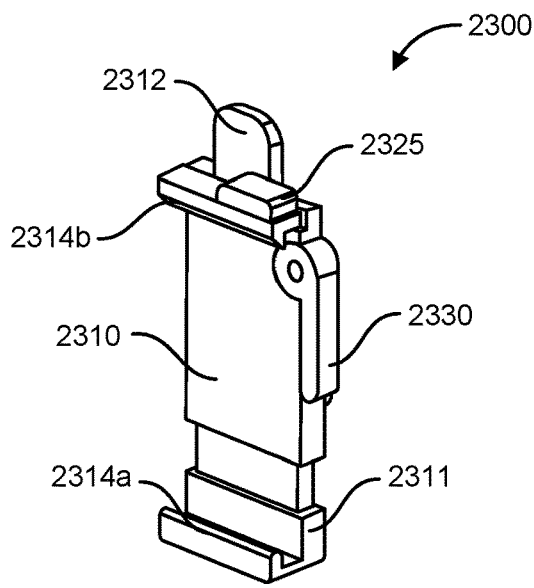
FIG. 23A shows a front perspective view of an adjustable mount assembly embodiment.
Figure 23B:
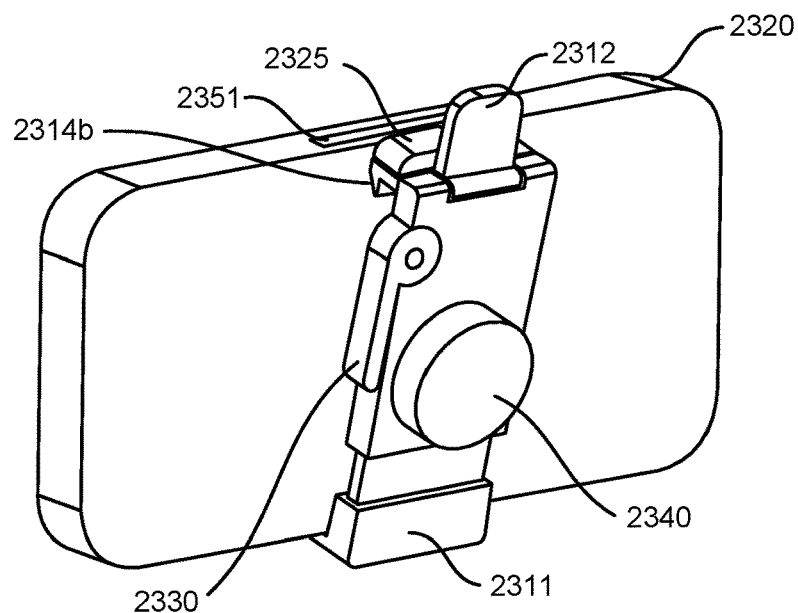
FIG. 23B shows a perspective view of an encasement for a mobile electronic device, the encasement being partially engaged by the mount assembly of FIG. 23A.

FIGS. 23A and 23B show an adjustable mount assembly 2300 for attaching a first item to a second item, such as for attaching an encasement 2320 for a mobile electronic device to a bicycle, vehicle, wall, etc. The mount assembly 2300 can be configured to grasp an encasement 2320 for a mobile electronic device at two or more points. In one example, the mount assembly 2300 can be configured to grasp an encasement along two opposing side surfaces, as shown in FIG. 23B. The adjustable mount assembly 2300 is capable of receiving a variety of encasements having a range of sizes and shapes. The mount assembly 2300 can include a primary member 2310 attached to a mount interface 2340. The mount interface 2340 can be configured to engage a surface (e.g. wall, vehicle dashboard, windshield, etc.) by way of an adhesive layer, suction cup, or other suitable mounting device attached to the mount interface. The primary member 2310 can have a first end and a second end. A telescoping member 2311 can extend from and retract into an opening located proximate the first end of the primary member 2310 to allow the adjustable mount assembly 2300 to receive encasements having differing dimensions. A first clasp mechanism 2314*b* can extend from the second end of the primary member 2310. The telescoping member 2311 can have a first end and a second end. The first end of the telescoping member 2311 can be disposed within the opening in the first end of the primary member 2310, and the second end of the telescoping member can include a second clasp mechanism 2314*a* extending therefrom, as shown in FIG. 23A. The encasement 2320 can include grooves 2351 located on opposing surfaces, as shown in FIG. 23B. When the encasement 2320 is grasped by the mount assembly 2300, the first clasp mechanism 2314b can be engaged in a first groove 2351, and the second clasp mechanism 2214a can be engaged in a second groove (not shown), where the second groove is located on a side surface of the encasement opposite the side surface in which the first groove is located. The mount assembly 2300 can include an adjustment feature 2330 that allows a user to adjust and set the distance between the first and second clasp mechanisms (2314b, 2314a) by adjusting the telescoping member 2311. The mount assembly can include a release mechanism 2313 that can be depressed to free the encasement 2320 from the mount assembly 2300. A lock switch 2325 can prevent actuation of the release mechanism 2313 and can thereby prevent the encasement 2320 from inadvertently dislodging from the mount assembly 2300 during use (e.g. while riding a mountain bike on rough terrain).

Referring again to FIGS. 3A-3H, a mount assembly 300 can be configured to releasably receive a mounting cleat 350. The mount assembly 300 can include a top housing 310 rotatably connected to a bottom housing 340. The top and bottom housings (310, 340) together defining a housing volume. A recess 312 can be disposed in a top surface of the top housing 310, and the recess can be configured to receive the mounting cleat 350, as shown in FIG. 3A. A center torsion spring 334 can be disposed within the housing volume. The center torsion spring 334 can include a first end and a second end. The first end of the center torsion spring 334 can be connected to the bottom housing 340, and the second end of the center torsion spring can be connected to the top housing 310. The top housing 310 can be rotatable between an unrotated position and a rotated position relative to the bottom housing (see, e.g. FIG. 3E), where, when the top housing is in the rotated position, the center torsion spring 334 exerts a force upon the top housing 310, the force urging the top housing to return to the unrotated position relative to the bottom housing 340. The mount assembly 300 can also include a first clasp mechanism 314a that is at least partially disposed within the housing volume. The first clasp mechanism 314a can extend into the recess 312 when the top housing is in the unrotated position, as shown in FIG. 3I, and the first clasp mechanism can retract from the recess when the top housing is in the rotated position. Similarly, the mount assembly 300 can include a second clasp mechanism 314b that is at least partially disposed within the housing volume. The second clasp mechanism 314b can extend into the recess 312 when the top housing 310 is in the unrotated position, as shown in FIG. 3I, and the second clasp mechanism can retract from the recess when the top housing is in the rotated position.

The mount assembly 300 can include a first clasp spring 322a disposed within the housing volume between the first clasp mechanism 314a and one of an interior surface of the top housing 310 and an interior surface of the bottom housing 340. The first clasp spring 322a can apply a force against the first clasp mechanism 314a to maintain the first clasp mechanism extended into the recess 312 when the top housing is in the unrotated position. The mount assembly 300 can include a second clasp spring 322b disposed within the housing volume between the second clasp mechanism 314b and one of an interior surface of the top housing 310 and an interior surface of the bottom housing 340. The second clasp spring 322a can apply a force against the second clasp mechanism 314b to maintain the second clasp mechanism extended into the recess 312 when the top housing 310 is in the unrotated position. In some examples, the first and second clasp springs (322a, 322b) can be elastic deformable cylinders (see FIG. 3B), torsion springs, or compression springs.

The mount assembly 300 can include a cam 330 disposed within the housing volume. The cam can include a first cam arm 332a extending outward from a centerline axis of the cam 330 and a second cam arm 332b extending outward from the centerline axis of the cam. The first cam arm 332a can be positioned 180 degrees apart from each other with respect to an outer circumferential surface of the cam 330, as shown in FIG. 3F. As the top housing 310 is transitioned between the unrotated position and the rotated position, the first cam arm 332a can apply an opposing force to the first clasp mechanism 314a that overcomes the force applied by the first clasp spring 322a, thereby causing the first clasp mechanism to retract from the recess 312. Likewise, as the top housing 310 is transitioned between the unrotated position and the rotated position, the second cam arm 332b applies an opposing force to the second clasp mechanism 314b that overcomes the force applied by the second clasp spring 322b, thereby causing the second clasp mechanism to retract from the recess 312.

The mount assembly 300 can include a first pivot pin (e.g. 320), and the first clasp mechanism 314a can be installed on the first pivot pin. The first pivot pin can enable the first clasp mechanism 314a to pivot between an extended position and a retracted position with respect to the recess 312. The first clasp mechanism 314a is in the extended position when the top housing 310 is in the unrotated position, as shown in FIG. 3I. The first clasp mechanism 314a is in the retracted position when the top housing 310 in in the rotated position.

The mount assembly 300 can include a second pivot pin (e.g. 320), and the second clasp mechanism 314b can be installed on the second pivot pin. The second pivot pin can enable the second clasp mechanism 314b to pivot between an extended position and a retracted position with respect to the recess 312. The second clasp mechanism 314b is in the extended position when the top housing 310 is in the unrotated position, as shown in FIG. 3I. The second clasp mechanism 314b is in the retracted position when the top housing 310 in in the rotated position. In some examples, the first and second pivot pins can be connected to form a single component, as shown in FIG. 3B.

The mount assembly 300 can include an alignment element disposed within the recess 312. The alignment element can be selected from the group consisting of a magnet and a ferromagnetic material.

The mount assembly 300 can include at least one outer attachment cleat (e.g. 345a, 345b) extending from an outer surface of the bottom housing 340, as shown in FIG. 3G. The at least one outer attachment cleat can be configured to engage holes (e.g. 411a, 411b, 411c) in an item to permit the mount assembly to be attached to the item, such as the bicycle mount shown in FIG. 4A.

The mount assembly 300 can include a lock switch. The lock switch can have a locked position and an unlocked position. While in the locked position, the lock switch can prevent the top housing 310 from rotating relative to the bottom housing 340 to ensure that the first and second clasp mechanisms (314a, 314b) remain in their extended positions relative to the recess 312.

A mounting system for attaching an encasement for a mobile electronic device to a surface can include an encasement and a mount assembly 300. The encasement can include a mounting cleat 350 extending from an outer surface of the encasement. In one example, the mounting cleat 350 can be an integrally formed portion of the encasement. In another example, the mounting cleat 350 can be attached to the encasement using an acrylic foam tape, such as VHB manufactured by 3M Corporation. The mounting cleat 350 can include a first undercut 354a in a first side surface and a second undercut 354b in a second side surface, as shown in FIG. 3A, where the first side surface is opposite the second side surface. The mount assembly 300 can be configured to releasably attach to the mounting cleat 350. The mount assembly 300 can include a top housing 310 rotatably connected to a bottom housing 340, where the top and bottom housings together define a housing volume. The mount assembly 300 can include a recess 312 disposed in a top surface of the top housing 310, where the recess configured to receive the mounting cleat 350. The mount assembly 300 can include a center torsion spring 334 (shown in the exploded view of FIG. 3B) disposed within the housing volume. The center torsion spring 334 can include a first end and a second end. The first end of the center torsion spring 334 can be connected to the bottom housing 340, and the second end of the center torsion spring can be connected to the top housing 310. The top housing 310 is rotatable between an unrotated position and a rotated position relative to the bottom housing 340. When the top housing 310 is in the rotated position, the center torsion spring 334 exerts a force upon the top housing, the force urging the top housing to return to the unrotated position relative to the bottom housing 340. The mount assembly can include a first clasp mechanism 314a at least partially disposed within the housing volume, where the first clasp mechanism extends into the recess 312 and engages the first undercut 354a of the mounting cleat 350 when the top housing 310 is in the unrotated position, and where the first clasp mechanism retracts from the recess to disengage the first undercut of the mounting cleat when the top housing is rotated to the rotated position. The mount assembly 300 can include a second clasp mechanism 314b at least partially disposed within the housing volume, where the second clasp mechanism extends into the recess 312 and engages the second undercut 354b of the mounting cleat 350 when the top housing 310 is in the unrotated position, and where the second clasp mechanism retracts from the recess to disengage the second undercut of the mounting cleat when the top housing is rotated to the rotated position.

As described above with respect to FIG. 3I, various structures may be included to prevent rotation of a first housing with respect to a second housing. Such variations are described below. Certain activities may expose a mounted electronic device and/or a mounted protective encasement surrounding the electronic device to forces that exceed a force normally required to disengage a mount assembly from the electronic device or protective cover. For example, any activity in which the mounted device/cover is exposed to high torsional (twisting) forces could cause the device/cover to turn sufficiently to disengage a mounting assembly illustrated in FIGS. 3A-3I. Likewise, in activities where the mounted device may be subject to bumping against other equipment, the user, immovable objects, etc., the device may turn sufficiently to disengage the mount. One solution, illustrated in FIGS. 3H-3I and discussed above may prevent undesired turning motion that would unintentionally disengage the mounting assembly. To disengage the mount assembly 300, a button 343 must be pressed, which would move the wedge head 325 past an angled face 341. However, the location of this solution, on a bottom face of the bottom housing 340 may prevent use of this solution in certain applications.

Integration of the mount assembly to another device, such as a belt clip, window mount, wall mount or the like, may prevent, or make very cumbersome, access to a rotation lock disengagement mechanism disposed on a bottom face of the mount assembly, such as lock arm 324 of FIG. 3I. Similarly, a mount assembly that is not integrated with another device or surface may attach to the other device or surface in such a way as to render access to a bottom-disposed rotation lock impossible or prohibitively difficult. Accordingly, various rotation lock disengagement mechanisms are illustrated, in FIGS. 24A-J and 25-29, which permit access from a side of the mount assembly.

Figure 24A:
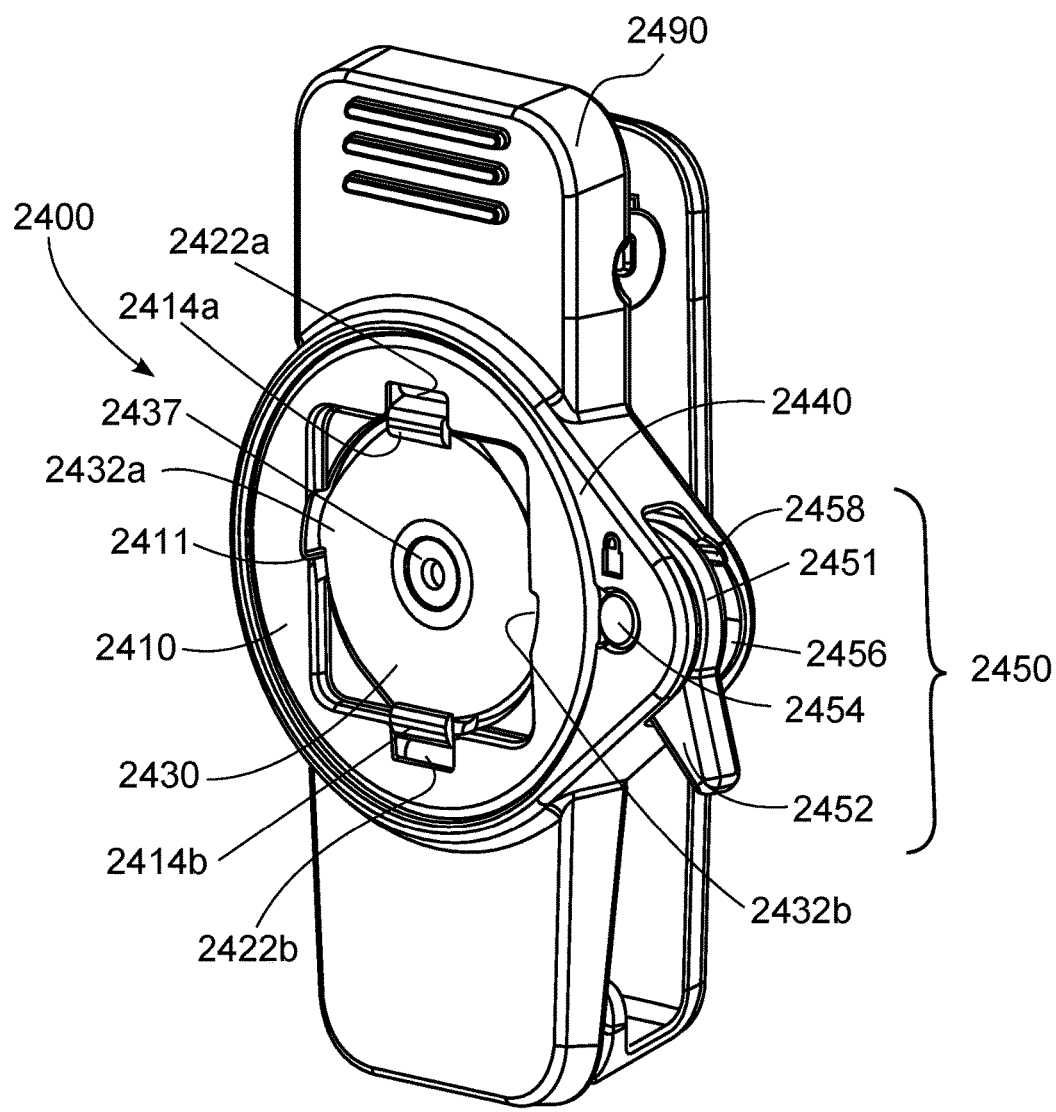
FIGS. 24A-J show various views of a belt clip having an integrated mount assembly with a rotation-locking mechanism according to a disclosed embodiment.

In FIG. 24A, a mount assembly 2400 may be included in a belt clip 2490. The mount assembly 2400 may include an inner assembly 2410 and an outer housing 2440. The outer housing 2440 may be attached to the belt clip 2490 by adhesive, magnetic, or mechanical means, or, as illustrated, may be structurally integral to the underlying device (in this example, belt clip 2490). The inner assembly 2410 may functionally correspond to embodiments above labeled "top portion" (e.g., 110), "top housing" (e.g., 210, 310, 910, 1010, 1110), or "inner assembly" (e.g., 1210). The outer housing 2440 may functionally correspond to embodiments above labeled "bottom housing" or "bottom portion" (e.g. 240, 340, 940, 1040, 1140). In one non-limiting example, the inner assembly 2410 may correspond to the top housing 310 illustrated and described in FIGS. 3A-3I, save for the lock arm 324 and corresponding rotation-locking features of FIGS. 3H-3I. Clasp mechanisms 2414a, b may correspond to clasp mechanisms 314a, b described above. A cam 2430 and corresponding center torsion spring, clasp springs etc. may be as described above. The cam 2430 may attach to the underlying device (e.g., belt clip 2490) via a center attachment screw 2437 and cam retaining nut 2438 (see FIG. 24J) rather than with the center attachment cleat 335 illustrated in FIGS. 3B, 3G.

Figure 24B:
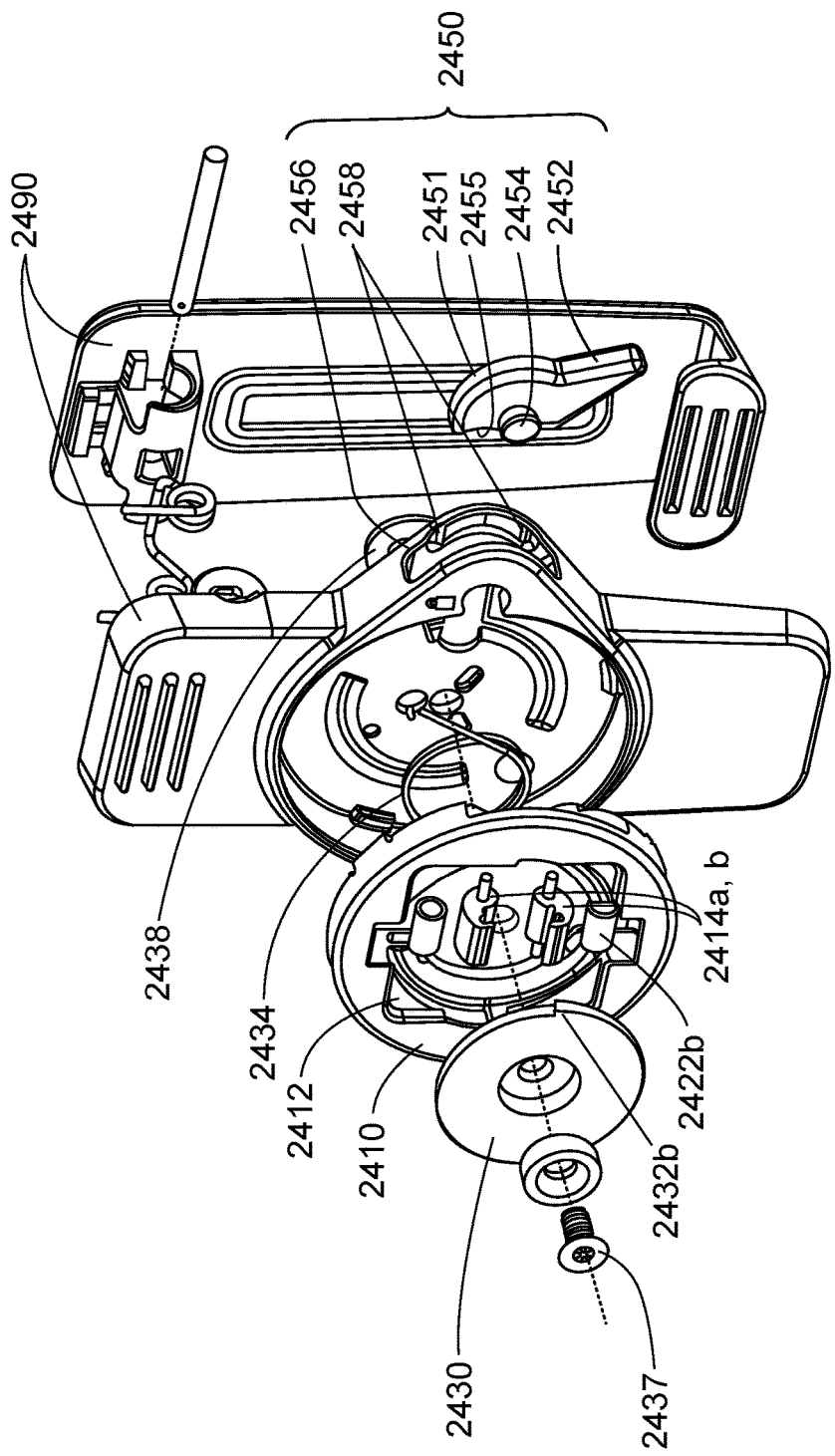

Functionally, the mounting assembly of FIGS. 24A-J is similar to the description corresponding to FIGS. 3A-3I. That is, a recess 2412 of the inner assembly 2410 receives a cleat (such as mounting cleat 350), edges of the cleat-engaging clasp mechanisms 2414a, b and being retained thereby. The cleat typically would be attached to, or part of, an electronic device or an encasement for an electronic device. The clasp mechanisms 2414a, b may be biased toward a center portion of the mount assembly 2400 by clasp springs 2422a, b. To release the cleat and corresponding device/encasement, the cleat may be twisted in a counter-clockwise direction (as viewed from above in the illustrated embodiment, although embodiments facilitating a clockwise twist will be appreciated by those of ordinary skill in the art). The twisting of the cleat forces the inner assembly 2410 in the counterclockwise direction about the cam 2430. Cam arms 2432a and 2432b may engage the clasp mechanisms 2414a, b, pivoting the clasp mechanisms away from each other and thus releasing the cleat. A center torsion spring 2434 may bias the inner assembly 2410 back to a rest position defined by one or more turn-stop features 2411 of the inner assembly 2410 resting against a portion of one or more of the cam arms 2432a, b. FIGS. 24A-B also illustrate a rotation-locking mechanism 2450 that, when engaged, prevents the inner assembly 2410 from turning with respect to the outer housing 2440, and thus preventing the inner assembly from unintentionally releasing the cleat and any device attached to the cleat. Although the rotation-locking mechanism may take different forms, and several variations of the rotation-locking mechanism are presented in this disclosure. In general, the rotation-locking mechanism includes a locking element, such as a pin, that may be introduced from outside a bottom housing, through a locking element channel in the bottom housing and into a locking element receptacle of the inner assembly. The locking element may transition between a locked position, in which the inner assembly is prevented from rotating within the bottom housing, and an unlocked position, in which the inner assembly may rotate and thus permit removal of a mounted cleat and electronic device. In some embodiments, the locking element may be movably held in the locked position the locking element receptacle by a biasing mechanism, such as a coil or leaf spring, magnets, and/or the like.

The rotation-locking mechanism 2450 illustrated in FIGS. 24A-I may include a locking cam 2451. A locking cam lever 2452 may extend outward from the locking cam 2451 to permit a user to rotate the cam 2451 between the locked and unlocked positions. In some embodiments, the locking cam lever may be replaced by a textured surface on an exterior portion of the locking cam; the textured surface can reduce the profile of the rotation-locking mechanism, while allowing a user to move the locking cam. The textured surface may be molded into the locking cam, it may be a coating sprayed onto the locking cam to provide a high-friction surface (e.g. silicone rubber), or a combination of both. A locking cam pivot 2454 may extend from one or more surfaces of the locking cam 2452 at an axis of the locking cam 2451. The locking cam 2451 may rotate about the axis at the locking cam pivot 2454. The embodiment depicted in FIGS. 24A-I utilizes a pivot at a central axis of the locking cam; however, in other embodiments, the pivot may be positioned at an axis that is not central to the locking cam, and produces asymmetric rotation. The locking cam 2451 may be held in a locking cam channel 2456 defined by a section of the outer housing 2440. The locking cam pivot may be held by corresponding structures of the bottom housing 2440. Bottom housing 2440 may also include one or more detents, the detents having locking cam depressions or indentations 2458 into which a locking cam bump or protrusion 2459 may rest when the locking cam lever is in a predetermined position. The interaction of the locking cam depressions and bumps may provide a user with tactile feedback as to the extent the locking cam has been deployed or rotated in one direction or another. One of skill in the art will appreciate that one or more locking cam depressions may positioned on the locking cam or locking cam lever, and one or more corresponding locking cam bumps may be positioned on a portion of the housing, such an outer or bottom housing, or an upper or inner assembly. The locking cam channel 2456 semi-encloses the locking cam 2451 and exposes a slot through which the locking cam lever extends, and in which the locking cam 2451 rotates about the locking cam pivot 2454.

The locking mechanisms illustrated in FIGS. 2A-2F and described herein may be combined with other mount assembly embodiments described above. In one non-limiting example, locking cam 2451 and corresponding rotation-locking features of FIGS. 24A-J may be combined with the mount assembly 200 and cam 230 illustrated in FIGS. 2A-2B and described herein, such that locking cam 2451 is disposed partially within the housing volume of mount assembly 200.

Figure 24C:
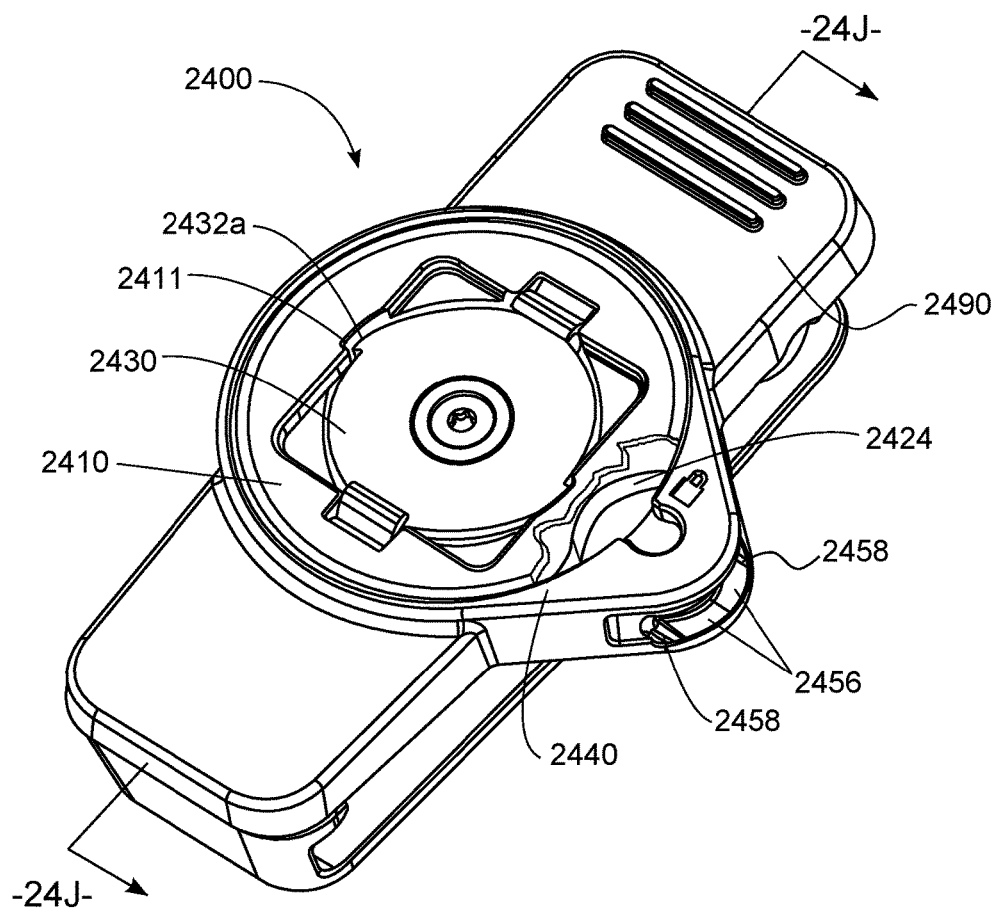
Figure 24D:
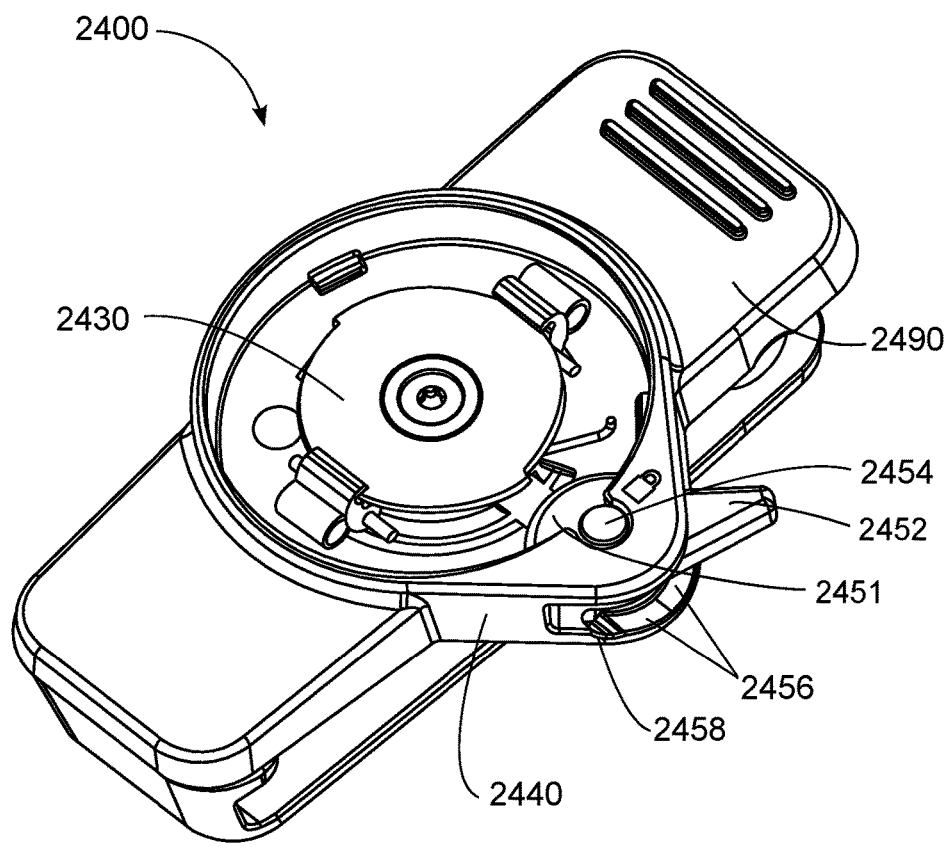

FIG. 24C provides a partial cutaway view of the mount assembly 2400 in which a surface portion of the inner assembly 2410 and the locking cam 2451 are removed for clarity to expose a cam-receiving void of the inner assembly 2410 having a face 2424 that is shaped to correspond to a portion of the locking cam when the locking cam is in a locked position. The cam-receiving void face 2424 may be concave in shape to correspond with a semi-cylindrical portion of the locking cam 2451 when the locking cam 2451 is in a locked position. For example, in FIG. 24D the inner assembly 2410 is removed for clarity to illustrate a locked position of the locking cam 2451 and the necessity of a corresponding cam-receiving void face 2424 formed in the inner assembly 2410.

Figure 24E:
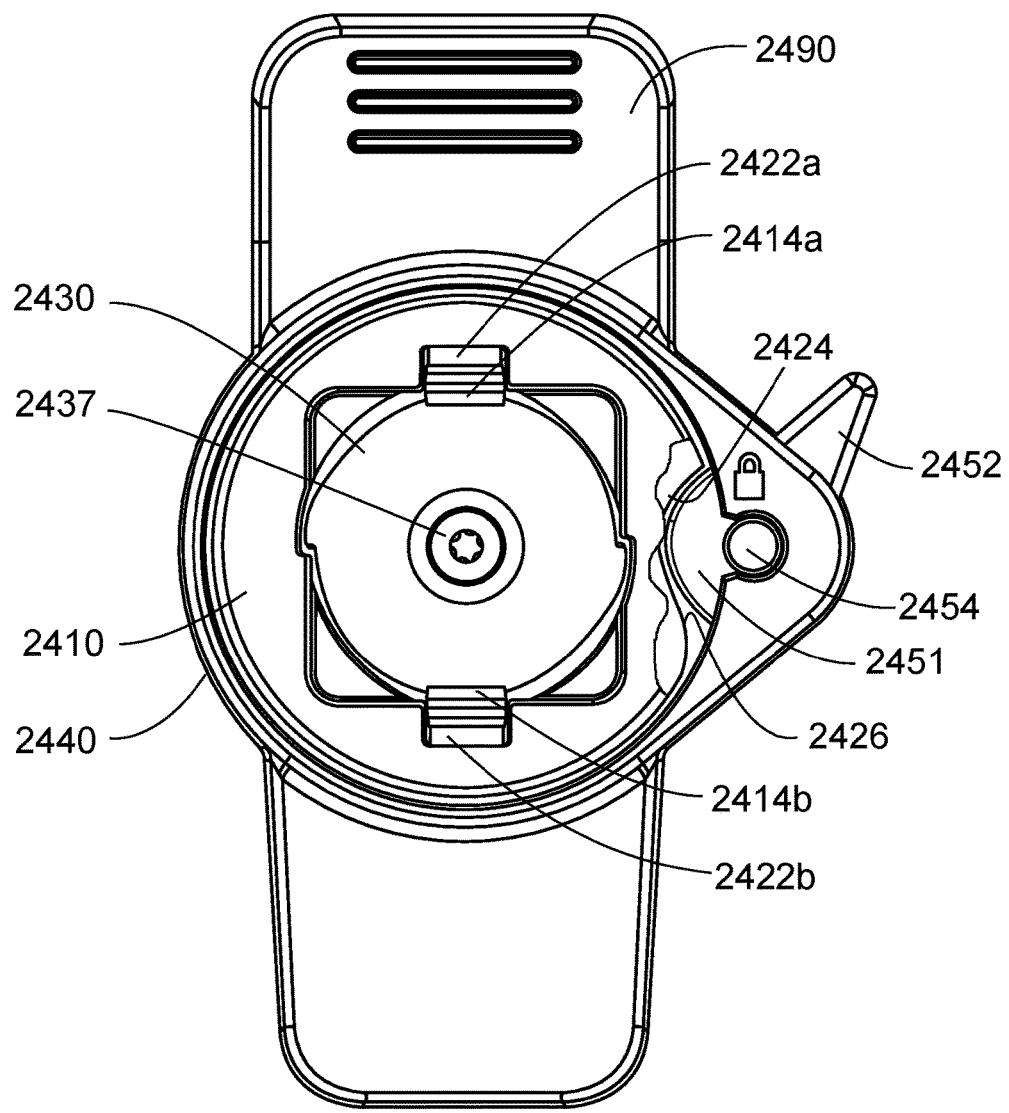

FIG. 24E provides a partial cutaway view illustrating an interaction between inner assembly 2410 and the locking cam 2451 when the locking cam is in a locked position. The fully engaged locking cam 2451 prevents the inner assembly 2410 from rotating about a central axis within the outer housing 2440. To remove a mounted cleat and device, a user may move the locking cam lever 2452 out of the shown locked position, rotate the cleat and attached device about the center axis of the mount assembly 2400, and remove the cleat and device.

Figure 24F:
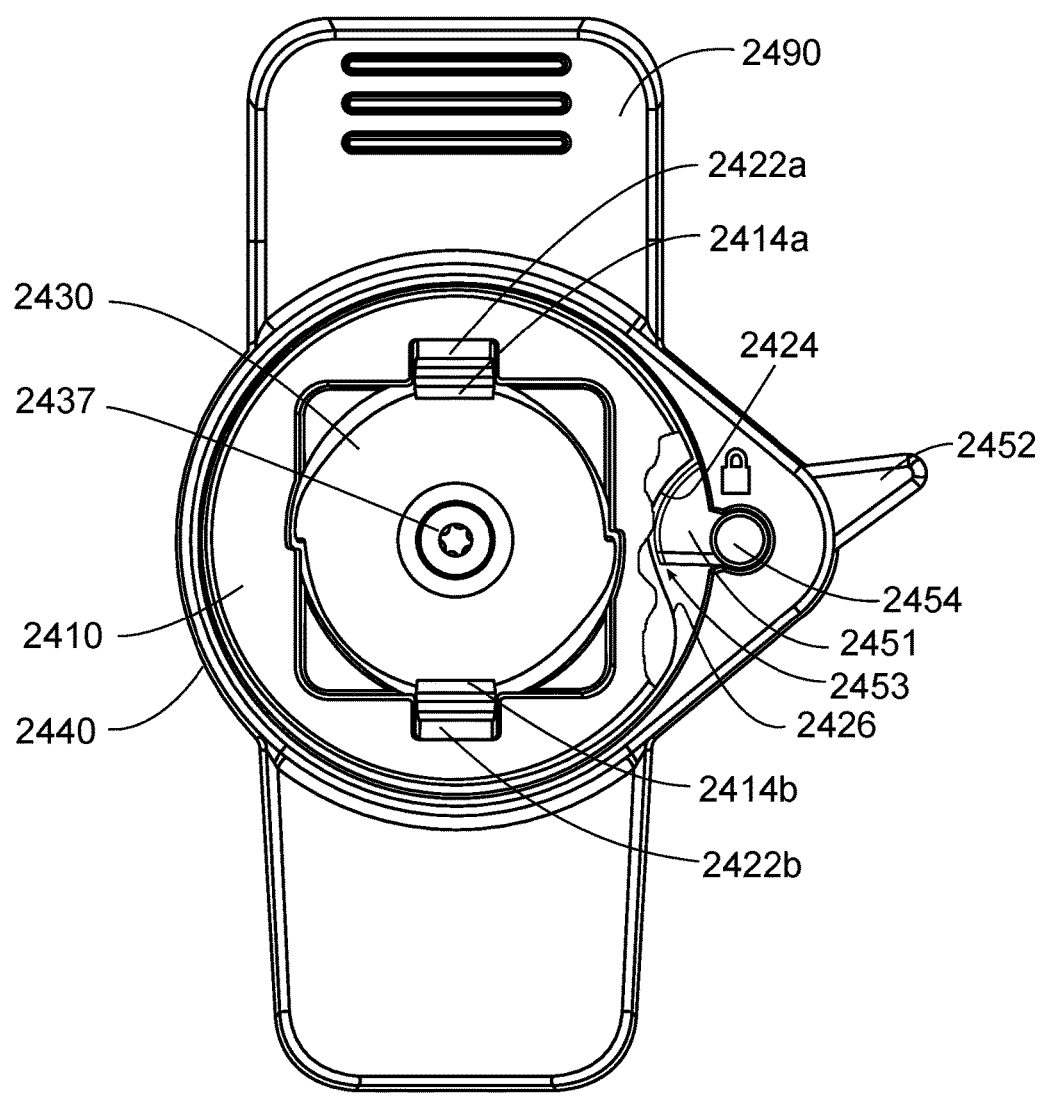
Figure 24G:
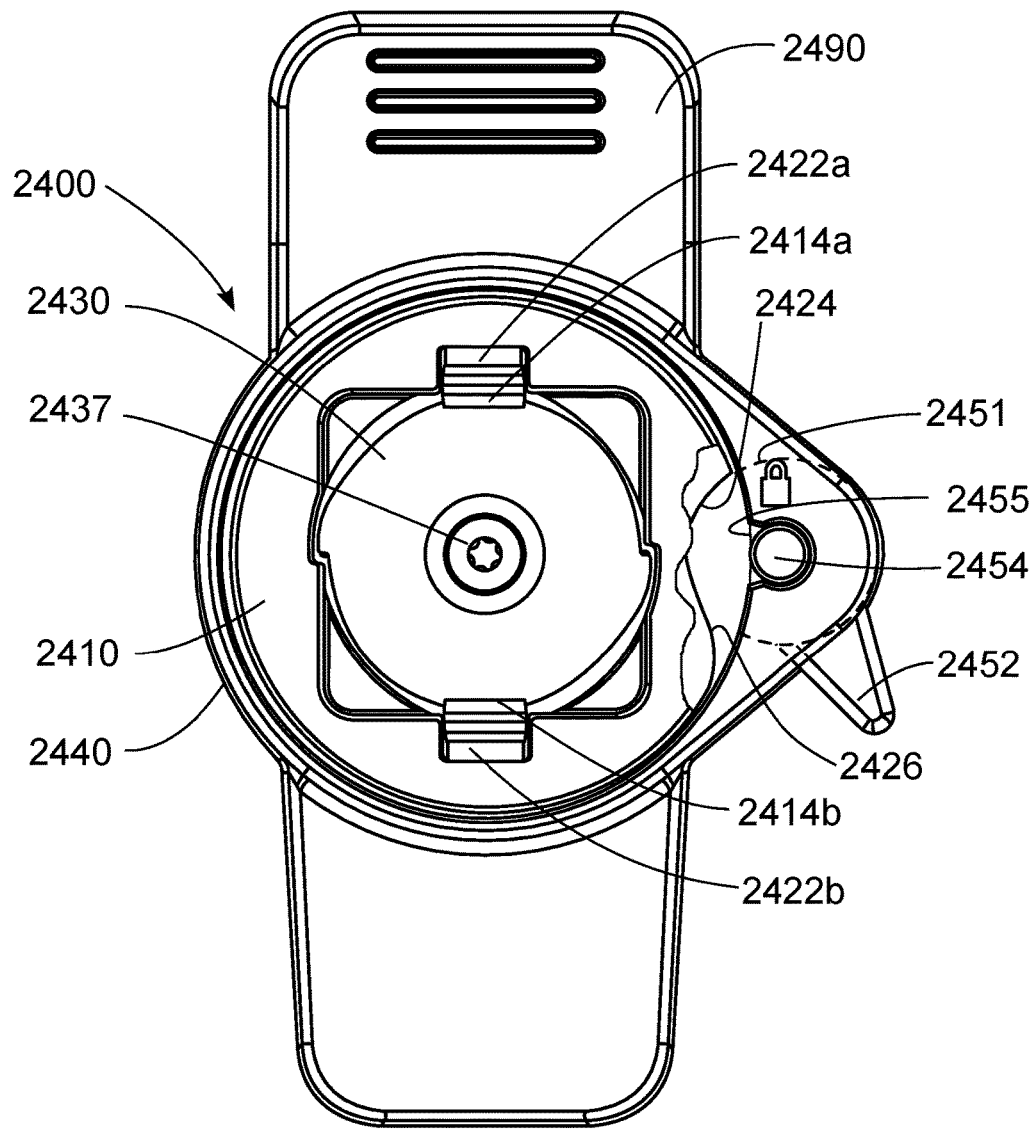

The mounted cleat and device may also be removed when the locking cam lever 2452 is in a partially open or partially unlocked position as in FIG. 24F. A user can rotate a mounting cleat and inner assembly and force the locking cam lever from a partially open position to a fully open position. In this instance, rotating the mounted cleat and device—and thus the inner assembly 2410—engages the inner assembly 2410 at a gradual slope portion 2426 of the cam-receiving void face 2424 against a corner 2453 of the locking cam 2451. As the gradual slope portion 2426 presses against corner 2453 of locking cam 2451, locking cam 2451 rotates to an unlocked position out of the cam-receiving void, thereby permitting the inner assembly 2410 to rotate fully and press the clasping mechanisms out of the way for removal of a mounted cleat.

The locking cam mechanism 2450 may further include a locking cam void, with face 2455 having a shape corresponding to an outermost radius of the inner assembly 2410. In the fully unlocked position, shown in FIG. 24G, the locking cam void face 2455 is exposed toward the inner assembly 2410 and thus permits the inner assembly 2410 to turn with respect to the outer housing 2440 and the locking cam mechanism 2450. The locking cam 2451 may be disposed in the locking cam channel 2456 with a snug, but easily movable fit, such that a user may note a difference in resistance of the locking cam movement when the inner assembly is rotated, thereby alerting the user that the locking cam is in a position between fully locked and fully unlocked positions.

Figure 24H:
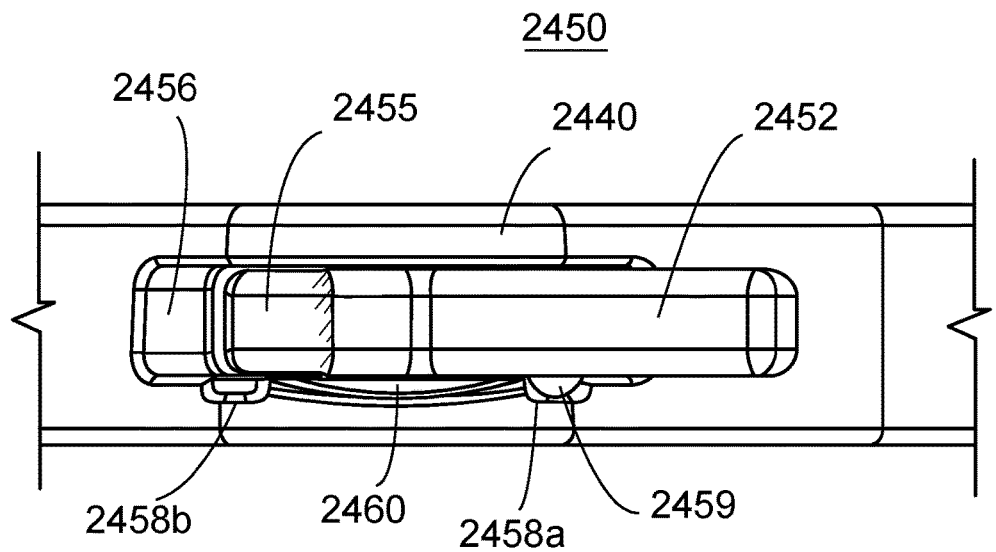
Figure 24I:
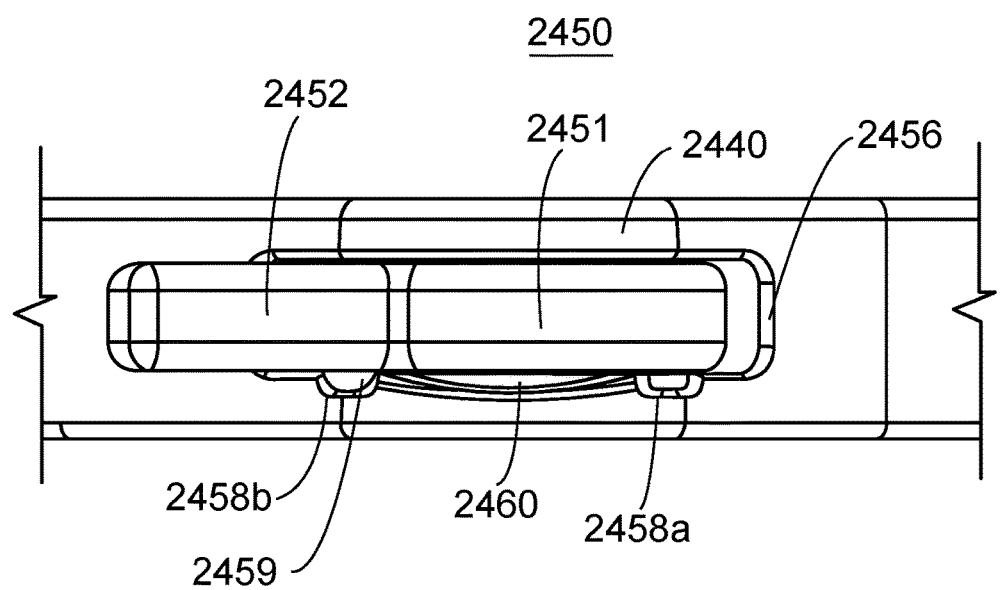

FIGS. 24H and 24I illustrate, respectively, fully locked and fully unlocked positions of the locking cam 2451. It will be appreciated that the locked and unlocked positions may in certain embodiments be reversed along with the rotational direction of the inner assembly 2410 to disengage a mounted cleat and device. FIGS. 24H and 24I also more clearly illustrate locking cam depressions 2458a/2458b formed in the outer shell 2440. A locking cam bump 2459 engages with the depression 2458a for a locked position (on the right in FIGS. 24H-I) or the depression 2458b for an unlocked position (on the left) until the user chooses to move the cam into a different position. The outer housing 2440 provides a surface having a gently cupped or ramped path 2460 between the locking cam depressions. This cupped or ramped path 2460 permits the locking cam lever 2452 to provide a different visceral or tactile feedback to the user. For example, as the locking cam lever 2452 approaches the locked or unlocked position, the locking cam bump 2459 experiences increasing resistance against the cupped path 2460, culminating in a sudden release of the resistance when the locking cam bump 2459 enters locking cam depression 2458*a* or 2458*b*. Conversely, when moving the locking cam out of the locked or unlocked position, the user is alerted of the current position by the gradual decrease in resistance felt as a result of the locking cam bump 2459 approaching the bottom of the cupped path 2460. In certain embodiments, the positions of locking cam bump 2459 and locking cam depressions 2458*a-b* may be reversed, such that locking cam bump 2459 is disposed in outer shell 2440 and locking cam depressions 2458*a-b* are disposed on locking cam 2451. In such an embodiment, ramped path 2460 may also be disposed on locking cam 2451.

Alternatively, a path between the locking cam depressions 2458*a* and 2458*b* may include a rise mid-path (not shown) such that the locking cam is biased toward the locked or unlocked positions. In this implementation, the locking cam bump 2459 experiences its greatest moving resistance at a midpoint between the depressions. The path between depressions 2458*a* and 2458*b* may thus be formed to ensure that the locking cam is always in a locked or unlocked position. The locking cam bump 2459 may provide movement resistance against the locking cam channel 2456 when the locking cam is positioned between the locked and unlocked positions.

Figure 24J:
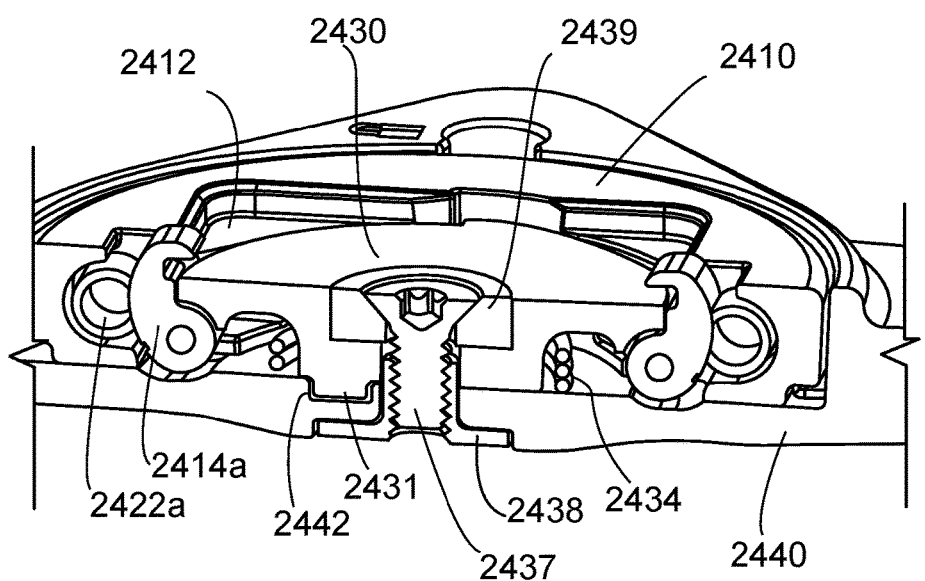

FIG. 24J is a perspective sectional view of the mount assembly 2400 from FIG. 24C. That is, the sectional view does not include the locking cam 2451. FIG. 24J illustrates the manner in which the cam 2430 is attached to the outer housing 2440. A center attachment screw 2437 may have a countersunk head such that the center attachment screw may securely retain the cam 2430 while having a substantially flush fit with the cam. FIG. 24J shows the center attachment screw engaging a threaded cam retaining nut 2438. In some embodiments, the outer housing 2440 may include a threaded receptacle that receives and retains the center attachment screw 2437.

Also shown in FIG. 24J is a washer 2439 that fits between the head of center attachment screw 2437 and the cam 2430. The washer 2439 may be formed of a material having characteristics different from the material forming the cam 2430. In some embodiments the washer 2439 is formed from material having magnetic properties. The washer 2439 may in such embodiments perform functions similar to the magnet 233 described above, including at least additional retention force on a ferromagnetic mounting cleat and additional guidance in positioning the mounting cleat during mounting. In some embodiments the material of the washer 2439 may be flexible to permit some degree of compliance to the cam 2430. Alternatively, the washer 2439 may be formed of a rigid, durable material while the cam 2430 is formed of a more compliant material. This may allow the cam 2430 to retain flexibility and other characteristics while the washer 2439 provides a durable interface with the center attachment screw. As noted with respect to FIG. 24A, the cam 2430 may attach to the underlying device (e.g., belt clip 2490) via the center attachment screw 2437 and cam-retaining nut 2438 rather than with a center attachment cleat 335 illustrated in FIGS. 3B, 3G. Alternatively, the cam 2430 may attach to the underlying device via a metal or plastic rivet (not shown). The cam 2430 may in other implementations be attached to the underlying device by a heat stake extending from the cam through a hole in the underlying device, where, to prevent removal of the heat stake from the hole, a "mushroom" head of the heat stake may be formed from the portion of the heat stake protruding through the hole. This layout may be reversed to provide a heat stake or axis protruding upward from the underlying device (e.g., belt clip) to engage the cam 2430, forming a mushroom head on the top side of the cam 2430.

FIG. 24J illustrates that the cam 2430 retains the inner assembly 2410. A cam peg 2431 may be fitted to a corresponding slot or trough 2442 of the outer housing. The slot or trough 2442 may limit the path and orientation of the cam 2430.

FIGS. 25-29 illustrate simplified top views of alternative mount assembly structures for preventing unintentional rotation of an inner assembly, such as inner assembly 2410, with respect to a cam and outer housing, such as cam 2430 and outer housing 2440. In these figures, like numbers generally correspond to like features in previously disclosed embodiments. For example, inner assembly 2510 of FIG. 25 corresponds to inner assembly 2410 of FIG. 24A.

Figure 25:
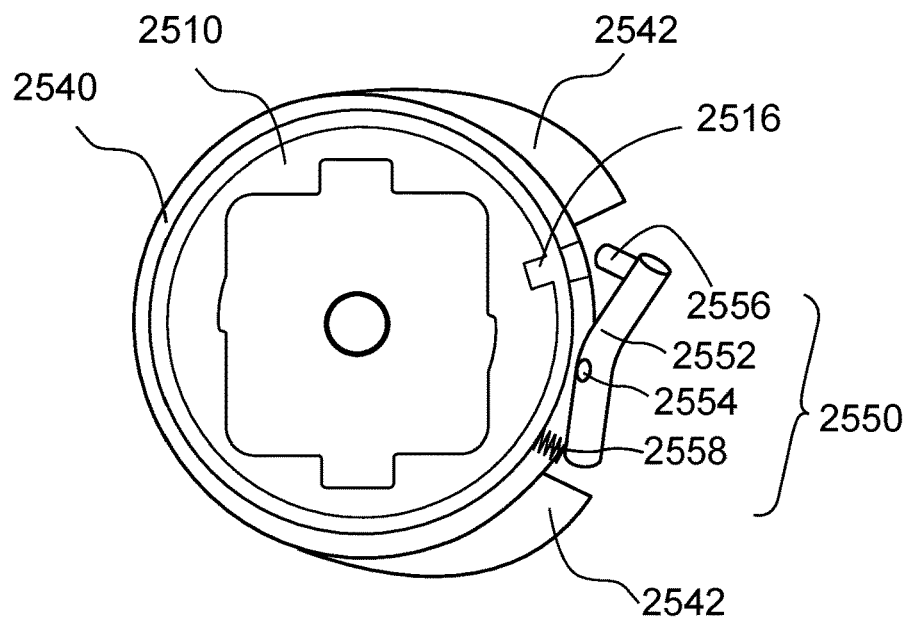
FIG. 25 shows a mount assembly having an alternative rotation-locking mechanism according to a disclosed embodiment.

FIG. 25 illustrates a toggle mechanism 2550 in a mount assembly 2500, in which an outer housing 2540 includes the toggle mechanism 2550 to prevent rotation of inner assembly 2510. The toggle mechanism 2550 may include a toggle switch 2552 mounted to the outer housing 2540 by a pivot pin 2554. A biasing structure, such as a spring 2458 may bias the toggle to be in a predetermined position. For example, the predetermined position may be a locked position in which a toggle pin 2556 is disposed in a corresponding toggle pin receptacle 2516 of the inner assembly 2510. The toggle switch 2552 may alternately be biased into either a locked or an unlocked position. The toggle switch 2552 is formed and mounted to pivot at the pivot pin 2554. Pressing one side of the toggle switch 2552 places the toggle switch in an unlocked position, in which the toggle pin 2556 is disengaged from the toggle pin receptacle 2516, and the inner assembly 2510 may rotate to remove a mounted cleat and device. Such unlocked position may be dependent on continued force on an appropriate side of the toggle switch 2552. In embodiments that have a bias to a locked position, the user need only remove force from the toggle switch 2552 to replace the toggle pin 2556 in the toggle pin receptacle 2516 of the inner assembly 2510. The outer housing 2540 may include "shoulders" 2542 on either side of the toggle switch to prevent the toggle from damage and accidental release.

Figure 26:
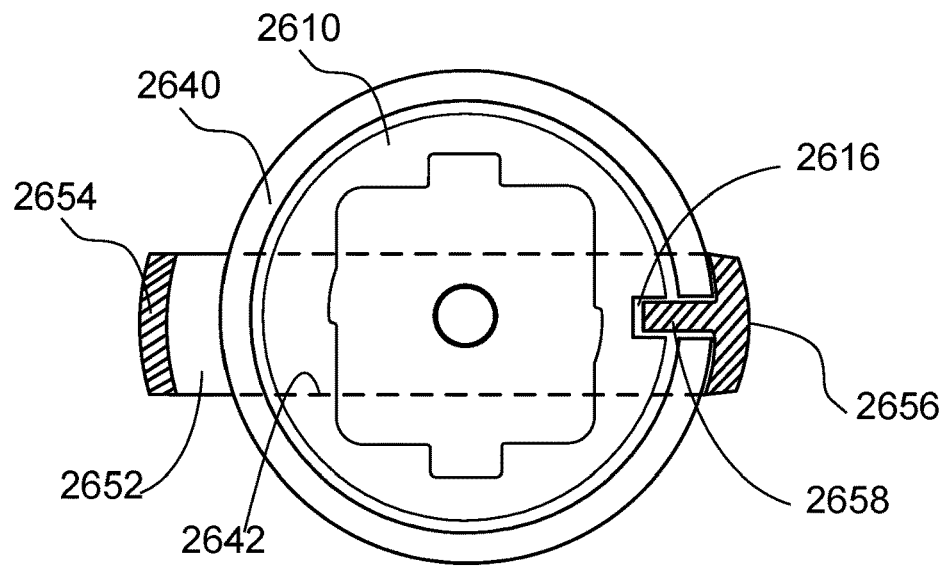
FIG. 26 shows a mount assembly having an alternative rotation-locking mechanism according to a disclosed embodiment.
Figure 27:
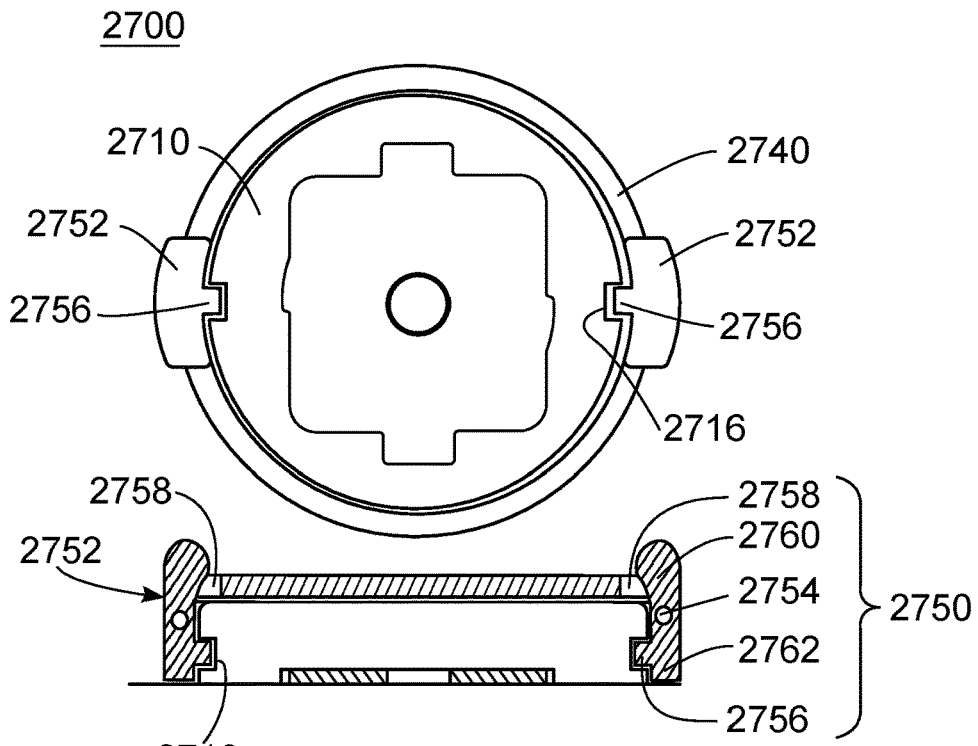
FIG. 27 shows a mount assembly having an alternative rotation-locking mechanism according to a disclosed embodiment.

FIG. 26 illustrates a mount assembly 2600 which employs an opposing snap mechanism 2650 attached an outer housing 2640. The opposing snap mechanism 2650 may be engaged to prevent unintended rotation of an inner assembly 2610 of the mount assembly 2600 with respect to the outer housing 2640, where rotation of the inner assembly 2610 is required for release of a mounted cleat and electronic device or protective case (not shown in this embodiment, but similar to the release described in embodiments above). The opposing snap mechanism 2650 may include a slider 2652 having a length greater than an outer width of the outer housing 2650 and having first and second ends (2654, 2656) extending at about 90 degrees to a plane of the slider 2652. The slider 2652 may operate within a slider path 2642 formed in the outer housing 2640. The slider path may include a sealed path corresponding to a cross-section of the slider 2642 or may be formed by mere openings in sides of the outer housing 2640 that correspond in size to a cross-section of the slider 2652.

The slider 2652 may be moved between a locked position and an unlocked position, the locked position (shown in FIG. 26) may prevent rotation of the inner assembly 2610 as described further below. The first end 2654 may be formed to abut an outer perimeter of the outer housing 2640 when the slider is in an unlocked position. From the unlocked position, a user may apply force to the second end 2656 of the slider 2652, thus pushing the second end toward the center of the mount assembly 2600 and moving the first end 2654 away from the center of the mount assembly. The second end 2656 of the slider 2652 may include a "snap" or pin 2658 extending from an inner surface of the second end 2656 toward the center of the mount assembly 2600. The outer housing 2640 may include a hole through which the snap or pin 2658 may extend to engage a snap/pin receptacle 2616 when in the locked position. The snap or pin 2658 may include a friction fit structure in which, e.g., a bulbous end (not shown) of the snap or pin is forced through a snug-fitting portion of snap receptacle 2616 (not shown) and then snaps into place at a depression or concavity (not shown) of the receptacle 2616. A predetermined amount of force may be required to place the slider in the locked and unlocked positions, thus reducing opportunities for the opposing snap mechanism 2650 to be unintentionally moved from a desired position. In some embodiments, the slider may have a less resistive movement and may include a biasing mechanism, such as a spring, that forces the slider 2652 into the locked position until a user temporarily overcomes the force in order to remove a mounted device.

FIGS. 27A-B illustrate a mount assembly 2700 which employs a pinch-to-release mechanism 2750 attached an outer housing 2740 of the mount assembly. FIG. 27A is a top view of mount assembly 2700 and FIG. 27B is a side sectional view of the mount assembly 2700 from FIG. 27A. The pinch-to-release mechanism 2750 may be engaged to prevent unintended rotation of an inner assembly 2710 of the mount assembly 2700 with respect to the outer housing 2740, where rotation of the inner assembly 2710 is required for release of a mounted cleat and electronic device or protective case (not shown in this embodiment, but similar to the release described in embodiments above).

Similar to the toggle switch mechanism of FIG. 25, the pinch-to-release mechanism 2750 may include one or more toggle switches 2752 that include a toggle pin 2756 formed to engage a toggle pin receptacle 2716 of the inner assembly 2710. However, the toggle switch(es) 2752 are mounted such that a pivot point 2754 of each toggle switch 2752 is parallel to a bottom face of the outer housing 2740 (versus a pivot point disposition in the embodiment of FIG. 25 that is comparatively orthogonal to the outer housing's bottom face). If two toggle switches 2752 are used, they may be disposed opposite each other across the mount assembly 2700 so that each of the toggle switches 2752 may be disengaged by a user using a pinching motion. A user may pinch an upper portion 2760 of each toggle switch 2752 toward a central portion of the mount assembly, each toggle switch pivoting as a result such that a lower portion 2762 of each toggle switch is forced away from the center of the mount assembly 2700, thus removing each toggle pin 2756 from a corresponding toggle pin receptacle 2716 of the inner assembly 2710. Depending on a height of the pivot point 2754 with respect to the wall height of the corresponding outer housing 2740, a spring 2758 or other biasing element may be placed either above the pivot point 2754, forcing the upper portion 2760 of the corresponding toggle switch away 2752 from the center of the mount assembly 2700, or may be placed below the pivot point 2754 and directed to pull the bottom portion 2762 of the toggle switch 2752 inward toward the center of the mount assembly 2700.

Figure 28:
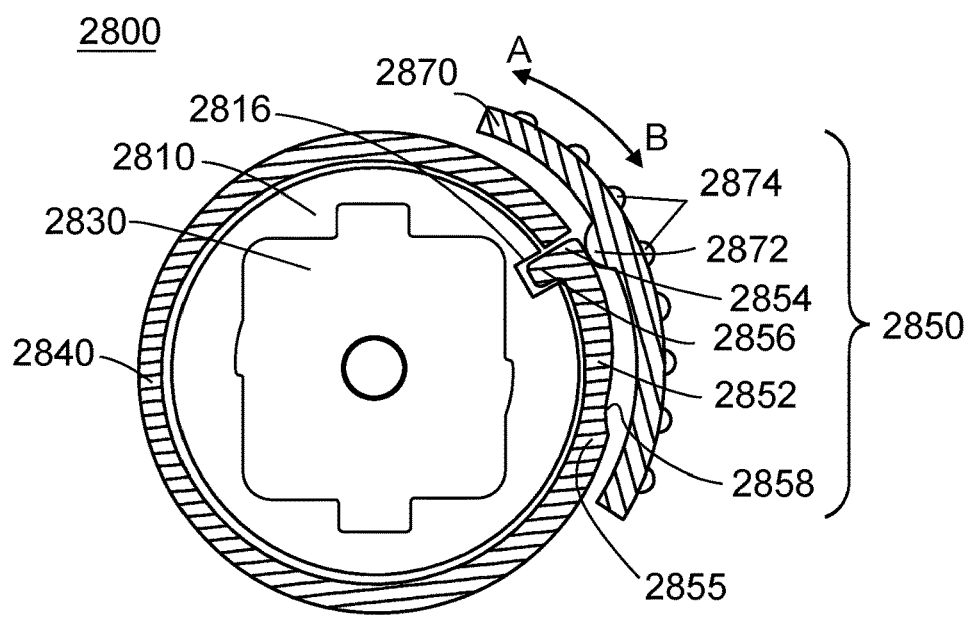
FIG. 28 shows a mount assembly having an alternative rotation-locking mechanism according to a disclosed embodiment.

FIG. 28 illustrates another embodiment of a mount assembly structure for preventing unintentional rotation of an inner assembly. In FIG. 28, the mount assembly 2800 includes an inner assembly 2810 disposed within outer housing 2840. The mount assembly 2800 may include a rotation-locking mechanism 2850 at least partly formed in the inner assembly 2810 and outer housing 2840.

The inner assembly 2810 may include the features described above, including a cam 2830, and the clasps, springs, etc. described above (see, e.g., description of the inner assembly 2410 above). The inner assembly may further include a pin receptacle 2816 that permits access by a lock pin 2856 to prevent rotation of the inner assembly and a resulting dismount of a cleat and associated electronic device. As with corresponding features described above (e.g., receptacles 2516, 2616, 2716), the pin receptacle 2816 may be a circular or other shape hole or slot in a perimeter side of the inner assembly 2810. The pin receptacle 2816 may correspond in shape and size with the lock pin 2856.

The outer housing 2840 may include a lock arm or lever 2852 formed in a perimeter wall of the outer housing 2840. The lock arm or lever 2852 may have a first end 2854 attached to, or integral with, the perimeter wall of the outer housing. A second end 2855 of the lock arm or lever 2852 may include the lock pin 2856 extending toward a central portion of the mount assembly 2800 and formed to engage the pin receptacle 2816 of the inner assembly 2810. In a locked position, the lock pin 2856 is pushed into and held within the pin receptacle 2816, thus preventing rotation of the inner assembly 2810 with respect to the outer housing 2840. In an unlocked position, the lock pin 2856 does not engage the pin receptacle 2816, and the inner assembly 2810 may rotate with respect to the outer housing 2840. The position of the lock pin 2856 may be a default or rest state of the lock pin.

To push the lock pin 2856 into place to effect a locked state, the outer housing also may include a slider 2870 attached to at least a portion of the outer housing. The slider 2870 may include a bump or extension 2872 that extends from an inner surface of the slider 2870 toward the center of the mount assembly 2800. When the slider 2870 is moved in the "A" direction from an unlocked state, the bump or extension 2872 may press against the lock arm/lever 2852 with increasing force until, at or near the second end 2855 of the lock arm, the bump/extension 2872 presses the second end 2855 of the lock arm/lever to resiliently bend toward the center of the mount assembly, pushing the lock pin 2856 into the pin receptacle 2816, effecting the locked position. When the slider 2870 is moved in the "B" direction from the locked position, pressure from the bump/extension 2872 against the lock arm/lever 2872 decreases as the bump/extension 2872 enters a recess 2858, the second end 2855 returns to a rest position, and the lock pin 2856 is extracted from the pin receptacle 2816. In some embodiments, the lock arm/lever 2852 may be congruent with the perimeter of the outer housing 2840, while in other embodiments the lock arm/lever 2852 may, in a rest or unlocked state, angle outward from the wall of the outer housing 2840.

The slider 2870 may, as illustrated, be formed at only a portion of the outer housing perimeter. In another implementation, the slider 2870 may be circular, surrounding the entire perimeter of the outer housing. In this implementation, the slide may include multiple bumps or extensions 2872, such that a continuous rotation of the slider 2870 in the "A" direction around the outer housing perimeter may result in a cycle of locking and unlocking positions of the lock pin 2856. This implementation may also include a mechanism (not shown) to prevent rotation of the slider 2870 in the "B" direction. Such mechanism may include bumps/extensions 2872 that are sloped on one side and flat on the other side. The sloped side may permit movement of the bump/extension on the lock arm 2852, while the flat side would abut the second end 2855 of the lock arm when the slider is rotated in the "B" direction, thus preventing further movement in the "B" direction.

The slider may be formed of or coated with a material having a high friction coefficient to aid a user's grip or purchase against the slider. The slider 2870 may additionally, or alternatively include one or more nubs 2874 formed or attached on an exterior portion of the slider 2872 to aid grip on the slider. The nubs or other gripping aids may additionally have aesthetic qualities.

The slider 2870 may be attached to the outer housing 2840 by one or more tabs and slots (not shown) where the slider 2870 may include tabs along edges of the slider that fit and move along slots of the outer housing 2840. To facilitate this structure, the outer housing 2840 may, for example, have overhangs at the top and bottom surfaces of the outer housing, the overhangs extending radially from the perimeter of the top and bottom surfaces. Slots or grooves may be formed in the overhangs such that the slider 2870 glides in the resultant channel formed by the overhangs and a perimeter wall of the outer housing.

Figure 29A:
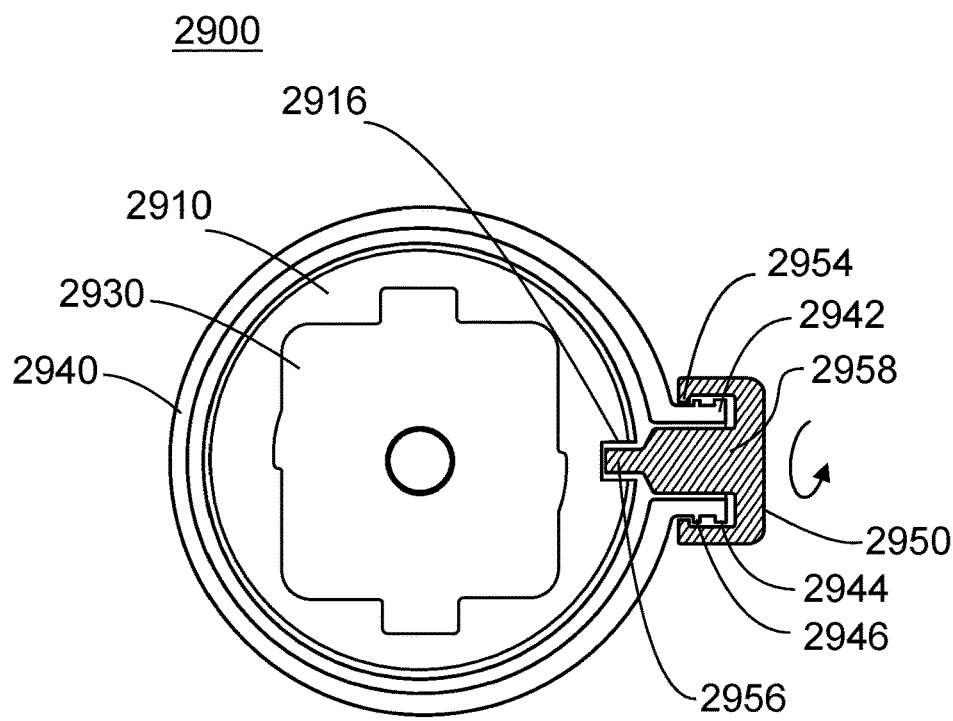
FIG. 29A shows a mount assembly having an alternative rotation-locking mechanism according to a disclosed embodiment.
Figure 29B:
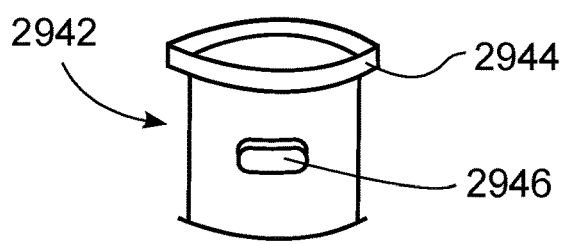
FIG. 29B shows a boss of the alternative rotation-locking mechanism of FIG. 29A.

In another embodiment, looking at FIGS. 29A-B, a mount assembly 2900 may include a rotation-locking mechanism that uses a locking bung 2950. The mount assembly 2900 may include, as described above, an inner assembly 2910 and an outer housing 2940. The inner assembly may include a cam 2930 and other features (e.g., clasps, springs, etc.— see description of the inner assembly 2410 above), including a bung pin receptacle 2916. The outer housing 2940 may include a substantially cylindrical boss 2942 extending outward from a perimeter wall of the outer housing. The boss 2942 may include a flange 2944 and one or more boss tabs 2946 for retention of the bung 2950. Alternatively, the boss 2942 may be threaded to receive the bung 2950, which may be correspondingly threaded to secure the bung 2950 to the boss 2942. Such threading may be on an external surface of the boss or on an internal surface of the boss, with corresponding threads on a body 2958 or another portion of the bung. FIG. 29B illustrates the former implementation, in which flange 2944 retains the bung 2950 by limiting removal of the bung by interaction with bung tabs 2954. To press the locking bung pin 2956 into the bung pin receptacle 2916, the user presses and turns the bung 2950 to engage the bung tabs 2954 with one or more boss tabs 2946 that extend outward from the shaft of the boss. The bung may include a gasket (not shown) around the body 2958 of the bung. The gasket may provide additional resistance to prevent the bung 2950 from being unseated from the boss 2942.

The figures may depict exemplary configurations of mount apparatuses and systems, which is done to aid in understanding the features and functionality that can be included in the apparatuses and systems described herein. The mount apparatuses and systems are not restricted to the illustrated architectures or configurations, and can be implemented using a variety of alternative architectures and configurations. Additionally, although the apparatuses and systems are described above in terms of various exemplary embodiments and implementations, it should be understood that the various features and functionality described in one or more of the individual embodiments with which they are described can be applied, alone or in some combination, to one or more of the other embodiments of the disclosure, whether or not such features are presented as being a part of a described embodiment. Thus the breadth and scope of the present disclosure, especially in any following claims, should not be limited by any of the above-described exemplary embodiments.

The contents of the articles, patents, and patent applications, and all other documents and electronically available information mentioned or cited herein, are hereby incorporated by reference in their entirety to the same extent as if each individual publication was specifically and individually indicated to be incorporated by reference.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements, or components of the disclosure may be described or claimed in the singular, the plural is contemplated to be within the scope thereof unless limitation to the singular is explicitly stated. The presence of broadening words and phrases such as "one or more," "at least," "but not limited to," or other like phrases in some instances shall not be read to mean that the narrower case is intended or required in instances where such broadening phrases may be absent. Additionally, where a range is set forth, the upper and lower limits of the stated range are inclusive of all of the intermediary units therein.

The foregoing description is intended to illustrate but not limit the scope of the disclosure, which is defined by the scope of the appended claims. Other embodiments are within the scope of the following claims.

What is claimed is:

1. A mount assembly for releasably retaining a mounting cleat, the mount assembly comprising:
   a top housing portion;
   a recess disposed in a top surface of the top housing portion, the recess configured to receive the mounting cleat;
   a bottom housing portion rotatably connected to the top housing portion;
   a biasing device comprising a first end and a second end, the first end of the biasing device connected to the bottom housing portion, and the second end of the biasing device connected to the top housing portion, wherein the top housing portion is rotatable relative to the bottom housing portion between an unrotated position and a rotated position, such that when the top housing portion is in the rotated position the biasing device exerts a force upon the top housing portion to return the top housing portion to the unrotated position;
   a first clasp mechanism and a second clasp mechanism each at least partially disposed within the top housing portion, wherein the first and second clasp mechanisms extend into the recess to clasp the mounting cleat when the top housing portion is in the unrotated position, and wherein the first and second clasp mechanisms retract from the recess to release the mounting cleat when the top housing portion is in the rotated position; and a locking mechanism configured to temporarily prevent rotation of the top housing portion relative to the bottom housing portion when the locking mechanism is in a locked position.

2. The mount assembly of claim 1 further comprising an attachment mechanism for removably attaching the mount assembly to another object.

3. The mount assembly of claim 1 further comprising an adhesive for attaching the mount assembly to another object.

4. The mount assembly of claim 1 further comprising a first clasp spring configured to apply a force against the first clasp mechanism to maintain the first clasp mechanism extended into the recess when the top housing portion is in the unrotated position.

5. The mount assembly of claim 4 further comprising a second clasp spring configured to apply a force against the second clasp mechanism to maintain the second clasp mechanism extended into the recess when the top housing portion is in the unrotated position.

6. The mount assembly of claim 5 further comprising a cam mechanism comprising:
   a first cam arm extending outward from a centerline axis of the cam; and
   a second cam arm extending outward from the centerline axis of the cam,
   wherein, as the top housing portion transitions between the unrotated position and the rotated position, the first cam arm applies an opposing force to the first clasp mechanism that overcomes the force applied by the first clasp spring, thereby causing the first clasp mechanism to retract away from the center of the recess when the top housing portion transitions between the unrotated position and the rotated position and the second cam arm applies an opposing force to the second clasp mechanism that overcomes the force applied by the second clasp spring, thereby causing the second clasp mechanism to retract away from the center of the recess.

7. The mount assembly of claim 1 further comprising a first pivot pin on which the first clasp mechanism pivots between an extended position and a retracted position with respect to the recess.

8. The mount assembly of claim 7 further comprising a second pivot pin on which the second clasp mechanism pivots between an extended position and a retracted position with respect to the recess.

9. The mount assembly of claim 1 further comprising an alignment element disposed within the recess, the alignment element selected from the group consisting of a magnet and a ferromagnetic material.

10. The mount assembly of claim 1, the locking mechanism comprising a lock switch, the lock switch having a locked position and an unlocked position, wherein, while in the locked position, the lock switch prevents the top housing portion from rotating relative to the bottom housing portion such that the first and second clasp mechanisms remain in their extended positions toward the center of the recess to retain the mounting cleat when the top housing portion is in the unrotated position.

11. A mount assembly for releasably receiving a mounting cleat, the mount assembly comprising:
   a first housing portion;
   a second housing portion rotatably connected to the first housing portion;
   a recess disposed in a top surface of the first housing portion, the recess configured to receive the mounting cleat;
   a biasing device comprising a first end and a second end, the first end of the biasing device connected to the first housing portion, and the second end of the biasing device connected to the second housing portion, wherein the first housing portion is rotatable relative to the second housing portion between an unrotated position and a rotated position, such that when the first housing portion is in the rotated position the biasing device exerts a force upon the first housing portion to return the first housing portion to the unrotated position;
   a first clasp mechanism and a second clasp mechanism each at least partially disposed within the first housing portion, wherein the first and second clasp mechanisms extend into the recess to clasp the mounting cleat when the first housing portion is in the unrotated position, and wherein the first and second clasp mechanisms retract from the recess to release the mounting cleat when the first housing portion is in the rotated position; and
   a locking mechanism configured to temporarily prevent rotation of the first housing portion relative to the second housing portion when the locking mechanism is in a locked position.

12. The mount assembly of claim 11 further comprising a first clasp spring configured to apply a force against the first clasp mechanism to maintain the first clasp mechanism extended into the recess when the first housing portion is in the unrotated position.

13. The mount assembly of claim 12 further comprising a second clasp spring configured to apply a force against the second clasp mechanism to maintain the second clasp mechanism extended into the recess when the first housing portion is in the unrotated position.

14. The mount assembly of claim 13 further comprising a cam mechanism comprising:
   a first cam arm extending outward from a centerline axis of the cam; and
   a second cam arm extending outward from the centerline axis of the cam,
   wherein, as the first housing portion transitions between the unrotated position and the rotated position, the first cam arm applies an opposing force to the first clasp mechanism that overcomes the force applied by the first clasp spring, thereby causing the first clasp mechanism to retract away from the center of the recess when the first housing portion transitions between the unrotated position and the rotated position and the second cam arm applies an opposing force to the second clasp mechanism that overcomes the force applied by the second clasp spring, thereby causing the second clasp mechanism to retract away from the center of the recess.

15. The mount assembly of claim 11 further comprising a first pivot pin on which the first clasp mechanism pivots between an extended position and a retracted position with respect to the recess and a second pivot pin on which the second clasp mechanism pivots between an extended position and a retracted position with respect to the recess.

16. The mount assembly of claim 11 further comprising an alignment element disposed within the recess, the alignment element selected from the group consisting of a magnet and a ferromagnetic material.

17. The mount assembly of claim 11 wherein the locking mechanism comprises a lock switch having a locked position and an unlocked position, wherein, while in the locked position, the lock switch prevents the first housing portion from rotating relative to the second housing portion such that the first and second clasp mechanisms remain in their extended positions toward the center of the recess to retain the mounting cleat when the first housing portion is in the unrotated position.

18. A mount system for temporarily attaching a first object to a second object, the mount system comprising:
- a mounting cleat;
- a top housing portion having a recess disposed in a top surface of the top housing portion, the recess configured for receiving the mounting cleat;
- a bottom housing portion rotatably connected to the top housing portion;
- a biasing device comprising a first end and a second end, the first end of the biasing device connected to the bottom housing portion, and the second end of the biasing device connected to the top housing portion, wherein the top housing portion is rotatable relative to the bottom housing portion between an unrotated position and a rotated position, such that when the top housing portion is in the rotated position the biasing device exerts a force upon the top housing portion to return the top housing portion to the unrotated position; and
- first and second clasp mechanisms at least partially disposed within the top housing portion, wherein the first and second clasp mechanisms extend into the recess of the top housing portion to clasp the mounting cleat when the top housing portion is in the unrotated position, and wherein the first and second clasp mechanisms retract from the recess to release the mounting cleat when the top housing portion is in the rotated position.

19. The mount system of claim 18 further comprising:
- a first clasp spring configured to apply a force against the first clasp mechanism to maintain the first clasp mechanism extended into the recess when the first housing portion is in the unrotated position; and
- a second clasp spring configured to apply a force against the second clasp mechanism to maintain the second clasp mechanism extended into the recess when the first housing portion is in the unrotated position.

20. The mount system of claim 18 wherein the bottom housing portion is attachable to the first object and the mounting cleat includes an adhesive for attaching the mounting cleat to the second object.

* * * * *